(12) United States Patent
Koyama et al.

(10) Patent No.: US 8,823,754 B2
(45) Date of Patent: Sep. 2, 2014

(54) LIQUID CRYSTAL DISPLAY DEVICE AND METHOD FOR DRIVING THE SAME

(75) Inventors: Jun Koyama, Sagamihara (JP); Hiroyuki Miyake, Atsugi (JP); Shunpei Yamazaki, Setagaya (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 557 days.

(21) Appl. No.: 13/078,206

(22) Filed: Apr. 1, 2011

(65) Prior Publication Data

US 2011/0248978 A1    Oct. 13, 2011

(30) Foreign Application Priority Data

Apr. 9, 2010 (JP) ................................. 2010-090935
May 18, 2010 (JP) ................................. 2010-114435

(51) Int. Cl.
    *G09G 5/10*    (2006.01)
(52) U.S. Cl.
    USPC .............................. 345/690; 345/92; 345/100
(58) Field of Classification Search
    USPC ................... 345/87–103, 204–215, 690–699
    See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 6,115,017 A * | 9/2000 | Mikami et al. | 345/92 |
| 6,294,274 B1 | 9/2001 | Kawazoe et al. | |
| 6,448,951 B1 * | 9/2002 | Sakaguchi et al. | 345/88 |
| 6,563,174 B2 | 5/2003 | Kawasaki et al. | |
| 6,597,348 B1 | 7/2003 | Yamazaki et al. | |
| 6,727,522 B1 | 4/2004 | Kawasaki et al. | |
| 6,873,311 B2 | 3/2005 | Yoshihara et al. | |
| 6,882,012 B2 | 4/2005 | Yamazaki et al. | |
| 6,903,731 B2 | 6/2005 | Inukai | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |

(Continued)

FOREIGN PATENT DOCUMENTS

| | | |
|---|---|---|
| CN | 1318870 | 10/2001 |
| EP | 1148467 A | 10/2001 |

(Continued)

OTHER PUBLICATIONS

Fortunato.E et al., "Wide-Bandgap High-Mobility ZNO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Dmitriy Bolotin
(74) *Attorney, Agent, or Firm* — Eric J. Robinson; Robinson Intellectual Property Law Office, P.C.

(57) ABSTRACT

To increase the frequency of input of image signals in terms of design in a field-sequential liquid crystal display device. Image signals are concurrently supplied to pixels provided in a plurality of rows among pixels arranged in matrix in a pixel portion of the liquid crystal display device. Thus, the frequency of input of an image signal to each pixel can be increased without change in response speed of a transistor or the like included in the liquid crystal display device.

10 Claims, 25 Drawing Sheets

(56) References Cited

U.S. PATENT DOCUMENTS

| | | |
|---|---|---|
| 7,105,868 B2 | 9/2006 | Nause et al. |
| 7,193,593 B2 | 3/2007 | Koyama et al. |
| 7,211,825 B2 | 5/2007 | Shih et al |
| 7,224,339 B2 | 5/2007 | Koyama et al. |
| 7,268,756 B2 | 9/2007 | Koyama et al. |
| 7,282,782 B2 | 10/2007 | Hoffman et al. |
| 7,297,977 B2 | 11/2007 | Hoffman et al. |
| 7,317,438 B2 | 1/2008 | Yamazaki et al. |
| 7,323,356 B2 | 1/2008 | Hosono et al. |
| 7,385,224 B2 | 6/2008 | Ishii et al. |
| 7,385,579 B2 | 6/2008 | Satake |
| 7,402,506 B2 | 7/2008 | Levy et al. |
| 7,403,177 B2 | 7/2008 | Tanada et al. |
| 7,411,209 B2 | 8/2008 | Endo et al. |
| 7,425,937 B2 | 9/2008 | Inukai |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,728,810 B2 * | 6/2010 | You et al. ................. 345/103 |
| 7,732,819 B2 | 6/2010 | Akimoto et al. |
| 7,773,066 B2 | 8/2010 | Yamazaki et al. |
| 7,791,571 B2 | 9/2010 | Ohtani et al. |
| 7,834,830 B2 | 11/2010 | Yamazaki et al. |
| 7,855,770 B2 | 12/2010 | Egi et al. |
| 8,426,866 B2 * | 4/2013 | Kimura et al. ................. 257/72 |
| 2001/0046027 A1 | 11/2001 | Tai et al. |
| 2002/0000960 A1 | 1/2002 | Yoshihara et al. |
| 2002/0018029 A1* | 2/2002 | Koyama ................. 345/39 |
| 2002/0024485 A1* | 2/2002 | Koyama ................. 345/87 |
| 2002/0044140 A1 | 4/2002 | Inukai |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0095305 A1* | 5/2004 | Kimura et al. ................. 345/92 |
| 2004/0127038 A1 | 7/2004 | Carcia et al. |
| 2004/0222955 A1* | 11/2004 | Koyama ................. 345/87 |
| 2005/0012097 A1 | 1/2005 | Yamazaki |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0057904 A1* | 3/2007 | Huang et al. ................. 345/103 |
| 2007/0090365 A1 | 4/2007 | Hayashi et al. |
| 2007/0108446 A1 | 5/2007 | Akimoto |
| 2007/0120810 A1* | 5/2007 | You et al. ................. 345/103 |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0279359 A1* | 12/2007 | Yoshida et al. ................. 345/89 |
| 2007/0279374 A1 | 12/2007 | Kimura et al. |
| 2007/0287296 A1 | 12/2007 | Chang |
| 2008/0006877 A1 | 1/2008 | Mardilovich et al. |
| 2008/0024418 A1* | 1/2008 | Kim ................. 345/98 |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0158137 A1* | 7/2008 | Yoshida ................. 345/102 |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0051674 A1* | 2/2009 | Kimura et al. ................. 345/204 |
| 2009/0068773 A1 | 3/2009 | Lai et al. |
| 2009/0073100 A1* | 3/2009 | Kim et al. ................. 345/92 |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0267878 A1* | 10/2009 | Song et al. ................. 345/87 |
| 2009/0273555 A1* | 11/2009 | Song et al. ................. 345/96 |
| 2009/0273557 A1* | 11/2009 | Song et al. ................. 345/100 |
| 2009/0278122 A1 | 11/2009 | Hosono et al. |
| 2009/0280600 A1 | 11/2009 | Hosono et al. |
| 2009/0289964 A1* | 11/2009 | Miyachi ................. 345/690 |
| 2009/0321737 A1 | 12/2009 | Isa et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0134398 A1* | 6/2010 | Toyota et al. ................. 345/92 |
| 2010/0134451 A1* | 6/2010 | Cho et al. ................. 345/205 |
| 2010/0148177 A1 | 6/2010 | Koyama et al. |
| 2010/0182282 A1 | 7/2010 | Kurokawa et al. |
| 2010/0225615 A1* | 9/2010 | Kurokawa ................. 345/175 |
| 2010/0321420 A1 | 12/2010 | Ohtani et al. |
| 2011/0001725 A1 | 1/2011 | Kurokawa |
| 2011/0025729 A1 | 2/2011 | Yamazaki et al. |
| 2011/0051034 A1 | 3/2011 | Egi et al. |
| 2011/0242071 A1 | 10/2011 | Koyama et al. |
| 2011/0248970 A1 | 10/2011 | Koyama et al. |
| 2011/0249037 A1 | 10/2011 | Koyama et al. |
| 2012/0002132 A1 | 1/2012 | Yamazaki et al. |
| 2012/0019567 A1 | 1/2012 | Yamazaki et al. |

FOREIGN PATENT DOCUMENTS

| | | |
|---|---|---|
| EP | 1737044 A | 12/2006 |
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-119189 A | 4/1999 |
| JP | 11-505377 | 5/1999 |
| JP | 11-337904 A | 12/1999 |
| JP | 2000-044236 A | 2/2000 |
| JP | 2000-150900 A | 5/2000 |

(56) References Cited

FOREIGN PATENT DOCUMENTS

| | | |
|---|---|---|
| JP | 2000-180825 A | 6/2000 |
| JP | 2002-023696 A | 1/2002 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-280603 A | 10/2003 |
| JP | 2004-103957 A | 4/2004 |
| JP | 2004-273614 A | 9/2004 |
| JP | 2004-273732 A | 9/2004 |
| JP | 2005-316092 A | 11/2005 |
| JP | 2006-220685 | 8/2006 |
| JP | 2007-264211 | 10/2007 |
| JP | 2009-042405 | 2/2009 |
| JP | 2009-042405 A | 2/2009 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductor,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDM '08 : Proceedings of the 15th International Display Workshops Dec. 3, 2008, pp. 1637-1640.

Hayashi.R et al., "42.1: Invited Paper: Improved Amorphous In—Ga—Zn—O TFTS,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the $In_2O_3$—$Ga_2ZnO_4$—ZnO system at 1350° C.,", Journal of Solid Stste Chemistry, Aug. 1, 1991, vol. 93, No. 2, pp. 298-315.

Kimizuka.N. et al., "Syntheses and Single-Crystal Data of Homologous Compounds, $In_2O_3(ZnO)m$ (m = 3, 4, and 5), $InGaO_3(ZnO)_3$, and $Ga_2O_3(ZnO)m$ (m = 7, 8, 9, and 16) in the $In_2O_3$-$ZnGa_2O_4$-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N. et al., "Crystallization and Reduction of Sol-Gel-Derived Zinc Oxide Films by Irradiation With Ultraviolet Lamp,", Journal of SOL-GEL Science and Technology, 2003, vol. 26, pp. 181-184.

Osada.T et al., "15.2: Development of Driver-Integrated Panel using Amorphous In—Ga—Zn—Oxide TFT,", SID Sigest '09 : SID International Sympsium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)_5$ films,", Appl. Phys. Lett. (Applied Physics Letters), Sep. 13, 2004, vol. 85, No. 11, pp. 1993-1995.

Li.C et al., "Modulated Structures of Homologous Compounds $InMO_3(ZnO)m$ (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO ($Ga_2O_3$-$In_2O_3$-ZnO) TFT,", SID Digest International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MOO_3$ as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:AL and SN-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-IN. AMOLED Display With Driver Circuit Using Amorphous In—Ga—Zn—Oxide TFTS,", IDW '09 : Proceedings of the 16th International Display Workshops, 2009, pp. 689-692.

Park.J et al., "Amorphous Indium—Gallium—Zinc Oxide TFTS and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZNO TFT,", IMID'07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

(56) References Cited

OTHER PUBLICATIONS

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTS) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 IN. QVGA AMOLED Display Using In—Ga—Zn—Oxide TFTS With a Novel Passivation Layer,", SID Digest '09 : SID International Symposium Digest of Technical Papers, May 31, 2009, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshop, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N. et al., "Spinel,YBFE2O4, and YB2FE3O7 Types of Structures for Compounds in the IN2O3 and SC2O3-A2O3-BO Systems [A; Fe, Ga, Or, Al; B: Mg, Mn, Fe, Ni, Cu, or Zn] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B. (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

Baron et al., "36.4: Can Motion Compensation Eliminate Color Breakup of Moving Objects in Field-Sequential Color Displays?" SID Digest '96: SID International Symposium Digest of Technical Papers, 1996, vol. 27, pp. 843-846.

Kurita et al., "Evaluation and Improvement of Picture Quality for Moving Images on Field-sequential Color Displays," IDW '00: Proceedings of the 17th International Display Workshops, 2000, pp. 69-72.

Taira et al., "A15" Field-Sequential Display without Color Break-Up using an AFLC Color Shutter, IDW '00 : Proceedings of the 17th International Display Workshops, 2000, pp. 73-76.

Jarvenpaa, "7.2: Measuring Color Breakup of Stationary Images in Field-Sequential-Color Displays," SID Digest '04: SID International Symposium Digest of Technical Papers, 2004, vol. 35, pp. 85-85.

International Search Report (Application No. PCT/JP2011/057924) Dated Jul. 5, 2011.

Written Opinion (Application No. PCT/JP2011/057924) Dated Jul. 5, 2011.

* cited by examiner

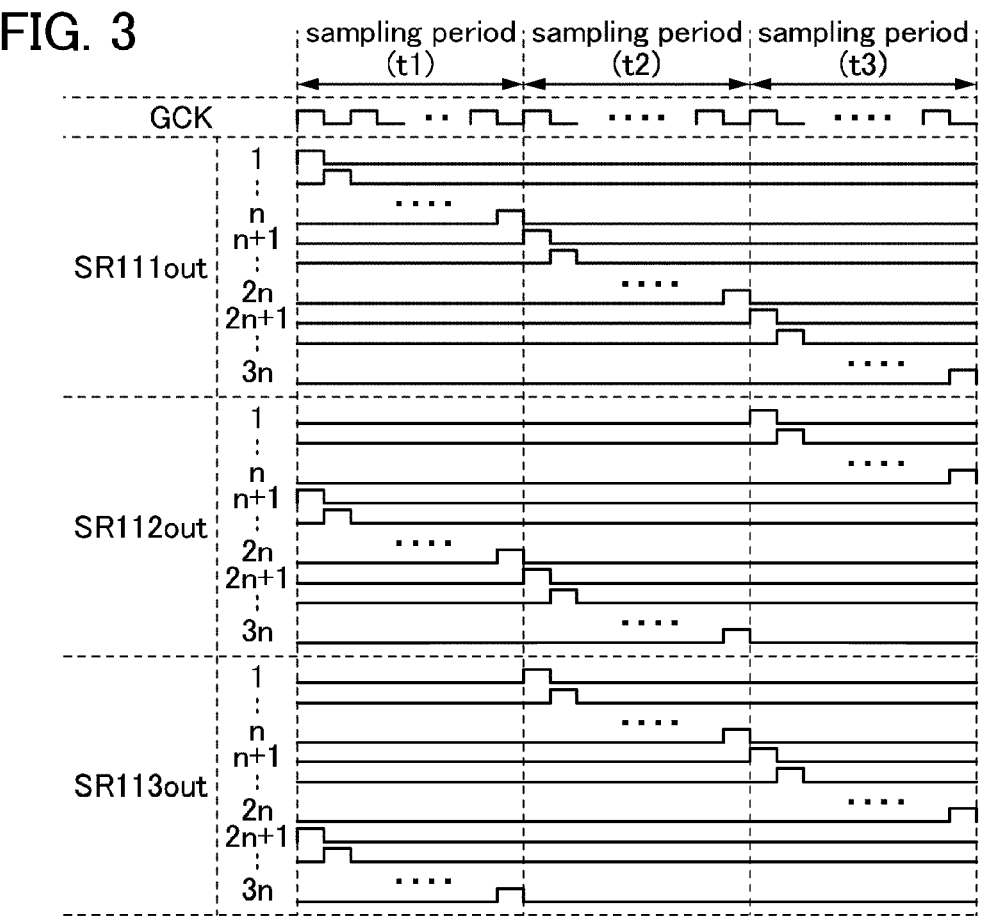

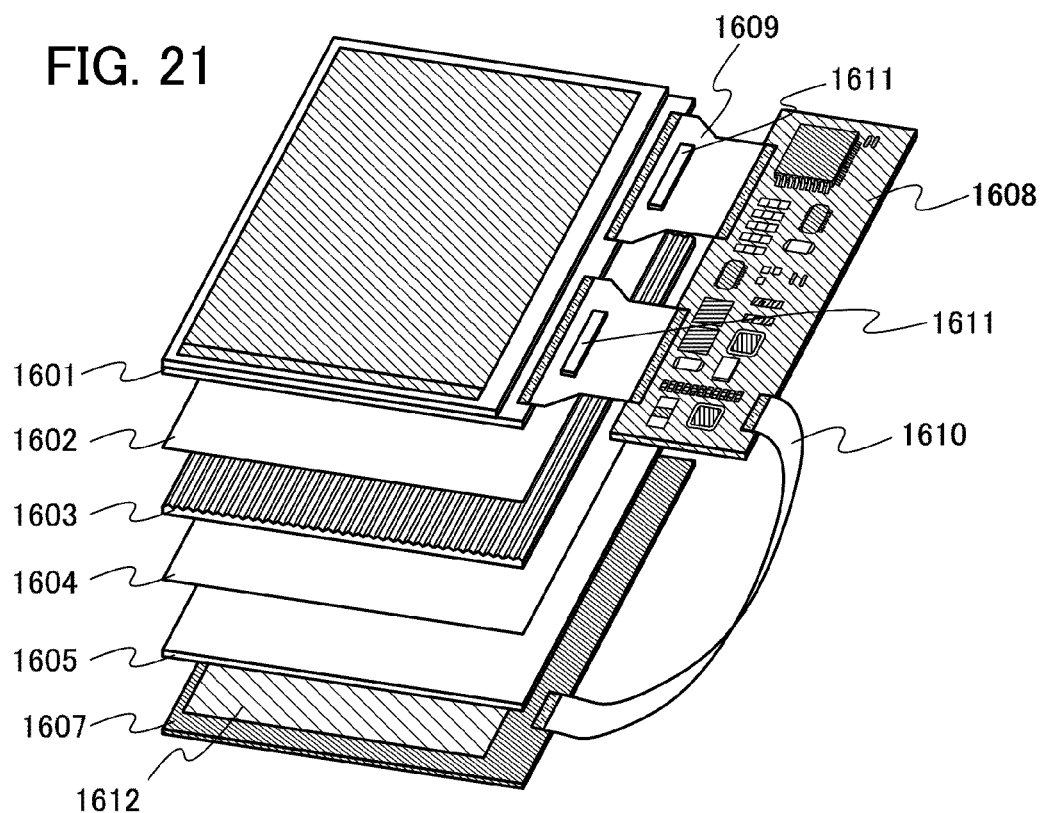

LIQUID CRYSTAL DISPLAY DEVICE AND METHOD FOR DRIVING THE SAME

TECHNICAL FIELD

The present invention relates to a liquid crystal display device and a method for driving the liquid crystal display device. In particular, the present invention relates to a liquid crystal display device in which images are displayed by a field sequential method, and a method for driving the liquid crystal display device.

BACKGROUND ART

A color filter method and a field sequential method are known as display methods for liquid crystal display devices. In a liquid crystal display device in which images are displayed by a color filter method, a plurality of subpixels each having a color filter that transmits only light with a wavelength of a given color (e.g., red (R), green (G), or blue (B)) are provided in each pixel. A desired color is produced in such a manner that transmission of white light is controlled in each subpixel and a plurality of colors are mixed in each pixel. On the other hand, in a liquid crystal display device in which images are displayed by a field sequential method, a plurality of light sources that emit lights of different colors (e.g., red (R), green (G), and blue (B)) are provided. A desired color is produced in such a manner that the plurality of light sources sequentially emit light and transmission of light of each color is controlled in each pixel. In other words, a desired color is produced by dividing the area of one pixel between lights of given colors in a color filter method, whereas a desired color is produced by dividing a display period between lights of given colors in a field sequential method.

The field-sequential liquid crystal display device has the following advantages over the color-filter liquid crystal display device. First, in the field-sequential liquid crystal display device, it is not necessary to provide subpixels in a pixel. Thus, the aperture ratio or the number of pixels can be increased. In addition, in the field-sequential liquid crystal display device, it is not necessary to provide a color filter. That is, loss of light due to light absorption in the color filter does not occur. For that reason, the transmittance can be increased and power consumption can be reduced.

Patent Document 1 discloses a field-sequential liquid crystal display device. Specifically, Patent Document 1 discloses a liquid crystal display device that includes pixels each including a transistor for controlling input of an image signal, a signal storage capacitor for holding the image signal, and a transistor for controlling transfer of electric charge from the signal storage capacitor to a display pixel capacitor. In the liquid crystal display device having this structure, writing of an image signal to the signal storage capacitor and display corresponding to electric charge held at the display pixel capacitor can be performed concurrently.

REFERENCE

Patent Document 1: Japanese Published Patent Application No. 2009-042405

DISCLOSURE OF INVENTION

In a field-sequential liquid crystal display device, the frequency of input of an image signal to each pixel needs to be increased. For example, in the case where images are displayed by a field sequential method in a liquid crystal display device including three kinds of light sources each emitting one of red (R) light, green (G) light, and blue (B) light, the frequency of input of an image signal to each pixel needs to be at least three times that of a color-filter liquid crystal display device. Specifically, in the case where the frame frequency is 60 Hz, an image signal needs to be input to each pixel 60 times per second in the color-filter liquid crystal display device; whereas an image signal needs to be input to each pixel 180 times per second in the case where images are displayed by a field sequential method in the liquid crystal display device including the three kinds of light sources.

Note that high-speed response of an element included in each pixel is required, accompanied by the increase in the input frequency of image signals. Specifically, the increase in mobility of a transistor provided in each pixel is required, for example. However, it is not easy to improve characteristics of the transistor or the like.

In view of the above, an object of one embodiment of the present invention is to increase the frequency of input of image signals.

The object can be achieved in such a manner that image signals are concurrently supplied to pixels provided in a plurality of rows among pixels arranged in matrix in a pixel portion of a liquid crystal display device.

In other words, one embodiment of the present invention is a liquid crystal display device which includes a first signal line, a second signal line, a third signal line, a first pixel, a second pixel, and a third pixel. The first pixel comprises a first transistor, a second transistor, a third transistor, and a first liquid crystal element. A gate of the first transistor is electrically connected to a first scan line, and one of a source and a drain of the first transistor is electrically connected to the first signal line. A gate of the second transistor is electrically connected to a second scan line, and one of a source and a drain of the second transistor is electrically connected to the second signal line. A gate of the third transistor is electrically connected to a third scan line, and one of a source and a drain of the third transistor is electrically connected to the third signal line. One of electrodes of the first liquid crystal element is electrically connected to the other of the source and the drain of the first transistor, the other of the source and the drain of the second transistor, and the other of the source and the drain of the third transistor. The second pixel comprises a fourth transistor, a fifth transistor, a sixth transistor, and a second liquid crystal element. A gate of the fourth transistor is electrically connected to a fourth scan line, and one of a source and a drain of the fourth transistor is electrically connected to the first signal line. A gate of the fifth transistor is electrically connected to a fifth scan line, and one of a source and a drain of the fifth transistor is electrically connected to the second signal line. A gate of the sixth transistor is electrically connected to a sixth scan line, and one of a source and a drain of the sixth transistor is electrically connected to the third signal line. One of electrodes of the second liquid crystal element is electrically connected to the other of the source and the drain of the fourth transistor, the other of the source and the drain of the fifth transistor, and the other of the source and the drain of the sixth transistor. The third pixel comprises a seventh transistor, an eighth transistor, a ninth transistor, and a third liquid crystal element. A gate of the seventh transistor is electrically connected to a seventh scan line, and one of a source and a drain of the seventh transistor is electrically connected to the first signal line. A gate of the eighth transistor is electrically connected to an eighth scan line, and one of a source and a drain of the eighth transistor is electrically connected to the second signal line. A gate of the ninth transistor is electrically connected to a ninth scan line, and one of a source and a drain of the ninth transistor is electrically connected to the third signal line. One of electrodes of the third liquid crystal element is electrically connected to the other of the source and the drain of the seventh transistor, the other of the source and the drain of the eighth transistor, and the other of the source and the drain of the ninth transistor. Further, from the first signal line, a first image signal is supplied in a first horizontal scan period included in a first sampling period, a second image signal is supplied in a first horizontal scan period included in a second sampling period, and a third image signal is supplied in a first horizontal scan period included in a third sampling period. From the second signal line, a fourth image signal is supplied in the first horizontal scan period included in the first sampling period, a fifth image signal is supplied in the first horizontal scan period included in the second sampling period, and a sixth image signal is supplied in the first horizontal scan period included in the third sampling period. From the third signal line, a seventh image signal is supplied in the first horizontal scan period included in the first sampling period, an eighth image signal is supplied in the first horizontal scan period included in the second sampling period, and a ninth image signal is supplied in the first horizontal scan period included in the third sampling period. Additionally, in the first horizontal scan period included in the first sampling period, a selection signal is supplied to the first scan line, the fifth scan line, and the ninth scan line, and a non-selection signal is supplied to the second scan line, the third scan line, the fourth scan line, the sixth scan line, the seventh scan line, and the eighth scan line. In the first horizontal scan period included in the second sampling period, a selection signal is supplied to the third scan line, the fourth scan line, and the eighth scan line, and a non-selection signal is supplied to the first scan line, the second scan line, the fifth scan line, the sixth scan line, the seventh scan line, and the ninth scan line. In the first horizontal scan period included in the third sampling period, a selection signal is supplied to the second scan line, the sixth scan line, and the seventh scan line, and a non-selection signal is supplied to the first scan line, the third scan line, the fourth scan line, the fifth scan line, the eighth scan line, and the ninth scan line. Note that the first scan line, the fourth scan line, and the seventh scan line are electrically connected to a first shift register, and the selection signal and the non-selection signal are supplied from the first shift register. The second scan line, the fifth scan line, and the eighth scan line are electrically connected to a second shift register, and the selection signal and the non-selection signal are supplied from the second shift register. The third scan line, the sixth scan line, and the ninth scan line are electrically connected to a third shift register, and the selection signal and the non-selection signal are supplied from the third shift register.

According to one embodiment of the present invention, a liquid crystal display device includes a first signal line supplied with a first image signal in a first horizontal scan period in a first sampling period, and supplied with a second image signal in a second horizontal scan period in a second sampling period; a second signal line supplied with a third image signal in the first horizontal scan period, and supplied with a fourth image signal in the second horizontal scan period; a first scan line and a second scan line supplied with a selection signal in the first horizontal scan period, and supplied with a non-selection signal in the second horizontal scan period; a third scan line and a fourth scan line supplied with a non-selection signal in the first horizontal scan period, and supplied with a selection signal in the second horizontal scan period; a first pixel electrically connected to the first signal line, the second signal line, the first scan line, and the third scan line, supplied with the first image signal in the first horizontal scan period, and supplied with the fourth image signal in the second horizontal scan period; a second pixel electrically connected to the first signal line, the second signal line, the second scan line, and the fourth scan line, supplied with the third image signal in the first horizontal scan period, and supplied with the second image signal in the second horizontal scan period; a first shift register configured to supply the selection signal to the first scan line in the first horizontal scan period and supply the selection signal to the fourth scan line in the second horizontal scan period; and a second shift register configured to supply the selection signal to the second scan line in the first horizontal scan period and supply the selection signal to the third scan line in the second horizontal scan period.

According to another embodiment of the present invention, a liquid crystal display device includes a first signal line supplied with a first image signal in a first horizontal scan period in a first sampling period, and supplied with a second image signal in a second horizontal scan period in a second sampling period; a second signal line supplied with a third image signal in the first horizontal scan period, and supplied with a fourth image signal in the second horizontal scan period; a first scan line and a second scan line supplied with a selection signal in the first horizontal scan period and the second horizontal scan period; a first pixel electrically connected to the first signal line and the first scan line, supplied with the first image signal in the first horizontal scan period, and supplied with the second image signal in the second horizontal scan period; a second pixel electrically connected to the second signal line and the second scan line, supplied with the third image signal in the first horizontal scan period, and supplied with the fourth image signal in the second horizontal scan period; a first shift register configured to supply the selection signal to the first scan line in the first horizontal scan period and the second horizontal scan period; and a second shift register configured to supply the selection signal to the second scan line in the first horizontal scan period and the second horizontal scan period.

Note that in a liquid crystal display device, AC voltage is applied to a liquid crystal element provided in a pixel in order to prevent deterioration of liquid crystal (called burn-in). For that reason, a transistor used in a pixel portion preferably has a withstand voltage higher than or equal to about ten and several volts. Moreover, the off-state current of the transistor needs to be low in order to maintain a voltage held at the liquid crystal element. In contrast, for a transistor used in a signal line driver circuit, high-speed operation is more important than high withstand voltage in order to keep high quality of images displayed in the liquid crystal display device.

In view of the above, a transistor including a channel formation region formed using an oxide semiconductor is used in a pixel portion in a liquid crystal display device according to one embodiment of the present invention. The bandgap of the oxide semiconductor is 3.0 eV to 3.5 eV, which is about three times that of silicon. The wide band gap of the oxide semiconductor is advantageous in increasing the withstand voltage of the transistor. In addition, an oxide semiconductor that is purified by reduction in concentration of impurities such as moisture or hydrogen, which serves as electron donors (donors), that is, a purified OS is an intrinsic semiconductor (an i-type semiconductor) or a substantially intrinsic semiconductor. Therefore, a transistor including the purified oxide semiconductor has very low off-state current in addition to high withstand voltage.

Furthermore, in the liquid crystal display device according to one embodiment of the present invention, a transistor including a crystalline semiconductor such as polycrystalline or single crystal silicon or polycrystalline or single crystal germanium is used in a driver circuit that needs to operate at higher speed than the pixel portion, such as a signal line driver circuit. The crystalline semiconductor has higher mobility than the oxide semiconductor. Accordingly, a signal line driver circuit can operate at high speed by using the crystalline semiconductor for a transistor.

By employing different semiconductors and different processes for a circuit that needs to operate at high speed and a circuit that needs to have high withstand voltage as described above, semiconductor elements with optimum structures can be separately formed in accordance with features required for the circuits, without complication of the processes.

In a scan line driver circuit, a transistor including a crystalline semiconductor such as a polycrystalline semiconductor or a single crystal semiconductor may be used as in the signal line driver circuit, or a transistor in which a channel formation region is formed using an oxide semiconductor may be used as in the pixel portion.

A transistor including a crystalline semiconductor such as polycrystalline or single crystal silicon or polycrystalline or single crystal germanium can be formed using a silicon wafer, an SOI (silicon on insulator) substrate, a polycrystalline semiconductor film formed on an insulating surface, or the like.

An SOI substrate can be manufactured by, for example, an attachment method such as UNIBOND (registered trademark) typified by Smart Cut (registered trademark), epitaxial layer transfer (ELTRAN, registered trademark), a dielectric separation method, or plasma assisted chemical etching (PACE); or separation by implanted oxygen (SIMOX).

A semiconductor film of silicon deposited over a substrate having an insulating surface may be crystallized by a known technique. Examples of a known technique of crystallization are a laser crystallization method using a laser beam and a crystallization method using a catalytic element. Alternatively, a crystallization method using a catalytic element and a laser crystallization method may be used in combination. In the case where a substrate with high heat resistance, such as a quartz substrate, is used, it is possible to combine any of the following crystallization methods: a thermal crystallization method with an electrically heated oven, a lamp anneal crystallization method with infrared light, a crystallization method with a catalytic element, and high temperature annealing method at about 950° C.

In the liquid crystal display device according to one embodiment of the present invention, image signals can be concurrently supplied to pixels placed in a plurality of rows among pixels arranged in matrix. Thus, the frequency of input of an image signal to each pixel can be increased without change in response speed of a transistor or the like included in the liquid crystal display device.

BRIEF DESCRIPTION OF DRAWINGS

In the accompanying drawings:

FIG. 3 illustrates output signals of shift registers;

FIG. 21 is a perspective view illustrating a specific example of a liquid crystal display device;

BEST MODE FOR CARRYING OUT THE INVENTION

Embodiments of the present invention will be described below in detail with reference to the accompanying drawings. Note that the present invention is not limited to the description below, and it is easily understood by those skilled in the art that a variety of changes and modifications can be made without departing from the spirit and scope of the present invention. Therefore, the present invention should not be construed as being limited to the description of the embodiments.

Embodiment 1

In this embodiment, an example of a liquid crystal display device in which images are displayed by a field sequential method will be described with reference to FIGS. 1A and 1B, FIG. 2, FIG. 3, FIGS. 4A and 4B, and FIG. 5.

(Structural Example of Liquid Crystal Display Device)

Figure 1A:
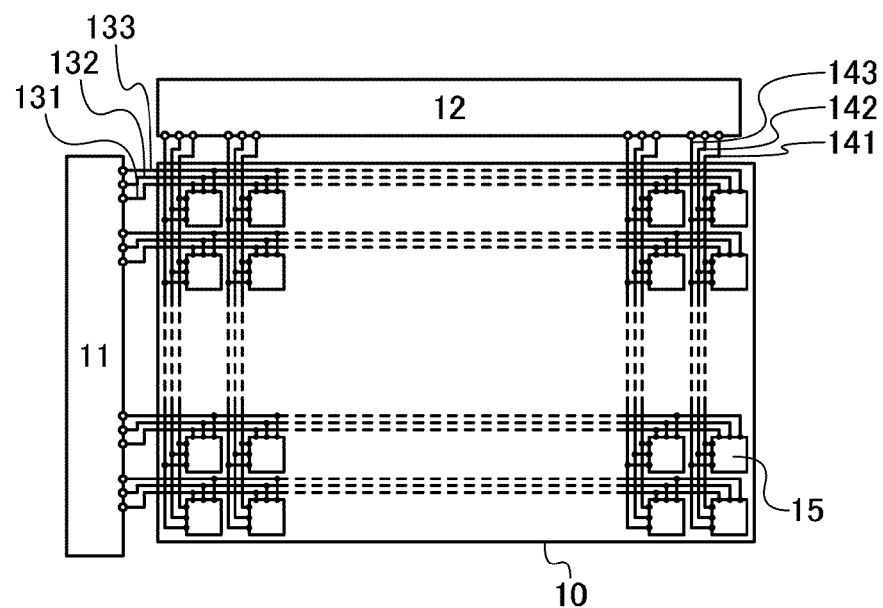
FIG. 1A illustrates a structural example of a liquid crystal display device.

FIG. 1A illustrates a structural example of a liquid crystal display device. The liquid crystal display device in FIG. 1A includes a pixel portion 10; a scan line driver circuit 11; a signal line driver circuit 12; 3n scan lines 131, 3n scan lines 132, and 3n scan lines 133 (n is a natural number of 2 or more) arranged parallel or approximately parallel to each other; and m signal lines 141, m signal lines 142, and m signal lines 143 (m is a natural number of 2 or more) arranged parallel or approximately parallel to each other. The potentials of the scan lines 131, 132, and 133 are controlled by the scan line driver circuit 11. The potentials of the signal lines 141, 142, and 143 are controlled by the signal line driver circuit 12.

The pixel portion 10 includes a plurality of pixels 15 arranged in matrix (3n rows and m columns). Each of the scan lines 131, 132, and 133 is electrically connected to m pixels 15 arranged in a given row among the plurality of pixels 15 arranged in matrix (3n rows and m columns). Each of the signal lines 141, 142, and 143 is electrically connected to 3n pixels 15 arranged in a given column among the plurality of pixels 15 arranged in matrix (3n rows and m columns).

To the scan line driver circuit 11, start signals (GSP1 to GSP3) for the scan line driver circuit, a clock signal (GCK) for the scan line driver circuit, and drive power supplies such as a high power supply potential (VDD) and a low power supply potential (VSS) are input from the outside. To the signal line driver circuit 12, signals such as a start signal (SSP) for the signal line driver circuit, a clock signal (SCK) for the signal line driver circuit, and image signals (DATA1 to DATA3) and drive power supplies such as a high power supply potential and a low power supply potential are input from the outside.

Figure 1B:
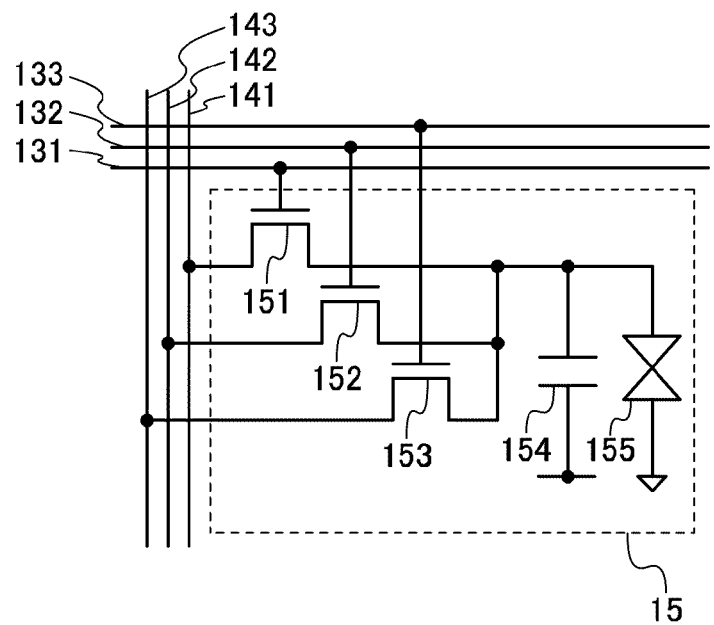
FIG. 1B illustrates a configuration example of a pixel.

FIG. 1B illustrates an example of a circuit configuration of the pixel 15. The pixel 15 in FIG. 1B includes a transistor 151, a transistor 152, a transistor 153, a capacitor 154, and a liquid crystal element 155. A gate of the transistor 151 is electrically connected to the scan line 131. One of a source and a drain of the transistor 151 is electrically connected to the signal line 141. A gate of the transistor 152 is electrically connected to the scan line 132. One of a source and a drain of the transistor 152 is electrically connected to the signal line 142. A gate of the transistor 153 is electrically connected to the scan line 133. One of a source and a drain of the transistor 153 is electrically connected to the signal line 143. One electrode of the capacitor 154 is electrically connected to the other of the source and the drain of each of the transistors 151 to 153. The other electrode of the capacitor 154 is electrically connected to a wiring that supplies a capacitor potential. One electrode of the liquid crystal element 155 is electrically connected to the other of the source and the drain of each of the transistors 151 to 153 and one electrode of the capacitor 154. The other electrode of the liquid crystal element 155 is electrically connected to a wiring that supplies a counter potential.

(Structural Example of Scan Line Driver Circuit 11)

Figure 2:
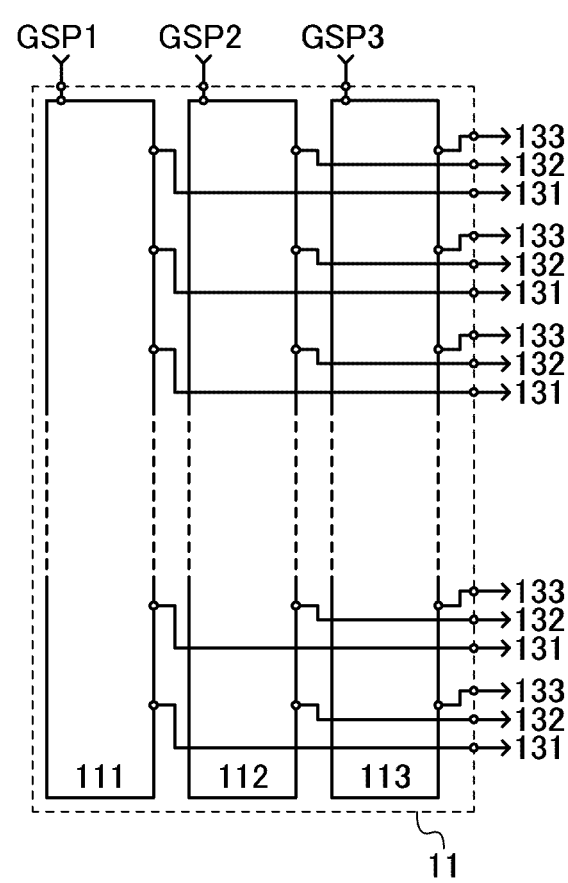
FIG. 2 illustrates a structural example of a scan line driver circuit.

FIG. 2 illustrates a structural example of the scan line driver circuit 11 included in the liquid crystal display device in FIG. 1A. The scan line driver circuit 11 illustrated in FIG. 2 includes three shift registers 111 to 113 each having 3n output terminals. Each output terminal of the shift register 111 is electrically connected to one of the 3n scan lines 131 placed in the pixel portion 10. Each output terminal of the shift register 112 is electrically connected to one of the 3n scan lines 132 placed in the pixel portion 10. Each output terminal of the shift register 113 is electrically connected to one of the 3n scan lines 133 placed in the pixel portion 10. In other words, the shift register 111 drives the scan lines 131; the shift register 112 drives the scan lines 132; and the shift register 113 drives the scan lines 133. Specifically, the shift register 111 has a function of sequentially shifting selection signals from the scan line 131 in a first row (i.e., a function of sequentially selecting the scan lines 131 every ½ cycle of the clock signal (GCK)) by using the first start signal (GSP1) input from the outside, as a trigger. The shift register 112 has a function of sequentially shifting selection signals from the scan line 132 in the first row, by using the second start signal (GSP2) input from the outside, as a trigger. The shift register 113 has a function of sequentially shifting selection signals from the scan line 133 in the first row, by using the third start signal (GSP3) input from the outside, as a trigger.

(Operation Example of Scan Line Driver Circuit 11)

An operation example of the scan line driver circuit 11 will be described with reference to FIG. 3. FIG. 3 shows the clock signal (GCK), signals (SR111out) output from the 3n output terminals of the shift register 111, signals (SR112out) output from the 3n output terminals of the shift register 112, and signals (SR113out) output from the 3n output terminals of the shift register 113. Here, a sampling period means a period required to input any image signals to all pixels arranged in all the rows (from the first row to the 3n-th row).

In a sampling period (t1), in the shift register 111, high-level potentials are sequentially shifted every ½ clock cycle (every horizontal scan period) from the scan line 131 in the first row to the scan line 131 in an n-th row. In the shift register 112, high-level potentials are sequentially shifted every ½ clock cycle (every horizontal scan period) from the scan line 132 in an (n+1)th row to the scan line 132 in a 2n-th row. In the shift register 113, high-level potentials are sequentially shifted every ½ clock cycle (every horizontal scan period) from the scan line 133 in a (2n+1)th row to the scan line 133 in a 3n-th row. Accordingly, the scan line driver circuit 11 sequentially selects m pixels 15 in the first row to m pixels 15 in the n-th row through the scan lines 131, sequentially selects m pixels 15 in the (n+1)th row to m pixels 15 in the 2n-th row through the scan lines 132, and sequentially selects m pixels 15 in the (2n+1)th row to m pixels 15 in the 3n-th row through the scan lines 133. That is, the scan line driver circuit 11 can supply selection signals to 3m pixels 15 provided in three different rows every horizontal scan period.

In a sampling period (t2), although output signals of the shift registers 111 to 113 are different from those in the sampling period (t1), the following operations are the same as those in the sampling period (t1). That is, one of the shift registers 111 to 113 (the shift register 113 in the sampling period (t2)) sequentially selects m pixels 15 in the first row to m pixels 15 in the n-th row; another one of the shift registers 111 to 113 (the shift register 111 in the sampling period (t2)) sequentially selects m pixels 15 in the (n+1)th row to m pixels 15 in the 2n-th row; and the other of the shift registers 111 to 113 (the shift register 112 in the sampling period (t2)) sequentially selects m pixels 15 in the (2n+1)th row to m pixels 15 in the 3n-th row. In other words, as in the sampling period (t1), the scan line driver circuit 11 can supply selection signals to 3m pixels 15 in given three rows every horizontal scan period.

(Structural Example of Signal Line Driver Circuit 12)

Figure 4A:
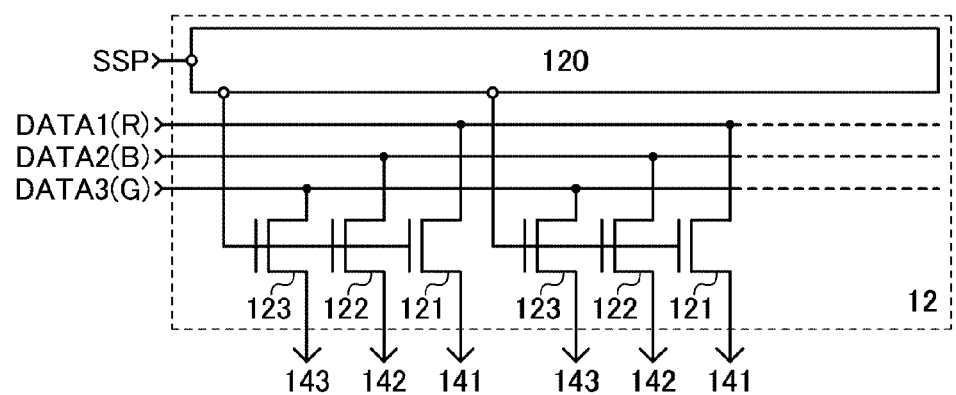
FIG. 4A illustrates a structural example of a signal line driver circuit.

FIG. 4A illustrates a structural example of the signal line driver circuit 12 included in the liquid crystal display device in FIG. 1A. The signal line driver circuit 12 in FIG. 4A includes a shift register 120 having m output terminals, m transistors 121, m transistors 122, and m transistors 123. A gate of the transistor 121 is electrically connected to the j-th output terminal (j is a natural number of 1 or more and m or less) of the shift register 120. One of a source and a drain of the transistor 121 is electrically connected to a wiring that supplies the first image signal (DATA1). The other of the source and the drain of the transistor 121 is electrically connected to the signal line 141 in the j-th column in the pixel portion 10. A gate of the transistor 122 is electrically connected to the j-th output terminal of the shift register 120. One of a source and a drain of the transistor 122 is electrically connected to a wiring that supplies the second image signal (DATA2). The other of the source and the drain of the transistor 122 is electrically connected to the signal line 142 in the j-th column in the pixel portion 10. A gate of the transistor 123 is electrically connected to the j-th output terminal of the shift register 120. One of a source and a drain of the transistor 123 is electrically connected to a wiring that supplies the third image signal (DATA3). The other of the source and the drain of the transistor 123 is electrically connected to the signal line 143 in the j-th column in the pixel portion 10.

Note that here, as the first image signal (DATA1), a red (R) image signal (an image signal for controlling transmission of red (R) light) is supplied to the signal line 141. As the second image signal (DATA2), a blue (B) image signal (an image signal for controlling transmission of blue (B) light) is supplied to the signal line 142. As the third image signal (DATA3), a green (G) image signal (an image signal for controlling transmission of green (G) light) is supplied to the signal line 143.

(Structural Example of Backlight)

Figure 4B:
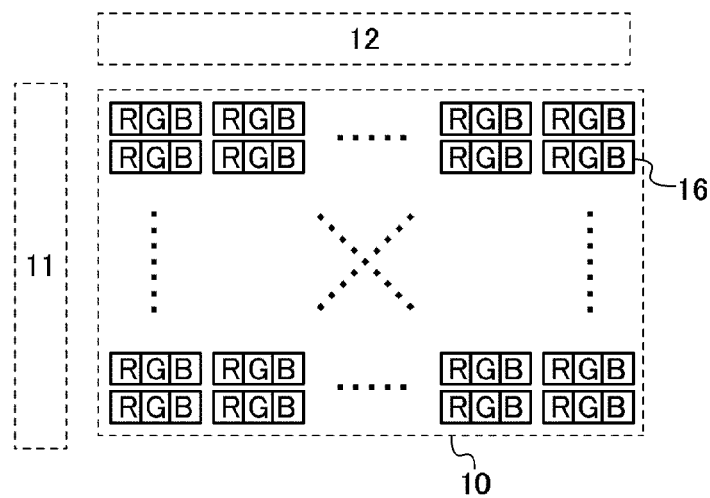
FIG. 4B illustrates a structural example of a backlight.

FIG. 4B illustrates a structural example of a backlight provided behind the pixel portion 10 in the liquid crystal display device illustrated in FIG. 1A. The backlight in FIG. 4B includes a plurality of backlight units 16 each including light sources that emit lights of three colors of red (R), green (G), and blue (B). The plurality of backlight units 16 are arranged in matrix, and lighting of the backlight units can be controlled in each given region. Here, as the backlight for the plurality of pixels 15 of 3n rows and m columns, a backlight unit group is provided at least every k rows and m columns (here, k is n/4), and it is possible to control lighting of these backlight unit groups independently. That is, the backlight includes at least a backlight unit group for first to k-th rows to a backlight unit group for (3n−k+1)th to 3n-th rows, and it is possible to control lighting of each backlight unit group independently.

(Operation Example of Liquid Crystal Display Device)

Figure 5:
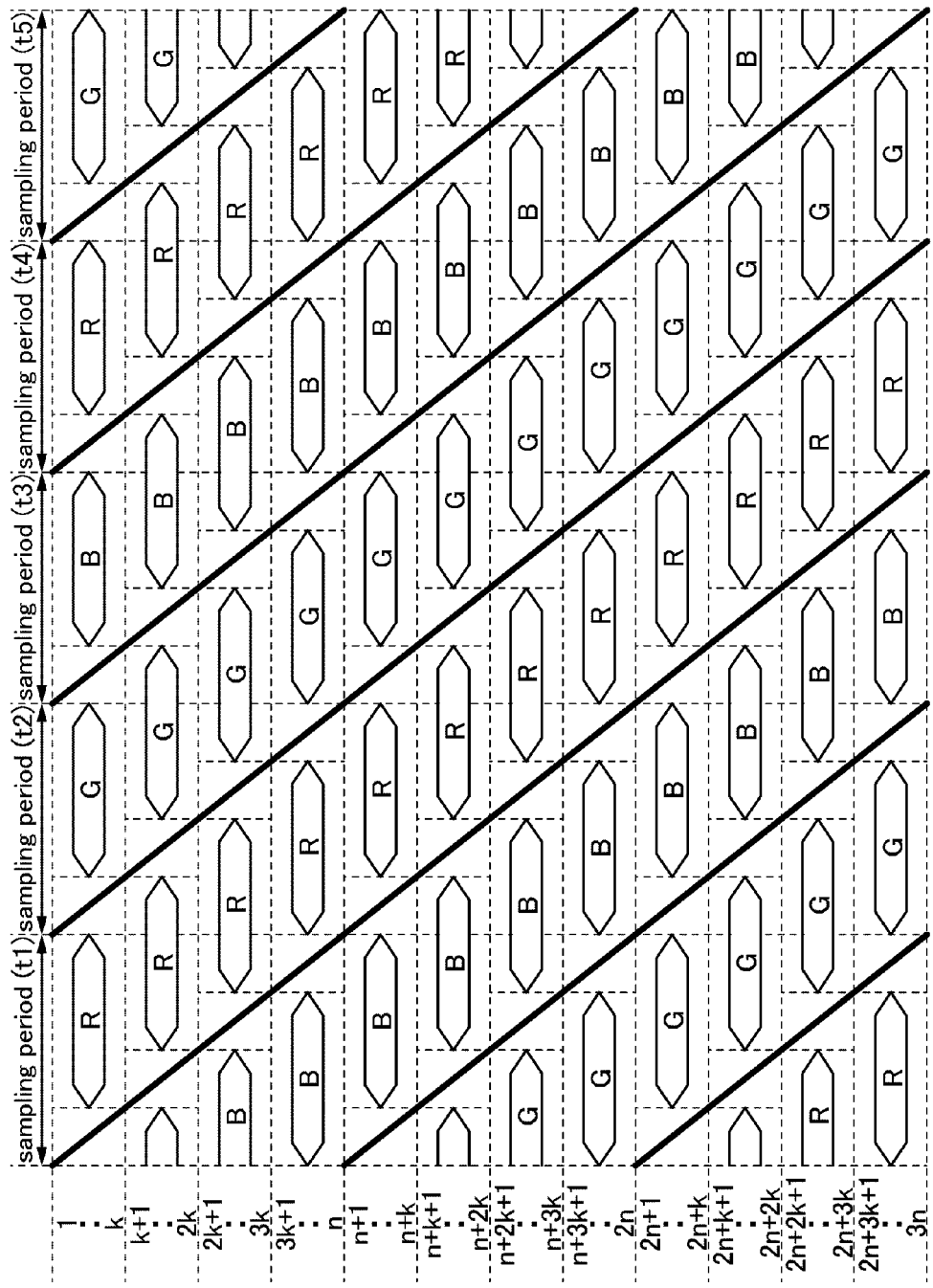
FIG. 5 illustrates an operation example of a liquid crystal display device.

FIG. 5 illustrates timings of lighting of the backlight unit group for the first to k-th rows to the backlight unit group for the (3n−k+1)th to 3n-th rows that are included in the backlight, and timings of supply of image signals to from m pixels in the first row to m pixels in the 3n-th row in the pixel portion 10 in the above liquid crystal display device. Specifically, in FIG. 5, "1" to "3n" indicate the number of rows and solid lines indicate timing of input of image signals to rows. In the liquid crystal display device, image signals can be input to each pixel in the sampling period (t1) in the following manner: m pixels 15 in the first row to m pixels 15 in the n-th row are sequentially selected; m pixels 15 in the (n+1)th row to m pixels 15 in the 2n-th row are sequentially selected; and m pixels 15 in the (2n+1)th row to m pixels 15 in the 3n-th row are sequentially selected. Specifically, in the liquid crystal display device, in the sampling period (t1), transistors 151 included in the m pixels 15 in the first row to transistors 151 included in the m pixels 15 in the n-th row are sequentially turned on through the scan lines 131 so that red (R) image signals can be sequentially input to the pixels through the signal line 141; transistors 152 included in the m pixels 15 in the (n+1)th row to transistors 152 included in the m pixels 15 in the 2n-th row are sequentially turned on through the scan lines 132 so that blue (B) image signals can be sequentially input to the pixels through the signal line 142; and transistors 153 included in the m pixels 15 in the (2n+1)th row to transistors 153 included in the m pixels 15 in the 3n-th row are sequentially turned on through the scan lines 133 so that green (G) image signals can be sequentially input to the pixels through the signal line 143.

Further, in the liquid crystal display device, in the sampling period (t1), red (R) light can be emitted from the backlight unit group for the first to k-th rows after input of red (R) image signals to the m pixels 15 in the first row to the m pixels 15 in the n-th row is finished; blue (B) light can be emitted from the backlight unit group for the (n+1)th to (n+k)th rows after input of blue (B) image signals to the m pixels 15 in the (n+1)th row to the m pixels 15 in the (n+k)th row is finished; and green (G) light can be emitted from the backlight unit group for the (2n+1)th to (2n+k)th rows after input of green (G) image signals to the m pixels 15 in the (2n+1)th row to the m pixels 15 in the 2(n+k)th row is finished. That is, in the liquid crystal display device, supply of selection signals and supply of light of a given color can be concurrently performed in each region (in the first to n-th rows, the (n+1)th to 2n-th rows, and the (2n+1)th to 3n-th rows).

(Liquid Crystal Display Device Disclosed in this Specification)

In the liquid crystal display device disclosed in this specification, image signals can be concurrently supplied to pixels placed in a plurality of rows among the pixels arranged in matrix. Thus, the frequency of input of an image signal to each pixel can be increased without change in response speed of a transistor or the like included in the liquid crystal display device. Specifically, in the liquid crystal display device, the frequency of input of an image signal to each pixel can be tripled without change in clock frequency or the like of the scan line driver circuit. In other words, the liquid crystal display device is preferably applied to a field-sequential liquid crystal display device or a liquid crystal display device driven by high frame rate driving.

The liquid crystal display device disclosed in this specification is preferably applied to a field-sequential liquid crystal display device because of the following reasons. As described above, in a field-sequential liquid crystal display device, a display period is divided between lights of given colors. For that reason, display perceived by a user is sometimes changed (degraded) from display based on original display data (such a phenomenon is also referred to as color breaks) because of a lack of a given piece of display data due to temporary interruption of display, such as a blink of the user. An increase in frame frequency is effective in reducing color breaks. Further, in order to display images by a field sequential method, the frequency of input of an image signal to each pixel needs to be higher than the frame frequency. For that reason, in the case where images are displayed with a field sequential method and high frame frequency driving in a conventional liquid crystal display device, requirements for performance (high-speed response) of elements in the liquid crystal display device are extremely strict. In contrast, in the liquid crystal display device disclosed in this specification, the frequency of input of an image signal to each pixel can be increased regardless of characteristics of elements. Therefore, color breaks in the field-sequential liquid crystal display device can be easily suppressed.

In addition, in the case where images are displayed by a field sequential method, it is preferable that backlight unit groups concurrently emit lights of different colors in regions as illustrated in FIG. 5 because of the following reasons. In the case where light of one color is supplied for the entire screen, the pixel portion only has data on a specific color at a given moment. Therefore, a lack of display data in a given period due to a blink of the user or the like corresponds to a lack of data on a specific color. In contrast, in the case where backlight units emit lights of different colors in regions, the pixel portion has data on the colors at a given moment. Therefore, a lack of display data in a given period due to a blink of the user or the like does not correspond to a lack of data on a specific color. In other words, color breaks can be reduced when backlight units emit lights of different colors in regions. Furthermore, in the case where the backlight unit groups are lit as illustrated in FIG. 5, adjacent backlight unit groups do not emit light of a different color. Specifically, in the sampling period (t1), when the backlight unit group for the (n+1)th to (n+k)th rows emits blue (B) light after input of blue (B) image signals to the m pixels 15 in the (n+1)th row to the m pixels 15 in the (n+k)th row is finished, the backlight unit group for the (3k+1)th to n-th rows and the backlight unit group for the (n+k+1)th to (n+2k)th rows emit blue (B) light or do not emit light at all (i.e., do not emit either red (R) light or green (G) light). Thus, it is possible to decrease the probability that light with a color other than a specific color is transmitted through a pixel to which image data of the specific color is input.

(Variations)

The liquid crystal display device having the above-described structure is one embodiment of the present invention; the present invention further includes a liquid crystal display device that is different from the liquid crystal display device having the above-described structure.

For example, the above liquid crystal display device has the structure in which image signals are concurrently supplied to 3m pixels in given three rows in the pixel portion 10; however, the liquid crystal display device of the present invention is not limited to having this structure. That is, in the liquid crystal display device of the present invention, image signals can be concurrently supplied to a plurality of pixels in given plural rows in the pixel portion 10. Note that it is obvious that in the case where the number of rows is changed, the number of shift registers and the number of rows need to the same.

The liquid crystal display device has the structure in which image signals are concurrently supplied to pixels in given three rows provided at regular intervals (the interval between the rows supplied with image signals corresponds to n rows of pixels); however, the liquid crystal display device of the present invention is not limited to having this structure. That is, the liquid crystal display device of the present invention can have a structure in which image signals are concurrently supplied to pixels in given three rows provided at irregular intervals. Specifically, the liquid crystal display device can have a structure in which image signals are concurrently supplied to m pixels in the first row, m pixels in an (a+1)th row (a is a natural number), and m pixels in an (a+b+1)th row (b is a natural number other than a).

Moreover, in the liquid crystal display device, the scan line driver circuit is constituted by a shift register; the shift register can be replaced with a circuit having an equivalent function. For example, the shift register can be replaced with a decoder.

In the liquid crystal display device, light sources each emitting one of red (R) light, green (G) light, and blue (B) light are used for the backlight; however, the liquid crystal display device of the present invention is not limited to having this structure. That is, in the liquid crystal display device of the present invention, light sources that emit lights of given colors can be used in combination. For example, it is possible to use a combination of four kinds of light sources of red (R), green (G), blue (B), and white (W); or a combination of three kinds of light sources of cyan, magenta, and yellow. Moreover, it is possible to use a combination of six kinds of light sources of pale red (R), pale green (G), pale blue (B), dark red (R), dark green (G), and dark blue (B); or a combination of six kinds of light sources of red (R), green (G), blue (B), cyan, magenta, and yellow. In such a manner, with a combination of lights of a wider variety of colors, the color gamut of the liquid crystal display device can be enlarged, and the image quality can be improved.

The liquid crystal display device includes the capacitor for holding a voltage applied to the liquid crystal element (see FIG. 1B); alternatively, it is possible to employ a structure in which the capacitor is not provided.

In the liquid crystal display device, light sources that emit lights of three colors of red (R), green (G), and blue (B) are aligned linearly and horizontally as the backlight unit (see FIG. 4B); however, the structure of the backlight unit is not limited to this. For example, light sources that emit lights of three colors may be arranged in triangle or aligned linearly and vertically, or a red (R) light source, a green (G) light source, and a blue (B) light source may be separately provided. Further, the liquid crystal display device includes a direct-type backlight as the backlight (see FIG. 4B); alternatively, an edge-lit backlight can be used as the backlight.

Embodiment 2

In this embodiment, an example of a field-sequential liquid crystal display device having a structure different from that in Embodiment 1 will be described with reference to FIGS. 6A to 6D, FIGS. 7A and 7B, and FIG. 8.

(Structural Example of Liquid Crystal Display Device)

Figure 6A:
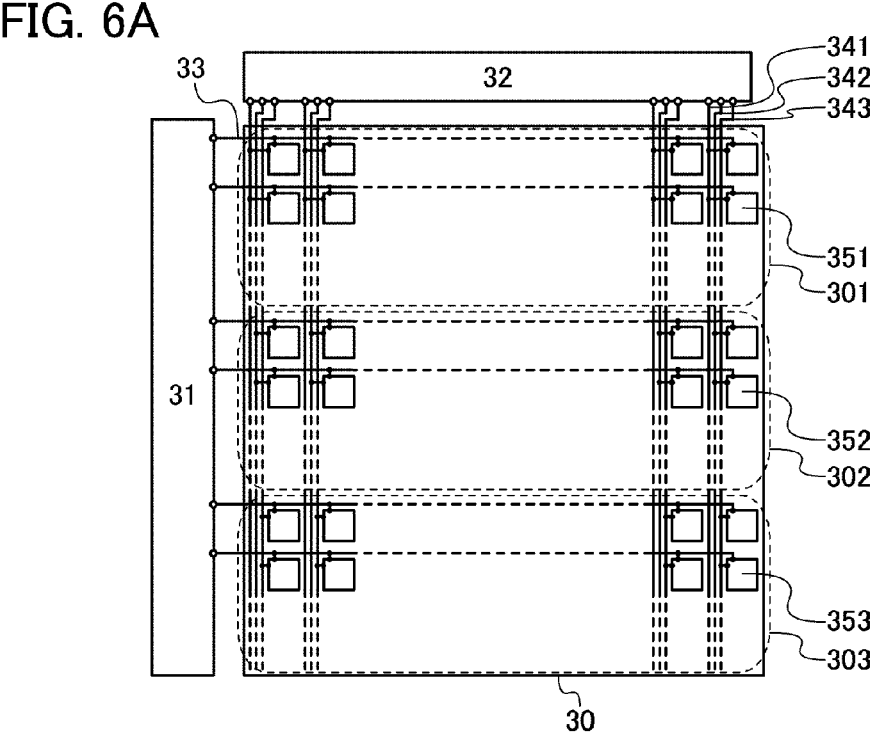
FIG. 6A illustrates a structural example of a liquid crystal display device, and FIGS. 6B to 6D each illustrate a configuration example of a pixel.

FIG. 6A illustrates a structural example of a liquid crystal display device. The liquid crystal display device in FIG. 6A includes a pixel portion 30; a scan line driver circuit 31; a signal line driver circuit 32; 3n scan lines 33 (n is a natural number of 2 or more) arranged parallel or approximately parallel to each other; and m signal lines 341, m signal lines 342, and m signal lines 343 (m is a natural number of 2 or more) arranged parallel or approximately parallel to each other. The potentials of the scan lines 33 are controlled by the scan line driver circuit 31. The potentials of the signal lines 341, 342, and 343 are controlled by the signal line driver circuit 32.

The pixel portion 30 is divided into three regions (regions 301 to 303), and each region includes a plurality of pixels arranged in matrix (n rows and m columns). Each of the scan lines 33 is electrically connected to m pixels arranged in a given row among the plurality of pixels arranged in matrix (3n rows and m columns) in the pixel portion 30. Each of the signal lines 341 is electrically connected to n pixels arranged in a given column among the plurality of pixels arranged in matrix (n rows and m columns) in the region 301. Each of the signal lines 342 is electrically connected to n pixels arranged in a given column among the plurality of pixels arranged in matrix (n rows and m columns) in the region 302. Each of the signal lines 343 is electrically connected to n pixels arranged in a given column among the plurality of pixels arranged in matrix (n rows and m columns) in the region 303.

To the scan line driver circuit 31, a start signal (GSP) for the scan line driver circuit, a clock signal (GCK) for the scan line driver circuit, and drive power supplies such as a high power supply potential and a low power supply potential are input from the outside. To the signal line driver circuit 32, signals such as a start signal (SSP) for the signal line driver circuit, a clock signal (SCK) for the signal line driver circuit, and image signals (data1 to data3) and drive power supplies such as a high power supply potential and a low power supply potential are input from the outside.

Figure 6B:
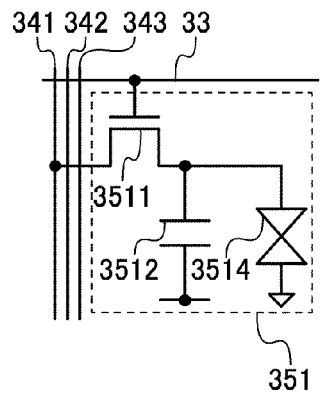
Figure 6C:
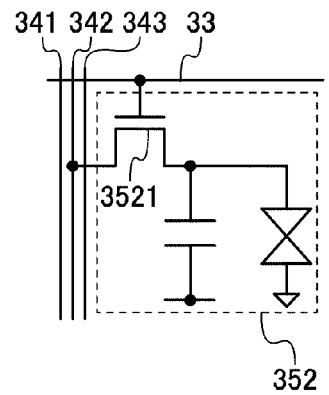
Figure 6D:
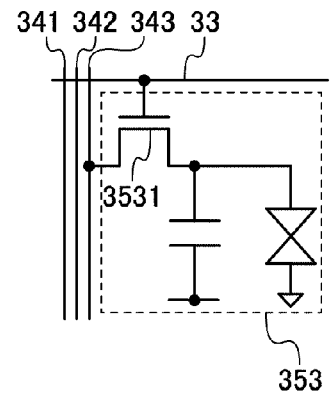

FIGS. 6B to 6D each illustrate an example of a circuit configuration of the pixel. Specifically, FIG. 6B illustrates an example of a circuit configuration of a pixel 351 placed in the region 301; FIG. 6C illustrates an example of a circuit configuration of a pixel 352 placed in the region 302; and FIG. 6D illustrates an example of a circuit configuration of a pixel 353 placed in the region 303. The pixel 351 in FIG. 6B includes a transistor 3511, a capacitor 3512, and a liquid crystal element 3514. A gate of the transistor 3511 is electrically connected to the scan line 33. One of a source and a drain of the transistor 3511 is electrically connected to the signal line 341. One electrode of the capacitor 3512 is electrically connected to the other of the source and the drain of the transistor 3511. The other electrode of the capacitor 3512 is electrically connected to a wiring that supplies a capacitor potential. One electrode of the liquid crystal element 3514 is electrically connected to the other of the source and the drain of the transistor 3511 and one electrode of the capacitor 3512. The other electrode of the liquid crystal element 3514 is electrically connected to a wiring that supplies a counter potential.

The pixel 352 in FIG. 6C and the pixel 353 in FIG. 6D have the same circuit configuration as the pixel 351 in FIG. 6B. Note that the pixel 352 in FIG. 6C is different from the pixel 351 in FIG. 6B in that one of a source and a drain of a transistor 3521 is electrically connected to the signal line 342 instead of the signal line 341. The pixel 353 in FIG. 6D is different from the pixel 351 in FIG. 6B in that one of a source and a drain of the transistor 3531 is electrically connected to the signal line 343 instead of the signal line 341.

(Structural Example of Scan Line Driver Circuit 31)

Figure 7A:
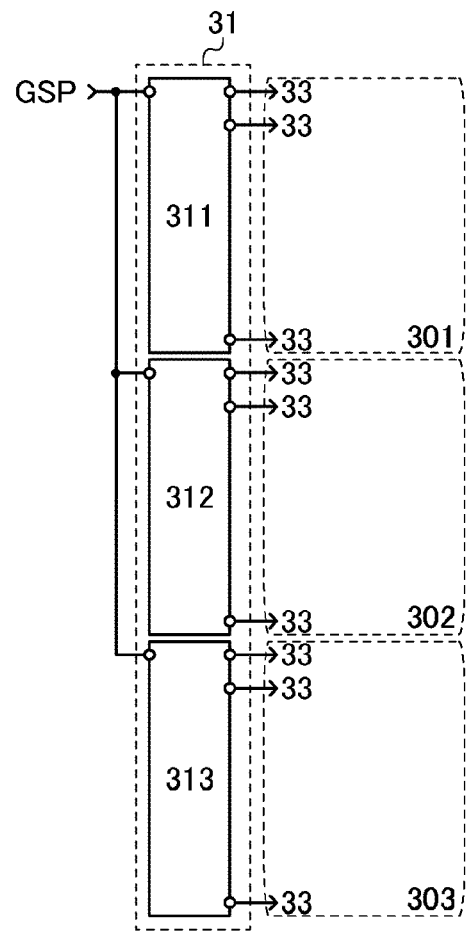
FIG. 7A illustrates a structural example of a scan line driver circuit.

FIG. 7A illustrates a structural example of the scan line driver circuit 31 included in the liquid crystal display device in FIG. 6A. The scan line driver circuit 31 illustrated in FIG. 7A includes three shift registers 311 to 313 each having n output terminals. Each output terminal of the shift register 311 is electrically connected to one of n scan lines 33 placed in the region 301. Each output terminal of the shift register 312 is electrically connected to one of n scan lines 33 placed in the region 302. Each output terminal of the shift register 313 is electrically connected to one of n scan lines 33 placed in the region 303. In other words, the shift register 311 supplies selection signals in the region 301; the shift register 312 supplies selection signals in the region 302; and the shift register 313 supplies selection signals in the region 303. Specifically, the shift register 311 has a function of sequentially shifting selection signals from the scan line 33 in a first row (i.e., a function of sequentially selecting the scan lines 33 every ½ cycle of the clock signal (GCK)) by using the start signal (GSP) input from the outside, as a trigger. The shift register 312 has a function of sequentially shifting selection signals from the scan line 33 in an (n+1)-th row, by using the start signal (GSP) input from the outside, as a trigger. The shift register 313 has a function of sequentially shifting selection signals from the scan line 33 in a (2n+1)-th row, by using the start signal (GSP) input from the outside, as a trigger.

(Operation Example of Scan Line Driver Circuit 31)

Figure 7B:
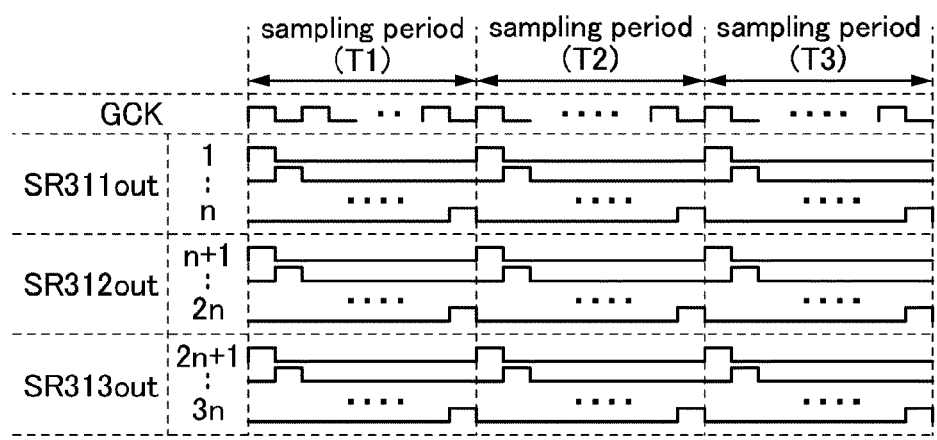
FIG. 7B illustrates output signals of shift registers.

An operation example of the scan line driver circuit 31 will be described with reference to FIG. 7B. FIG. 7B shows the clock signal (GCK), signals (SR311out) output from the n output terminals of the shift register 311, signals (SR312out) output from the n output terminals of the shift register 312, and signals (SR313out) output from the n output terminals of the shift register 313.

In a sampling period (T1), in the shift register 311, high-level potentials are sequentially shifted every ½ clock cycle (every horizontal scan period) from the scan line 33 in the first row to the scan line 33 in an n-th row. In the shift register 312, high-level potentials are sequentially shifted every ½ clock cycle (every horizontal scan period) from the scan line 33 in an (n+1)th row to the scan line 33 in a 2n-th row. In the shift register 313, high-level potentials are sequentially shifted every ½ clock cycle (every horizontal scan period) from the scan line 33 in a (2n+1)th row to the scan line 33 in a 3n-th row. Accordingly, the scan line driver circuit 31 sequentially selects m pixels 351 in the first row to m pixels 351 in the n-th row, sequentially selects m pixels 352 in the (n+1)th row to m pixels 352 in the 2n-th row, and sequentially selects m pixels 353 in the (2n+1)th row to m pixels 353 in the 3n-th row through the scan lines 33. That is, the scan line driver circuit 31 can supply selection signals to 3m pixels provided in three different rows every horizontal scan period.

In a sampling period (T2) and a sampling period (T3), the operations of the shift registers 311 to 313 are the same as the operations in the sampling period (T1). That is, as in the sampling period (T1), the scan line driver circuit 31 can supply selection signals to 3m pixels provided in given three rows every horizontal scan period.

(Structural Example of Signal Line Driver Circuit 32)

Figure 8:
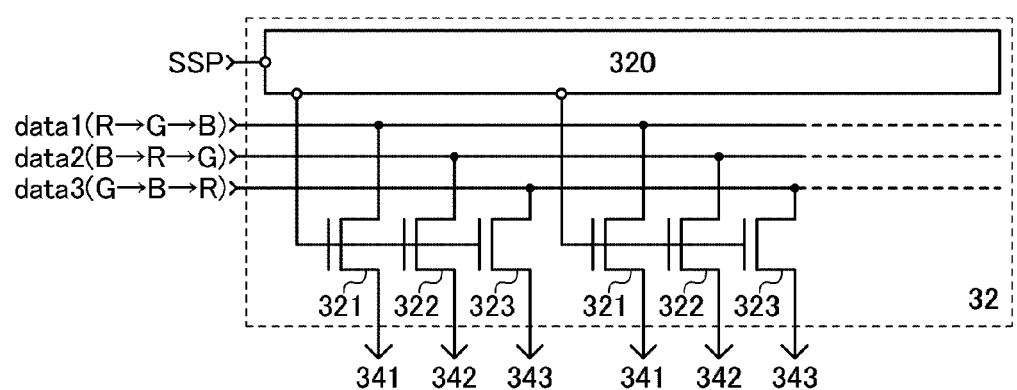
FIG. 8 illustrates a structural example of a signal line driver circuit.

FIG. 8 illustrates a structural example of the signal line driver circuit 32 included in the liquid crystal display device in FIG. 6A. The signal line driver circuit 32 in FIG. 8 includes a shift register 320 having m output terminals, m transistors 321, m transistors 322, and m transistors 323. A gate of the transistor 321 is electrically connected to the j-th output terminal (j is a natural number of 1 to m) of the shift register 320. One of a source and a drain of the transistor 321 is electrically connected to a wiring that supplies the first image signal (data1). The other of the source and the drain of the transistor 321 is electrically connected to the signal line 341 in the j-th column in the pixel portion 30. A gate of the transistor 322 is electrically connected to the j-th output terminal of the shift register 320. One of a source and a drain of the transistor 322 is electrically connected to a wiring that supplies the second image signal (data2). The other of the source and the drain of the transistor 322 is electrically connected to the signal line 342 in the j-th column in the pixel portion 30. A gate of the transistor 323 is electrically connected to the j-th output terminal of the shift register 320. One of a source and a drain of the transistor 323 is electrically connected to a wiring that supplies the third image signal (data3). The other of the source and the drain of the transistor 323 is electrically connected to the signal line 343 in the j-th column in the pixel portion 30.

Note that here, as the first image signal (data1), a red (R) image signal (an image signal for controlling transmission of red (R) light), a green (G) image signal (an image signal for controlling transmission of green (G) light), and a blue (B) image signal (an image signal for controlling transmission of blue (B) light) are supplied to the signal line 341 in the sampling period (T1), the sampling period (T2), and the sampling period (T3), respectively. As the second image signal (data2), a blue (B) image signal, a red (R) image signal, and a green (G) image signal are supplied to the signal line 342 in the sampling period (T1), the sampling period (T2), and the sampling period (T3), respectively. As the third image signal (data3), a green (G) image signal, a blue (B) image signal, and a red (R) image signal are supplied to the signal line 343 in the sampling period (T1), the sampling period (T2), and the sampling period (T3), respectively.

(Structural Example of Backlight)

As a backlight of the liquid crystal display device in this embodiment, the backlight shown in Embodiment 1 can be used; therefore, the above description is to be referred to here.

(Operation Example of Liquid Crystal Display Device)

The liquid crystal display device in this embodiment can perform operations similar to those of the liquid crystal display device in Embodiment 1 (see FIG. 5). That is, in the liquid crystal display device in this embodiment, image signals can be input to each pixel in the sampling period (T1) in the following manner: m pixels 351 in the first row to m pixels 351 in the n-th row are sequentially selected, m pixels 352 in the (n+1)th row to m pixels 352 in the 2n-th row are sequentially selected, and m pixels 353 in the (2n+1)th row to m pixels 353 in the 3n-th row are sequentially selected.

As in the liquid crystal display device shown in Embodiment 1, in the liquid crystal display device of this embodiment, supply of selection signals and supply of light of a given color can be concurrently performed in each region (in the first to n-th rows, the (n+1)th to 2n-th rows, and the (2n+1)th to 3n-th rows).

(Liquid Crystal Display Device in this Embodiment)

The liquid crystal display device in this embodiment has functions similar to those of the liquid crystal display device described in Embodiment 1. Further, the aperture ratio of the liquid crystal display device in this embodiment can be increased by the reduction in the number of scan lines provided in the pixel portion and the reduction in the number of transistors provided in each pixel, as compared to the liquid crystal display device in Embodiment 1. Moreover, the reduction in the number of scan lines provided in the pixel portion can reduce parasitic capacitance generated when a signal line and a scan line overlap with each other; thus, the signal line can be driven at high speed. In addition, the area of the scan line driver circuit can be reduced, and the number of signals necessary for operating the scan line driver circuit can be reduced (i.e., it is not necessary to supply different start signals for the scan line driver circuit to a plurality of shift registers).

(Variations)

The liquid crystal display device in this embodiment is one embodiment of the present invention; the present invention further includes a liquid crystal display device that is different from the liquid crystal display device. For example, the liquid crystal display device in this embodiment can have any of the structures shown as the variations in Embodiment 1. Specifically, the shift register included in the liquid crystal display device in this embodiment can be replaced with a circuit having an equivalent function (e.g., a decoder), for example.

In addition, the liquid crystal display device in this embodiment has the structure in which the pixel portion 30 is divided into three regions; however, the liquid crystal display device in this embodiment is not limited to having this structure. That is, in the liquid crystal display device in this embodiment, the pixel portion 30 can be divided into given plural regions. Note that it is obvious that in the case where the number of regions is changed, the number of shift registers and the number of rows need to be the same.

In the liquid crystal display device in this embodiment, the number of pixels is the same in three regions (i.e., each of the regions includes pixels of n rows and m columns); alternatively, the number of pixels can vary between regions. Specifically, a first region can include pixels of c rows and m columns (c is a natural number) and a second region can include pixels of d rows and m columns (d is a natural number other than c).

Embodiment 3

In this embodiment, a specific structure of the liquid crystal display device described in Embodiment 1 or 2 will be described.

(Example of Transistor Provided in Pixel)

In the liquid crystal display device in Embodiment 1, a plurality of transistors are provided in each pixel. Input of an image signal to the pixel is controlled by sequentially using the plurality of transistors. Thus, image signals can be concurrently supplied to pixels placed in a plurality of rows. Note that in the liquid crystal display device, the leakage of an image signal held at a pixel is accordingly increased in accordance with the increase in the number of transistors provided in the pixel. For that reason, in the liquid crystal display device, a transistor with excellent off-state characteristics (with low off-state current) is preferably used as the transistor provided in each pixel. An example of a transistor that is suitable for the transistor will be described below with reference to FIG. 9. Specifically, a transistor including a channel formation region formed using an oxide semiconductor will be described. The off-state current of the transistor can be extremely reduced when the oxide semiconductor is purified (which is described below in detail). The transistor can also be used for forming the scan line driver circuit. In that case, reduction in cost and increase in yield due to reduction in the number of manufacturing steps can be achieved.

Note that the band gap of the oxide semiconductor is 3.0 eV to 3.5 eV. The band gap of silicon carbide and the band gap of gallium nitride are 3.26 eV and 3.39 eV, respectively, which are about three times that of silicon. Therefore, compound semiconductors such as silicon carbide and gallium nitride are similar to the oxide semiconductor in that they are both wide band gap semiconductors. The wider band gap is advantageous in increasing the withstand voltage of a signal processing circuit, reducing loss of power, and the like.

Compound semiconductors such as silicon carbide and gallium nitride are required to be single crystal, and it is difficult to meet the manufacturing conditions for obtaining a single crystal material; for example, crystal needs to grow at a temperature that is much higher than the process temperature of the oxide semiconductor, and epitaxial growth over a special substrate is necessary. Such conditions do not allow film formation of any of these compound semiconductors over a silicon wafer that can be obtained easily or a glass substrate whose allowable temperature limit is low. Therefore, an inexpensive substrate cannot be used, and further, the substrate cannot be increased in size, so that the productivity of signal processing circuits using the compound semiconductor such as silicon carbide or gallium nitride is low. In contrast, the oxide semiconductor can be deposited with heat treatment at 300° C. to 850° C., that is, can be deposited over a glass substrate. Moreover, a semiconductor element formed using the oxide semiconductor can be stacked over an integrated circuit.

Figure 9:
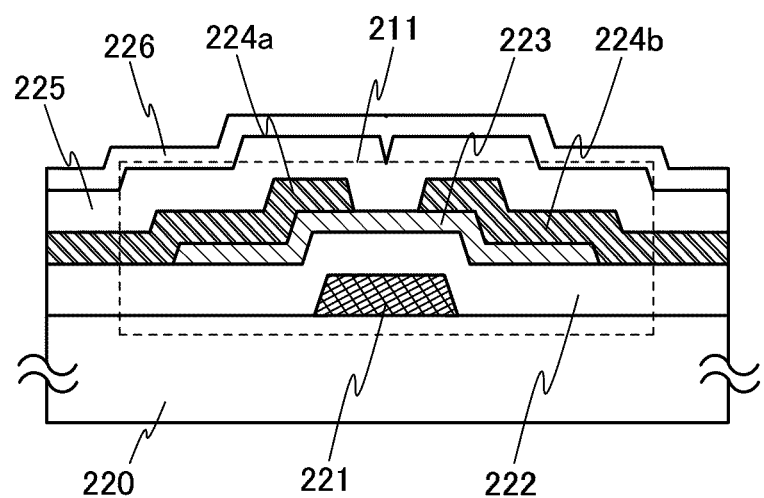
FIG. 9 is a cross-sectional view illustrating an example of a transistor.

A transistor 211 illustrated in FIG. 9 includes a gate layer 221 provided over a substrate 220 having an insulating surface, a gate insulating layer 222 provided over the gate layer 221, an oxide semiconductor layer 223 provided over the gate insulating layer 222, and a source layer 224a and a drain layer 224b provided over the oxide semiconductor layer 223. Moreover, FIG. 9 illustrates an insulating layer 225 that covers the transistor 211 and is in contact with the oxide semiconductor layer 223, and a protective insulating layer 226 provided over the insulating layer 225.

As described above, the transistor 211 in FIG. 9 includes the oxide semiconductor layer 223 as a semiconductor layer. Examples of an oxide semiconductor used for the oxide semiconductor layer 223 are an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are oxides of three metal elements; an In—Ga—O-based oxide semiconductor, an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, and an In—Mg—O-based oxide semiconductor which are oxides of two metal elements; and an In—O-based oxide semiconductor, a Sn—O-based oxide semiconductor, and a Zn—O-based oxide semiconductor which are oxides of one metal element. Further, $SiO_2$ may be contained in the above oxide semiconductor. Here, for example, an In—Ga—Zn—O-based oxide semiconductor is an oxide containing at least In, Ga, and Zn, and there is no particular limitation on the composition ratio of the elements. An In—Ga—Zn—O-based oxide semiconductor may contain an element other than In, Ga, and Zn.

As the oxide semiconductor layer 223, a thin film expressed by a chemical formula of $InMO_3(ZnO)_m$ (m>0) can be used. Here, M represents one or more metal elements selected from Ga, Al, Mn, and Co. For example, M can be Ga, Ga and Al, Ga and Mn, or Ga and Co.

In the case where an In—Zn—O-based material is used as an oxide semiconductor, a target to be used has a composition ratio of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), further preferably In:Zn=15:1 to 1.5:1 in an atomic ratio ($In_2O_3$:ZnO=15:2 to 3:4 in a molar ratio). For example, when a target used for forming an In—Zn—O-based oxide semiconductor has an atomic ratio of In:Zn:O=X:Y:Z, the relation of Z>(1.5X+Y) is satisfied.

The above-described oxide semiconductor is an oxide semiconductor that is purified and made to be electrically i-type (intrinsic) as follows: an impurity such as hydrogen, moisture, a hydroxyl group, or hydride (also referred to as a hydrogen compound), which is a factor of variation in electric characteristics, is intentionally eliminated in order to prevent variation in electric characteristics.

Therefore, it is preferable that the oxide semiconductor contain as little hydrogen as possible. Moreover, the number of carriers derived from hydrogen, oxygen vacancy, and the like is extremely small (close to zero) in the purified oxide semiconductor layer, and the carrier density is less than $1 \times 10^{12}/cm^3$, preferably less than $1 \times 10^{11}/cm^3$. In other words, the density of carriers derived from hydrogen, oxygen vacancy, and the like in the oxide semiconductor layer is made as close to zero as possible. Since the oxide semiconductor layer has very few carriers derived from hydrogen, oxygen vacancy, and the like, the amount of leakage current at the time when the transistor is off (i.e., off-state current) can be small. Furthermore, since the number of impurity levels derived from hydrogen, oxygen vacancy, and the like is small, variation and deterioration of electric characteristics due to light irradiation, temperature change, application of bias, or the like can be reduced. Note that the smaller the amount of off-state current is, the better. The transistor including the oxide semiconductor for a semiconductor layer has an off-state current value (per channel width (W) of 1 μm) of 100 zA (zeptoamperes) or less, preferably 10 zA or less, more preferably 1 zA or less. Further, the transistor does not have PN junction and hot carrier degradation does not occur, so that electrical characteristics of the transistor are not adversely affected thereby.

The off-state current can be extremely low in a transistor in which an oxide semiconductor layer that is purified by drastically removing hydrogen contained therein as described above is used for a channel formation region. In other words, in circuit design, the oxide semiconductor layer can be considered as an insulator when the transistor is off. On the other hand, when the transistor is on, the current supply capability of the oxide semiconductor layer is expected to be higher than that of a semiconductor layer formed of amorphous silicon.

As the substrate 220 having an insulating surface, a glass substrate of barium borosilicate glass, aluminoborosilicate glass, or the like can be used, for example.

In the transistor 211, an insulating film serving as a base film may be provided between the substrate 220 and the gate layer 221. The base film has a function of preventing diffusion of an impurity element from the substrate, and can be formed with a single-layer structure or a stacked structure using one or more of a silicon nitride film, a silicon oxide film, a silicon nitride oxide film, and a silicon oxynitride film.

The gate layer 221 can be formed with a single-layer structure or a stacked structure using a metal material such as molybdenum, titanium, chromium, tantalum, tungsten, aluminum, copper, neodymium, or scandium or an alloy material containing any of these materials as its main component.

The gate insulating layer 222 can be formed with a single-layer structure or a stacked structure including a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer by plasma CVD, sputtering, or the like. For example, a silicon nitride layer (SiNy (y>0)) with a thickness of 50 nm to 200 nm can be formed as a first gate insulating layer by plasma CVD, and a silicon oxide layer (SiOx (x>0)) with a thickness of 5 nm to 300 nm as a second gate insulating layer can be stacked over the first gate insulating layer.

A conductive film used for the source layer 224a and the drain layer 224b can be formed using an element selected from Al, Cr, Cu, Ta, Ti, Mo, and W, an alloy including any of these elements as a component, or an alloy film including a combination of any of these elements, for example. A structure may be employed in which a refractory metal layer of Ti, Mo, W, or the like is stacked on one or both of a top surface and a bottom surface of a metal layer of Al, Cu, or the like. By using an aluminum material to which an element preventing generation of hillocks and whiskers in an aluminum film (e.g., Si, Nd, or Sc) is added, heat resistance can be increased.

The conductive film to be the source layer 224a and the drain layer 224b (including a wiring layer formed using the same layer as the source and drain layers) may be formed using a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, referred to as ITO), an alloy of indium oxide and zinc oxide ($In_2O_3$—ZnO), or any of the metal oxide materials containing silicon or silicon oxide can be used.

As the insulating layer 225, an inorganic insulating film typified by a silicon oxide film, a silicon oxynitride film, an aluminum oxide film, or an aluminum oxynitride film can be used.

As the protective insulating layer 226, an inorganic insulating film such as a silicon nitride film, an aluminum nitride film, a silicon nitride oxide film, or an aluminum nitride oxide film can be used.

A planarization insulating film may be formed over the protective insulating layer 226 in order to reduce surface roughness due to the transistor. The planarization insulating film can be formed using an organic material such as polyimide, acrylic, or benzocyclobutene. Other than such organic materials, it is possible to use a low-dielectric constant material (low-k material) or the like. Note that the planarization insulating film may be formed by stacking a plurality of insulating films formed from these materials.

(Off-State Current of Transistor)

Next, results of measuring the off-state current of a transistor including a purified oxide semiconductor layer will be described.

Figure 10:
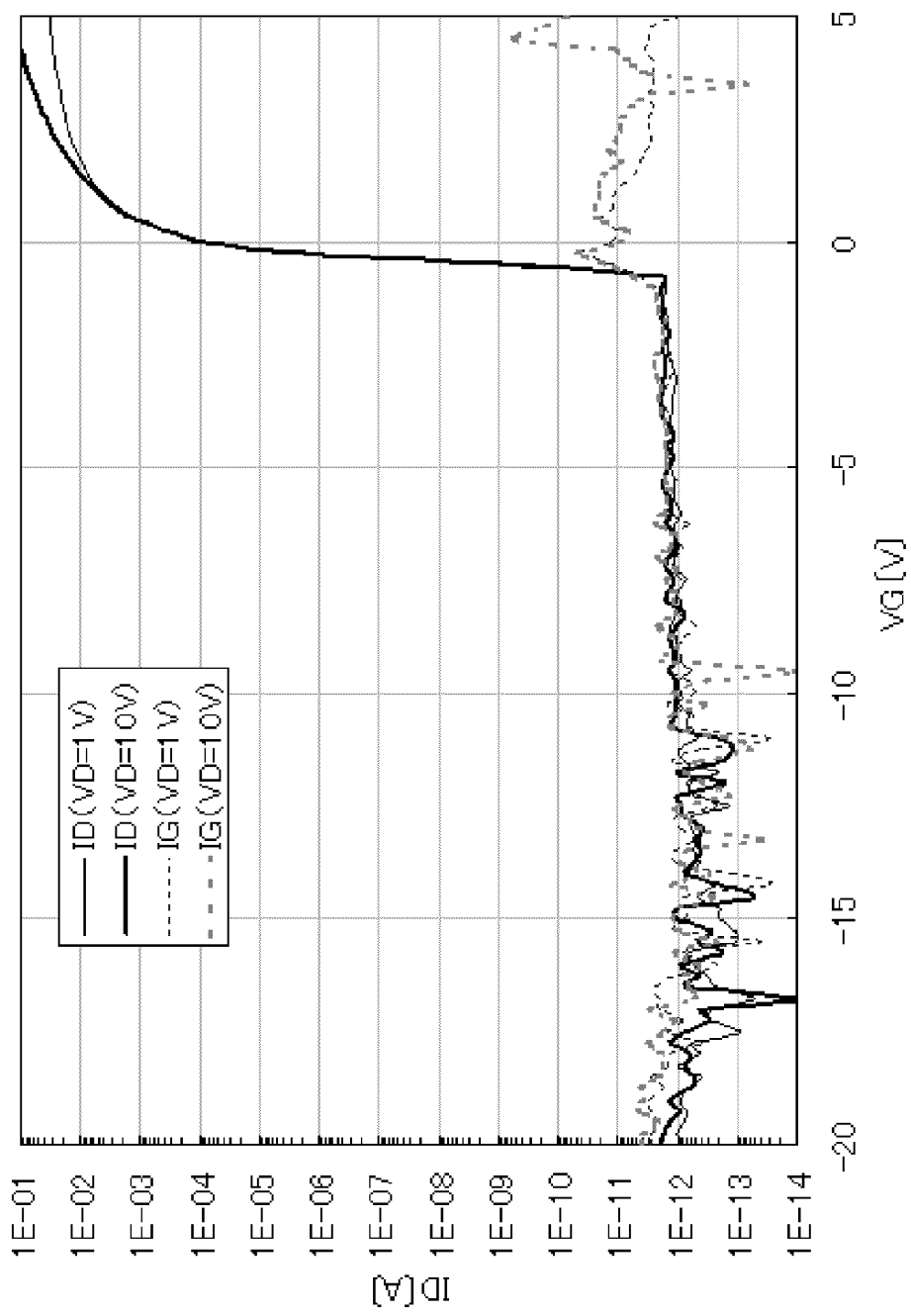
FIG. 10 shows characteristics of a transistor.

First, a transistor with a sufficiently large channel width W of 1 m was prepared in consideration of the fact that the transistor including a purified oxide semiconductor layer has an adequately low off-state current, and the off-state current was measured. FIG. 10 shows the results of measuring the off-state current of a transistor with a channel width W of 1 m. In FIG. 10, the horizontal axis represents a gate voltage VG, and the vertical axis represents a drain current ID. In the case where the drain voltage VD is +1 V or +10 V and the gate voltage VG is within the range of −20 V to −5 V, the off-state current of the transistor was found to be less than or equal to $1 \times 10^{-12}$ A which is the detection limit. Moreover, it was found that the off-state current (here, per channel width of 1 μm) of the transistor was 1 aA/μm ($1 \times 10^{-18}$ A/μm) or less.

Next, the results of more accurately measuring the off-state current of the transistor including a purified oxide semiconductor layer will be described. As described above, the off-state current of the transistor including a purified oxide semiconductor layer was found to be less than or equal to $1 \times 10^{-12}$ A, which is the detection limit of measurement equipment. Here, the results of measuring more accurate off-state current (the value smaller than or equal to the detection limit of measurement equipment in the above measurement) with the use of an element for evaluating characteristics will be described.

First, an element for evaluating characteristics which was used for measuring current will be described with reference to FIG. 11.

Figure 11:
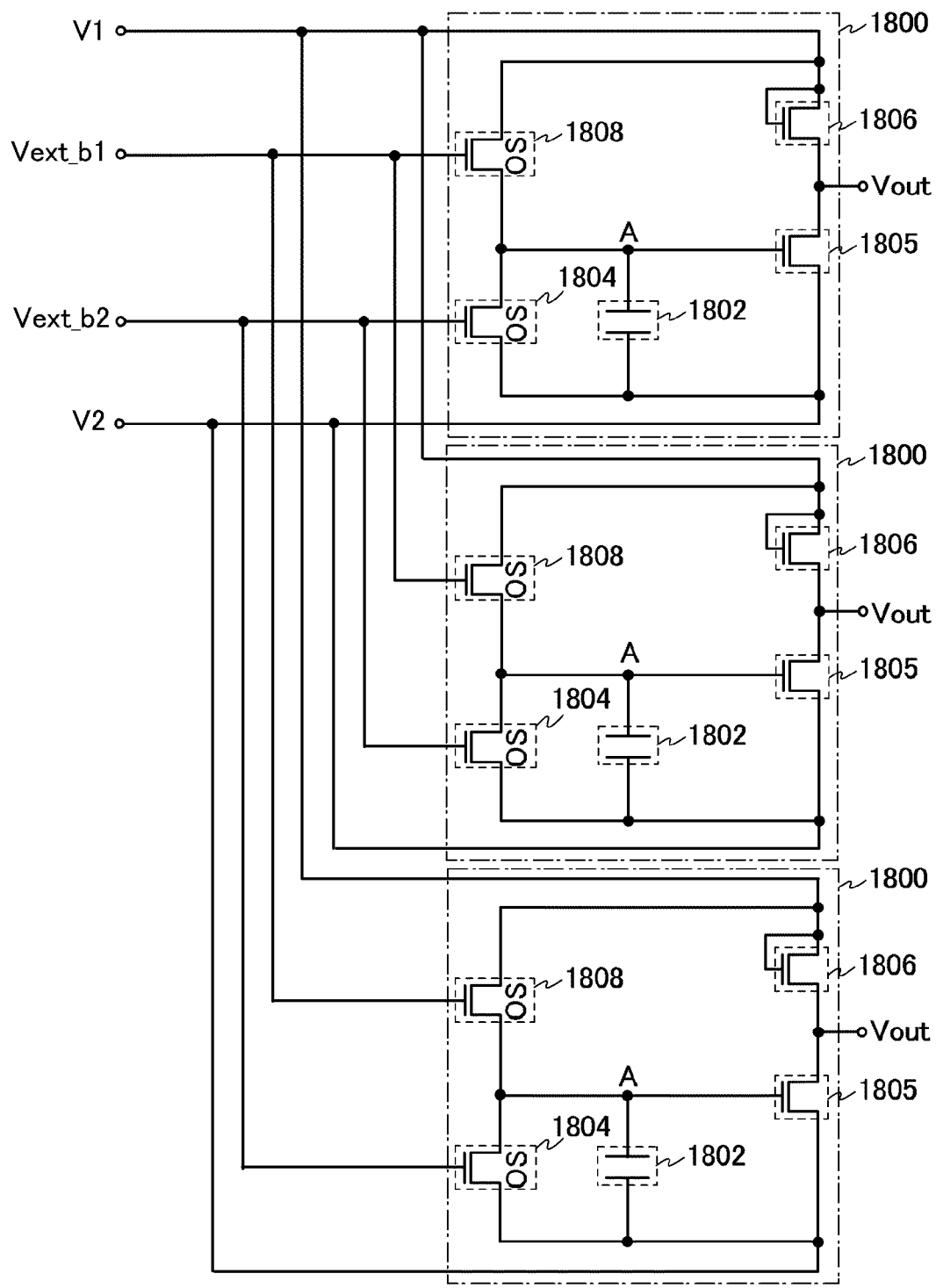
FIG. 11 is a circuit diagram for evaluating characteristics of a transistor.

In the element for evaluating characteristics illustrated in FIG. 11, three measurement systems 1800 are connected in parallel. The measurement system 1800 includes a capacitor 1802, a transistor 1804, a transistor 1805, a transistor 1806, and a transistor 1808. The transistor including a purified oxide semiconductor layer was used as the transistors 1804 and 1808.

In the measurement system 1800, one of a source and a drain of the transistor 1804, one terminal of the capacitor 1802, and one of a source and a drain of the transistor 1805 are connected to a power source (for supplying V2). The other of the source and the drain of the transistor 1804, one of a source and a drain of the transistor 1808, the other terminal of the capacitor 1802, and a gate of the transistor 1805 are electrically connected to each other. The other of the source and the drain of the transistor 1808, one of a source and a drain of the transistor 1806, and a gate of the transistor 1806 are electrically connected to a power source (for supplying V1). The other of the source and the drain of the transistor 1805 and the other of the source and the drain of the transistor 1806 are electrically connected to an output terminal.

A potential Vext_b2 for controlling the on/off state of the transistor 1804 is supplied to a gate of the transistor 1804. A potential Vext_b1 for controlling the on/off state of the transistor 1808 is supplied to a gate of the transistor 1808. A potential Vout is output from the output terminal.

Figure 12:
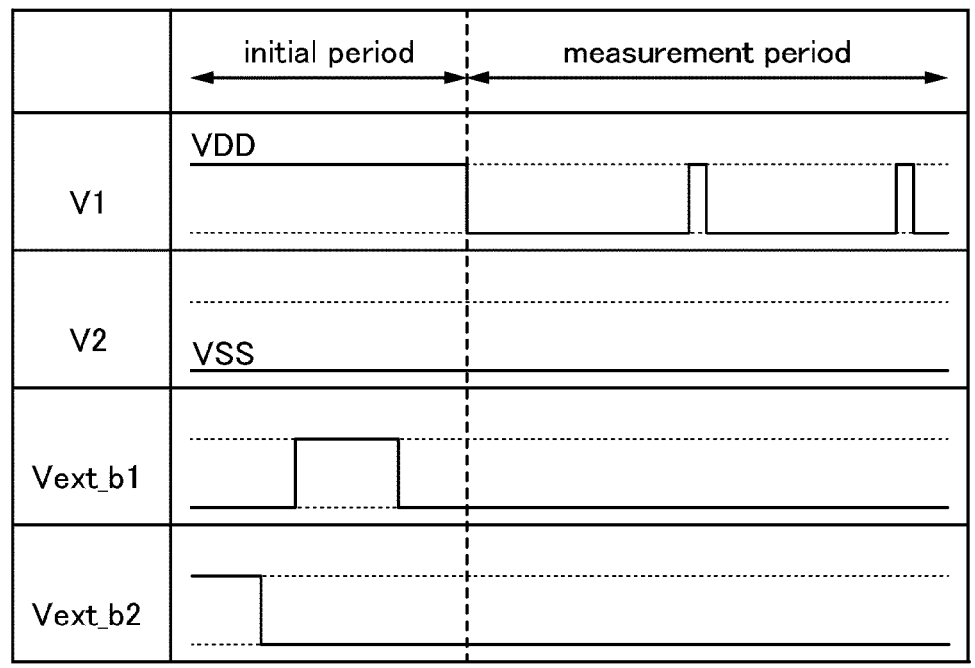
FIG. 12 is a timing chart for evaluating characteristics of a transistor.

Next, a method for measuring current with the use of the element for evaluating characteristics will be described with reference to FIG. 12. The measurement is performed in an initial period and a measurement period.

First, in the initial period, a node A (a node electrically connected to one of the source and the drain of the transistor 1808, the other terminal of the capacitor 1802, and the gate of the transistor 1805) is made to have a high potential. In order to realize this, the potential of V1 is set to a high potential (VDD) and the potential of V2 is set to a low potential (VSS).

Next, Vext_b2 is set to a potential with which the transistor 1804 is turned on (a high potential). Thus, the potential of the node A becomes V2, that is, the low potential (VSS). Note that it is not always necessary to supply the low potential (VSS) to the node A. After that, Vext_b2 is set to a potential with which the transistor 1804 is turned off (a low potential), so that the transistor 1804 is turned off. Then, Vext_b1 is set to a potential with which the transistor 1808 is turned on (a high potential). Thus, the potential of the node A becomes V1, that is, the high potential (VDD). After that, Vext_b1 is set to a potential with which the transistor 1808 is turned off. Accordingly, the node A is brought into a floating state while having the high potential, and the initial period is completed.

In the following measurement period, the potential V1 and the potential V2 are set to a potential with which electric charge flows to the node A or a potential with which electric charge flows from the node A. Here, each of the potential V1 and the potential V2 is set to the low potential. Note that at the timing of measuring the output potential Vout, V1 is temporarily set to the high potential because an output circuit needs to be operated. The period in which V1 is the high potential is made short so as not to adversely affect the measurement.

In the measurement period, electric charge is transferred from the node A to a wiring supplied with V1 or a wiring supplied with V2 because of the off-state current of the transistors 1804 and 1808. That is, the amount of electric charge held at the node A is changed over time, and the potential of the node A is changed accordingly. This means that the potential of the gate of the transistor 1805 varies.

Electric charge is measured by measuring Vout while the potential of Vext_b1 is temporarily set to the high potential at regular intervals. A circuit constituted by the transistor 1805 and the transistor 1806 is an inverter. When the node A has the high potential, Vout becomes the low potential; whereas when the node A has the low potential, Vout becomes the high potential. The potential of the node A, which has been the high potential at the beginning, is gradually decreased because of a decrease in the amount of electric charge. Thus, the potential of Vout is also changed. The potential of the node A is amplified with the amplification function of the inverter and output as Vout, so that a small amount of change in the potential of the node A can be measured by measurement of Vout.

A method for calculating the off-state current from the obtained output potential Vout will be described below.

The relation between the potential $V_A$ of the node A and the output potential Vout is obtained in advance before calculation of the off-state current. With this relation, the potential $V_A$ of the node A can be obtained using the output potential Vout. In accordance with the above relation, the potential $V_A$ of the node A can be expressed as a function of the output potential Vout by the following equation.

$$V_A = F(Vout) \qquad \text{[Formula 1]}$$

Electric charge $Q_A$ of the node A can be expressed by the following equation with the use of the potential $V_A$ of the node A, a capacitance $C_A$ connected to the node A, and a constant (const). Here, the capacitance $C_A$ connected to the node A is the sum of the capacitance of the capacitor 1802 and other capacitance.

$$Q_A = C_A V_A + \text{const} \qquad \text{[Formula 2]}$$

Since a current $I_A$ at the node A is obtained by time derivative of electric charge flowing to a capacitor connected to the node A (or electric charge flowing from the capacitor connected to the node A), the current $I_A$ at the node A is expressed by the following equation.

$$I_A \equiv \frac{\Delta Q_A}{\Delta t} = \frac{C_A \cdot \Delta F(Vout)}{\Delta t} \quad \text{[Formula 3]}$$

In this manner, the current $I_A$ of the node A can be obtained from the capacitance $C_A$ connected to the node A and the output potential Vout of the output terminal.

By the above method, it is possible to measure a leakage current which flows between a source and a drain of a transistor in an off state (an off-state current).

Here, the transistor 1804 and the transistor 1808 each of which included a purified oxide semiconductor layer and had a channel length L of 10 μm and a channel width W of 50 μm were manufactured. In the measurement systems 1800 arranged in parallel, capacitance values of the capacitors 1802 were 100 fF, 1 pF, and 3 pF.

Note that in the above-described measurement, VDD was 5 V and VSS was 0 V. In the measurement period, Vout was measured while the potential V1 was basically VSS and set to VDD only in a period of 100 milliseconds every 10 to 300 seconds. Moreover, Δt used in calculation of a current I which flows through the element was about 30000 seconds.

Figure 13:
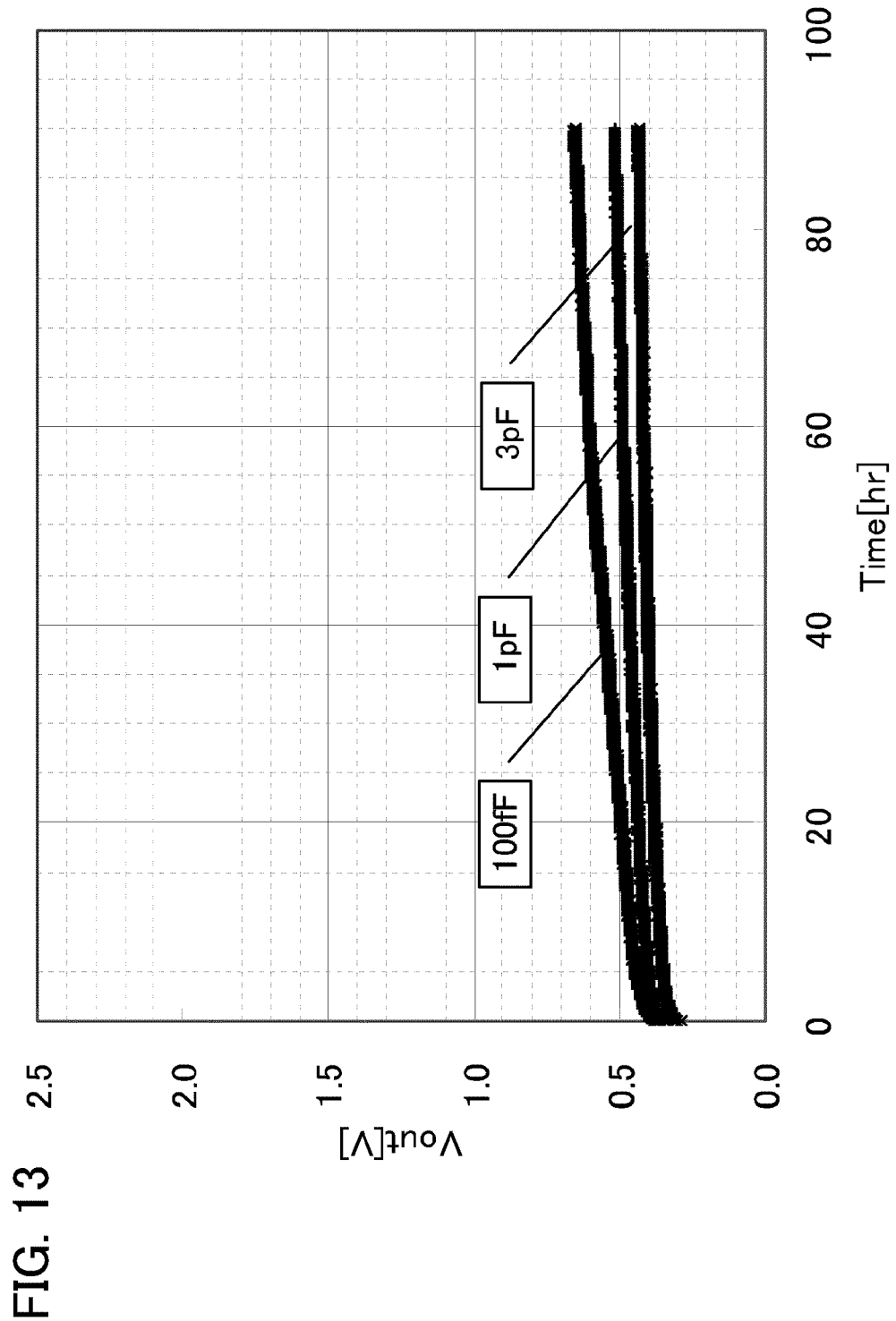
FIG. 13 shows characteristics of a transistor.

FIG. 13 shows the relation between elapsed time Time in the current measurement and the output potential Vout. It can be seen from FIG. 13 that the potential is changed over time.

Figure 14:
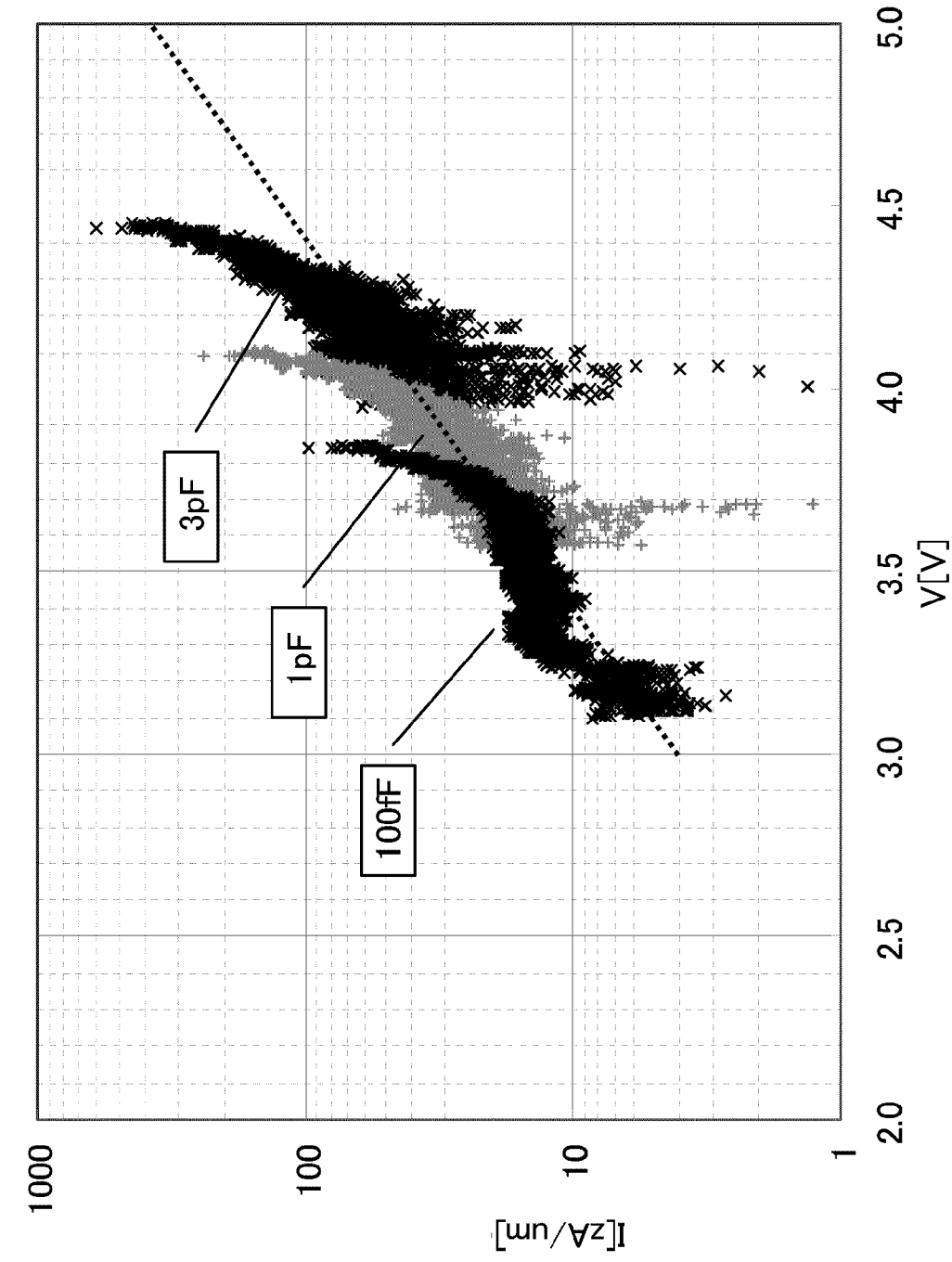
FIG. 14 shows characteristics of a transistor.

FIG. 14 shows the off-state current at room temperature (25° C.) calculated in the above current measurement. FIG. 14 shows the relation between a source-drain voltage V of the transistor 1804 or the transistor 1808 and an off-state current I. It is found from FIG. 14 that the off-state current is about 40 zA/μm when the source-drain voltage is 4 V. In addition, the off-state current was 10 zA/μm or less when the source-drain voltage was 3.1 V. Note that 1 zA represents $10^{-21}$ A.

Figure 15:
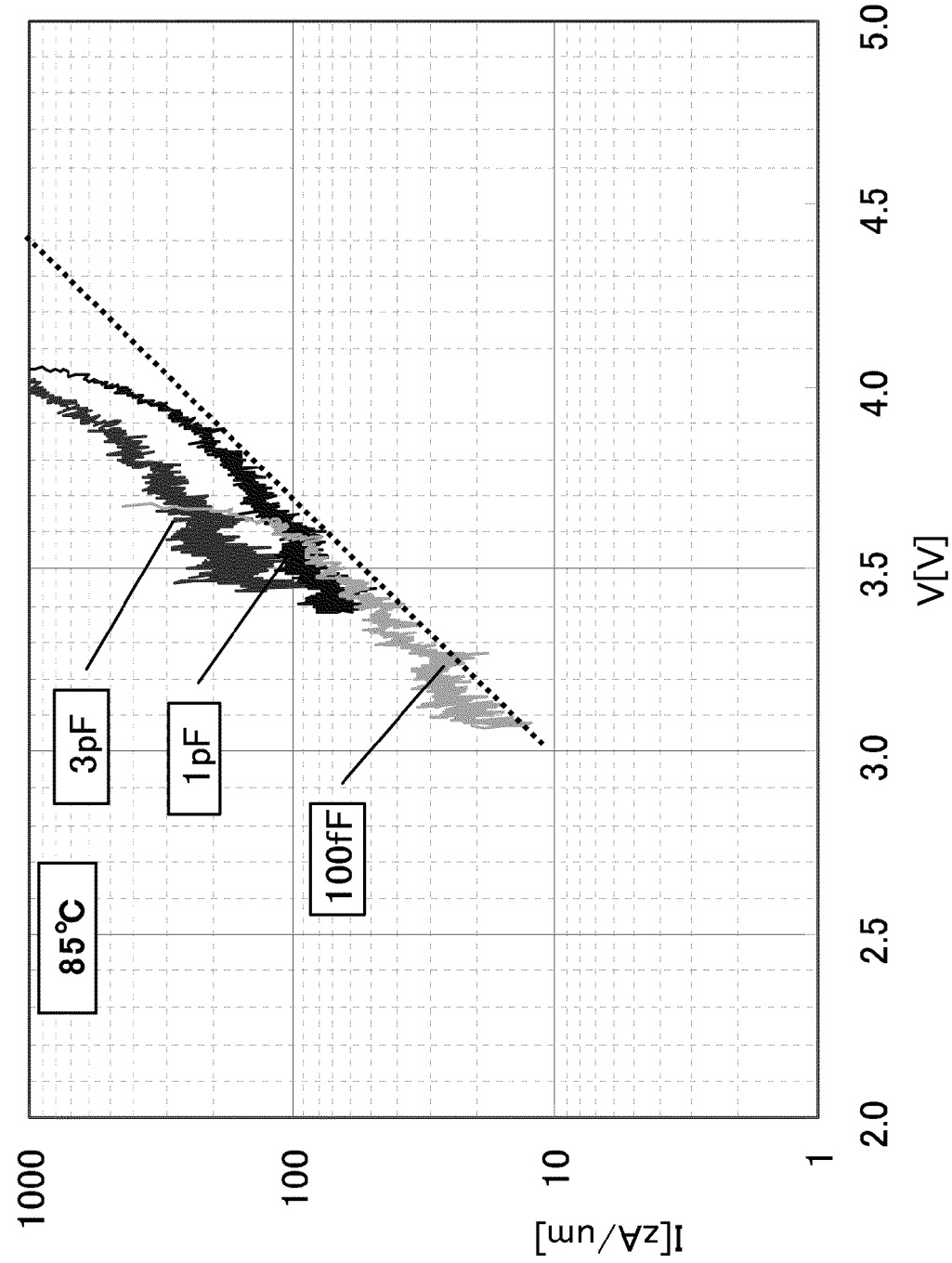
FIG. 15 shows characteristics of a transistor.

FIG. 15 shows the off-state current at 85° C. calculated in the above current measurement. FIG. 15 shows the relation between a source-drain voltage V of the transistor 1804 or the transistor 1808 and an off-state current I at 85° C. It is found from FIG. 15 that the off-state current was 100 zA/μm or less when the source-drain voltage was 3.1 V.

As has been described above, it was confirmed that the off-state current was sufficiently low in a transistor including a purified oxide semiconductor layer.
(Variations of Transistor)

In the above description, the transistor 211 with a bottom-gate structure called a channel-etch structure (see FIG. 9) is used as the transistor provided in the pixel; however, the transistor is not limited to having this structure. Transistors illustrated in FIGS. 16A to 16C can be used, for example.

Figure 16A:
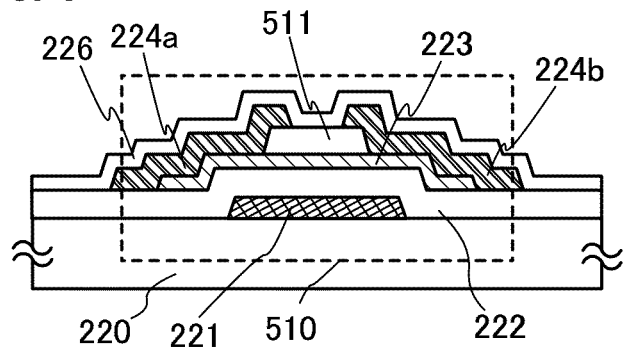
FIGS. 16A to 16C are cross-sectional views each illustrating an example of a transistor.

A transistor 510 illustrated in FIG. 16A has a kind of bottom-gate structure called a channel-protective type (also referred to as a channel-stop type).

The transistor 510 includes, over a substrate 220 having an insulating surface, a gate layer 221, a gate insulating layer 222, an oxide semiconductor layer 223, an insulating layer 511 functioning as a channel protective layer that covers a channel formation region of the oxide semiconductor layer 223, a source layer 224a, and a drain layer 224b. Moreover, a protective insulating layer 226 that covers the source layer 224a, the drain layer 224b, and the insulating layer 511 is formed.

As the insulating layer 511, an insulator such as silicon oxide, silicon nitride, silicon oxynitride, silicon nitride oxide, aluminum oxide, or tantalum oxide can be used. A stacked structure of any of these materials can also be used.

Figure 16B:
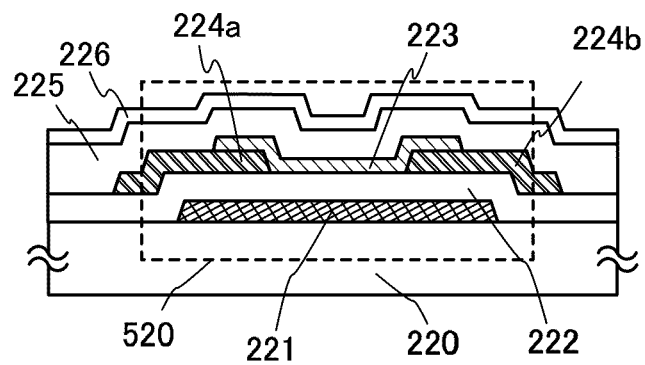

A transistor 520 illustrated in FIG. 16B is a bottom-gate transistor. The transistor 520 includes, over a substrate 220 having an insulating surface, a gate layer 221, a gate insulating layer 222, a source layer 224a, a drain layer 224b, and an oxide semiconductor layer 223. Furthermore, an insulating layer 225 that covers the source layer 224a and the drain layer 224b and is in contact with the oxide semiconductor layer 223 is provided. A protective insulating layer 226 is provided over the insulating layer 225.

In the transistor 520, the gate insulating layer 222 is provided on and in contact with the substrate 220 and the gate layer 221, and the source layer 224a and the drain layer 224b are provided on and in contact with the gate insulating layer 222. Further, the oxide semiconductor layer 223 is provided over the gate insulating layer 222, the source layer 224a, and the drain layer 224b.

Figure 16C:
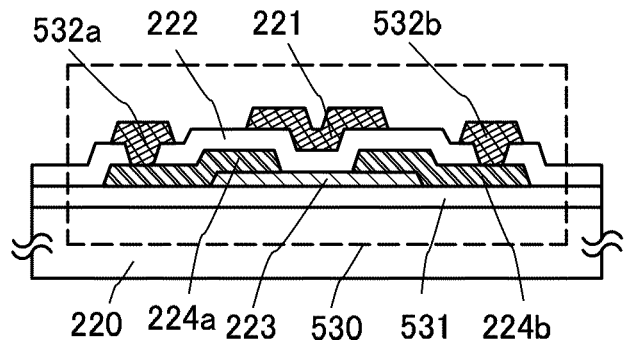

A transistor 530 illustrated in FIG. 16C is a kind of top-gate transistor. The transistor 530 includes, over a substrate 220 having an insulating surface, an insulating layer 531, an oxide semiconductor layer 223, a source layer 224a and a drain layer 224b, a gate insulating layer 222, and a gate layer 221. A wiring layer 532a and a wiring layer 532b are provided in contact with the source layer 224a and the drain layer 224b, to be electrically connected to the source layer 224a and the drain layer 224b, respectively.

As the insulating layer 531, an insulator such as silicon oxide, silicon nitride, silicon oxynitride, silicon nitride oxide, aluminum oxide, or tantalum oxide can be used. A stacked structure of any of these materials can also be used.

As the wiring layers 532a and 532b, an element selected from aluminum (Al), copper (Cu), titanium (Ti), tantalum (Ta), tungsten (W), molybdenum (Mo), chromium (Cr), neodymium (Nd), and scandium (Sc); an alloy containing any of these elements; or a nitride containing any of these elements can be used. A stacked structure of any of these materials can also be used.
(Specific Example of Cross Section of Pixel)

A liquid crystal display device according to one embodiment of the present invention can have high visibility and high reliability because a highly reliable transistor with low off-state current is used in a pixel portion.

Figure 17:
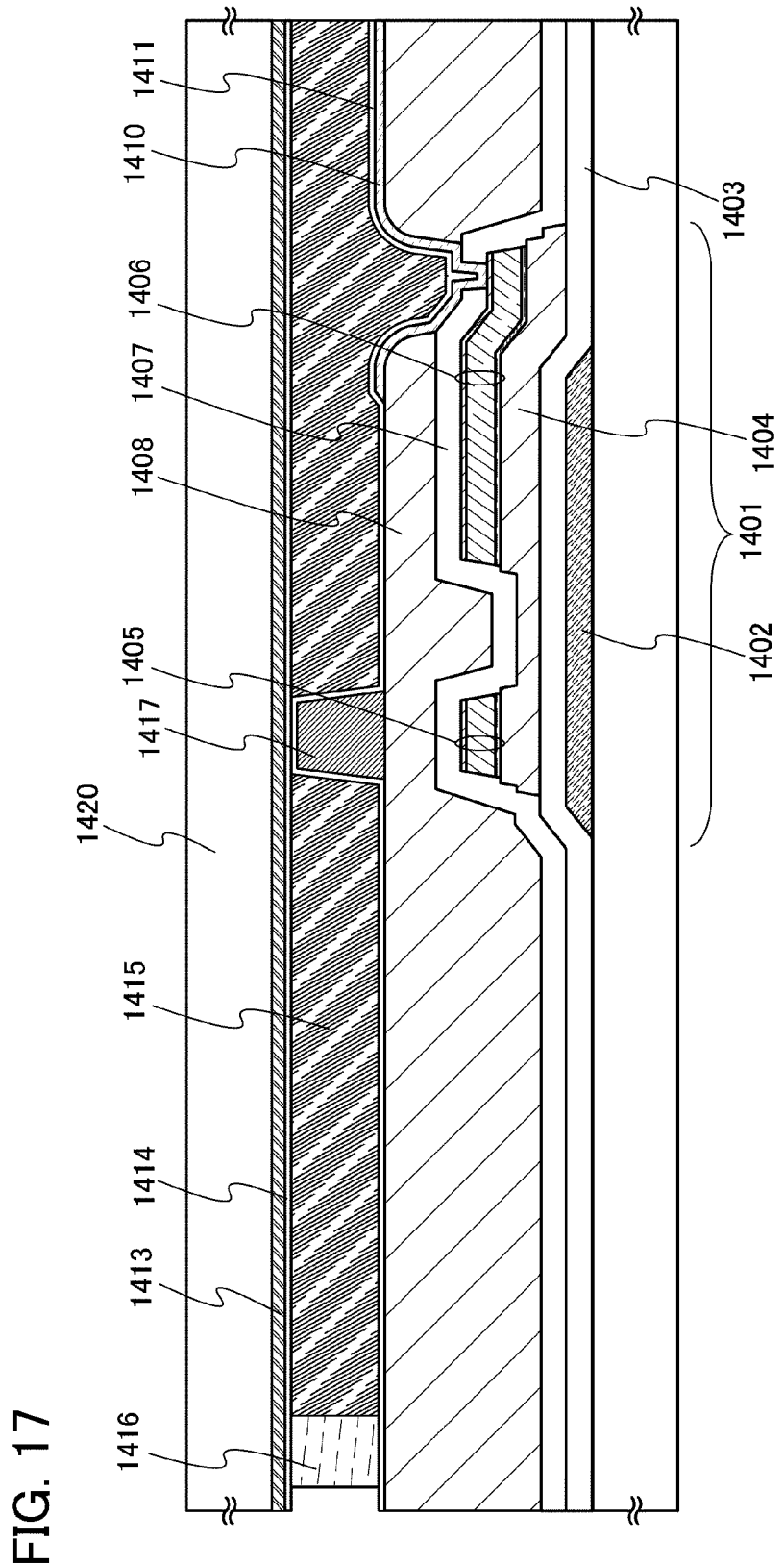
FIG. 17 illustrates a specific example of a cross section of a pixel.

FIG. 17 illustrates an example of a cross-sectional view of a pixel in the liquid crystal display device according to one embodiment of the present invention. A transistor 1401 illustrated in FIG. 17 includes a gate layer 1402 formed over an insulating surface, a gate insulating layer 1403 over the gate layer 1402, an oxide semiconductor layer 1404 that overlaps with the gate layer 1402 with the gate insulating layer 1403 placed therebetween, and a conductive film 1405 and a conductive film 1406 that are formed to be stacked over the oxide semiconductor layer 1404 and function as a source layer and a drain layer. The transistor 1401 may further include an insulating layer 1407 formed over the oxide semiconductor layer 1404. The insulating layer 1407 is formed so as to cover the gate layer 1402, the gate insulating layer 1403, the oxide semiconductor layer 1404, the conductive film 1405, and the conductive film 1406.

An insulating layer 1408 is formed over the insulating layer 1407. An opening is provided in part of the insulating layers 1407 and 1408, and a pixel electrode 1410 is formed so as to be in contact with the conductive film 1406 in the opening.

Further, a spacer 1417 for controlling the cell gap of a liquid crystal element is formed over the insulating layer 1408. The spacer 1417 can be formed by etching of an insulating film into a desired shape. Alternatively, the cell gap may be controlled by dispersing spherical spacers over the insulating layer 1408.

An alignment film 1411 is formed over the pixel electrode 1410. A counter electrode 1413 facing the pixel electrode 1410 is formed on a counter substrate 1420. An alignment film 1414 is formed on a surface of the counter electrode 1413, which faces the pixel electrode 1410. The alignment films 1411 and 1414 can be formed using an organic resin such as polyimide or polyvinyl alcohol. Alignment treatment such as rubbing is performed on their surfaces in order to align liquid crystal molecules in a certain direction. Rubbing can be performed in such a manner that a roller wrapped with cloth of nylon or the like is rotated while being in contact with the alignment film, and rubs the surface of the alignment film in a certain direction. Note that by using an inorganic material such as silicon oxide, the alignment films 1411 and 1414 with alignment characteristics can be directly formed by an evaporation method without performing alignment process.

Furthermore, a liquid crystal 1415 is provided in a region that is surrounded by a sealant 1416 between the pixel electrode 1410 and the counter electrode 1413. The liquid crystal 1415 may be injected with a dispenser method (a dripping method) or a dipping method (a pumping method). Note that a filler may be mixed in the sealant 1416.

A light-blocking film that can block light may be formed between pixels so that disclination due to alignment disorder of the liquid crystal 1415 between the pixels is prevented from being perceived. The light-blocking film can be formed using an organic resin containing a black pigment such as a carbon black or low-order titanium oxide, or a film containing chromium.

The pixel electrode 1410 and the counter electrode 1413 can be formed using a transparent conductive material such as indium tin oxide containing silicon oxide (ITSO), indium tin oxide (ITO), zinc oxide (ZnO), indium zinc oxide (IZO), or gallium-doped zinc oxide (GZO), for example.

Note that a TN (twisted nematic) liquid crystal display device is shown here; alternatively, the liquid crystal display device may be a VA (vertical alignment) liquid crystal display device, an OCB (optically compensated birefringence) liquid crystal display device, an IPS (in-plane switching) liquid crystal display device, or an MVA (multi-domain vertical alignment) liquid crystal display device, for example.

Alternatively, liquid crystal exhibiting a blue phase for which an alignment film is unnecessary may be used. A blue phase is one of liquid crystal phases, which is generated just before a cholesteric phase changes into an isotropic phase while the temperature of cholesteric liquid crystal is increased. Since the blue phase is only generated within a narrow range of temperature, a chiral agent or an ultraviolet curable resin is added so that the temperature range is increased. Specifically, a liquid crystal composition containing a chiral agent at 5 wt % or more is used as the liquid crystal 1415. The liquid crystal composition that includes liquid crystal exhibiting a blue phase and a chiral agent has such characteristics that the response time is as short as 10 μs to 100 μs, the alignment process is unnecessary because the liquid crystal composition has optical isotropy, and viewing angle dependency is small. The liquid crystal having such features is preferably used particularly as liquid crystal in the above liquid crystal display device (the liquid crystal display device in which image signals need to be input to each pixel plural times in order to produce an image).

Note that although the liquid crystal element in which the liquid crystal 1415 is sandwiched between the pixel electrode 1410 and the counter electrode 1413 is shown in FIG. 17 as an example, the liquid crystal display device according to one embodiment of the present invention is not limited to having this structure. A pair of electrodes may be formed over one substrate as in an IPS liquid crystal element or a liquid crystal element using a blue phase.

(Specific Example of Connection Between Pixel Portion and Driver Circuit)

Next, a terminal connection method for directly mounting a substrate provided with a driver circuit on a substrate provided with a pixel portion will be described.

Figure 18A:
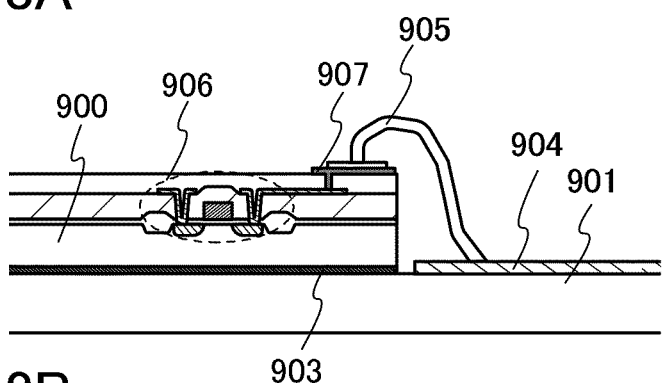
FIGS. 18A to 18C each illustrate a specific example of connection between terminals.

FIG. 18A is a cross-sectional view of a portion where a substrate 900 provided with a driver circuit and a substrate 901 provided with a pixel portion are connected to each other by a wire bonding method. The substrate 900 is attached onto the substrate 901 with an adhesive 903. A transistor 906 included in the driver circuit is provided on the substrate 900. The transistor 906 is electrically connected to a pad 907 that is formed to be exposed on a surface of the substrate 900 and functions as a terminal. A terminal 904 is formed over the substrate 901 in FIG. 18A, and the pad 907 and the terminal 904 are connected to each other with a wire 905.

Figure 18B:
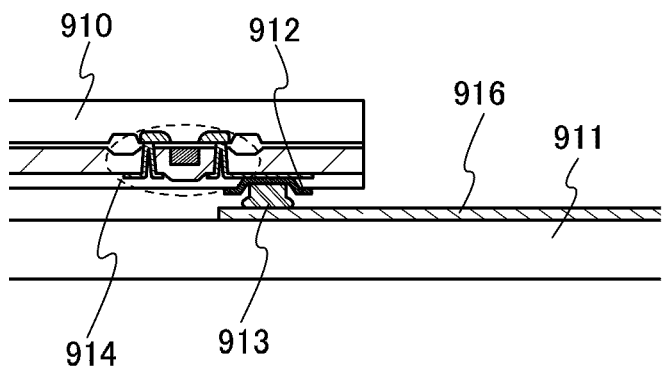

FIG. 18B is a cross-sectional view of a portion where a substrate 911 provided with a pixel portion and a substrate 910 provided with a driver circuit are connected to each other by a flip-chip method. In FIG. 18B, a solder ball 913 is connected to a pad 912 that is formed to be exposed on a surface of the substrate 910. Thus, a transistor 914 included in the driver circuit formed on the substrate 910 is electrically connected to the solder ball 913 through the pad 912. The solder ball 913 is electrically connected to a terminal 916 formed over the substrate 911.

The solder ball 913 and the terminal 916 can be connected to each other by a variety of methods such as thermocompression bonding and thermocompression bonding with ultrasonic vibration. Note that in order to increase the mechanical strength of the connection portion or the diffusion efficiency of heat generated at the substrate 911, an underfill may be provided between the substrate 910 and the substrate 911 to fill the gap between the solder balls after bonding. Although not necessarily provided, an underfill can prevent occurrence of a connection failure due to stress generated by a mismatch in coefficient of terminal expansion between the substrate 910 and the substrate 911. In the case where the solder ball 913 and the terminal 916 are bonded to each other with ultrasonic waves, connection failures can be reduced as compared to the case where they are bonded to each other only by thermocompression bonding.

A flip-chip method is suitable to realize connection with a large number of terminals because even if the number of pads to be connected is increased, the distance between the pads can be relatively large as compared to the case of employing a wire bonding method.

Note that the solder ball may be formed by a droplet discharge method by which a dispersion liquid in which metal nanoparticles are dispersed is discharged.

Figure 18C:
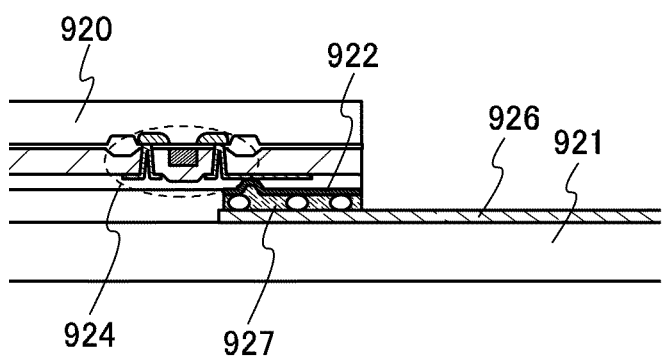

FIG. 18C is a cross-sectional view of a portion where a substrate 921 provided with a pixel portion and a substrate 920 provided with a driver circuit are connected to each other with an anisotropic conductive resin. In FIG. 18C, a pad 922 that is formed to be exposed on a surface of the substrate 920 is electrically connected to a transistor 924 included in the driver circuit formed on the substrate 920. The pad 922 is connected to a terminal 926 formed over the substrate 921 with an anisotropic conductive resin 927.

Note that the connection method is not limited to the methods shown in FIGS. 18A to 18C. The substrates may be connected to each other with a combination of a wire bonding method and a flip-chip method.

(Specific Example of Driver Circuit Mounted on Substrate Including Pixel Portion)

Next, a mounting method of a substrate including a driver circuit (also referred to as an IC chip) will be described. In the liquid crystal display device according to one embodiment of the present invention, a transistor including a channel formation region formed using an oxide semiconductor is used, so that a pixel portion and part of driver circuit can be formed over one substrate.

Figure 19A:
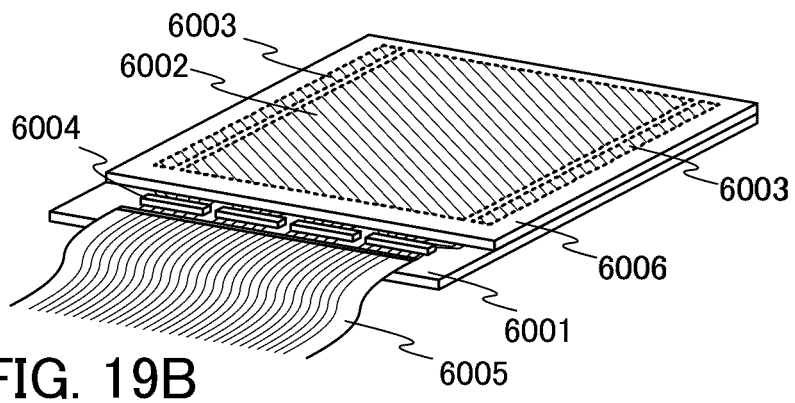
FIGS. 19A to 19C are perspective views each illustrating a specific example of a liquid crystal display device.

In a liquid crystal display device illustrated in FIG. 19A, a pixel portion 6002 and scan line driver circuits 6003 are formed over a substrate 6001. A counter substrate 6006 overlaps the substrate 6001 so as to cover the pixel portion 6002 and the scan line driver circuits 6003. Moreover, a substrate 6004 provided with a signal line driver circuit is directly mounted on the substrate 6001. Specifically, the signal line driver circuit formed on the substrate 6004 is attached to the substrate 6001 and electrically connected to the pixel portion 6002. Power supply potentials, various signals, and the like are supplied through an FPC 6005 to the pixel portion 6002, the scan line driver circuits 6003, and the signal line driver circuit formed on the substrate 6004.

Figure 19B:
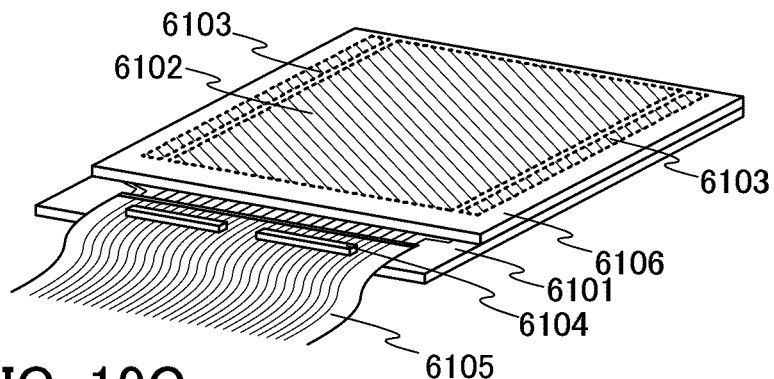

In a liquid crystal display panel illustrated in FIG. 19B, a pixel portion 6102 and scan line driver circuits 6103 are formed over a substrate 6101. A counter substrate 6106 overlaps the substrate 6101 so as to cover the pixel portion 6102 and the scan line driver circuits 6103. Moreover, a substrate 6104 provided with a signal line driver circuit is mounted on a FPC 6105 connected to the substrate 6101. Power supply potentials, various signals, and the like are supplied through the FPC 6105 to the pixel portion 6102, the scan line driver circuits 6103, and the signal line driver circuit formed on the substrate 6104.

Figure 19C:
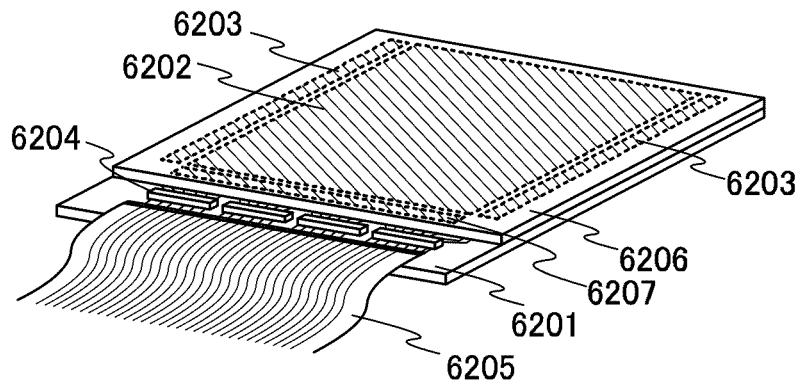

In a liquid crystal display device illustrated in FIG. 19C, a pixel portion 6202, scan line driver circuits 6203, and a portion 6207 of a signal line driver circuit are formed over a substrate 6201. A counter substrate 6206 overlaps the substrate 6201 so as to cover the pixel portion 6202, the scan line driver circuits 6203, and the portion 6207 of the signal line driver circuit. A substrate 6204 provided with another portion of the signal line driver circuit is directly mounted on the substrate 6201. Specifically, another portion of the signal line driver circuit formed on the substrate 6204 is attached to the substrate 6201 and electrically connected to the portion 6207 of the signal line driver circuit. Power supply potentials, various signals, and the like are supplied through an FPC 6205 to the pixel portion 6202, the scan line driver circuits 6203, the portion 6207 of the signal line driver circuit, and another portion of the signal line driver circuit formed on the substrate 6204.

There is no particular limitation on the mounting method of the substrate, and a known COG method, wire bonding method, TAB method, or the like can be used. The position where an IC chip is mounted is not limited to the positions shown in FIGS. 19A to 19C as long as electrical connection is achieved. Furthermore, a controller, a CPU, a memory, or the like may be formed using an IC chip and may be mounted on a substrate provided with a pixel portion.

(Specific Example of Liquid Crystal Display Device)

Figure 20A:
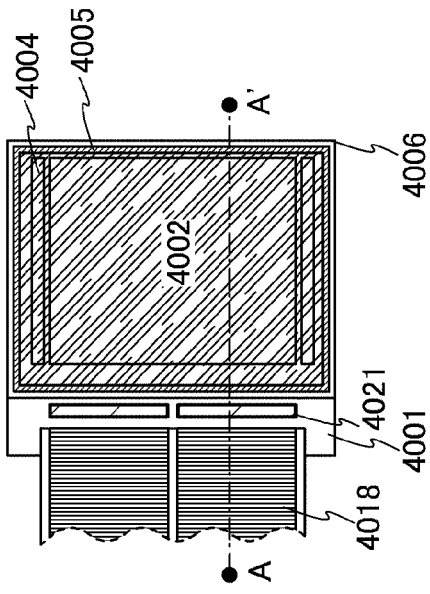
FIGS. 20A and 20B are a top view and a cross-sectional view illustrating a specific example of a liquid crystal display device.
Figure 20B:
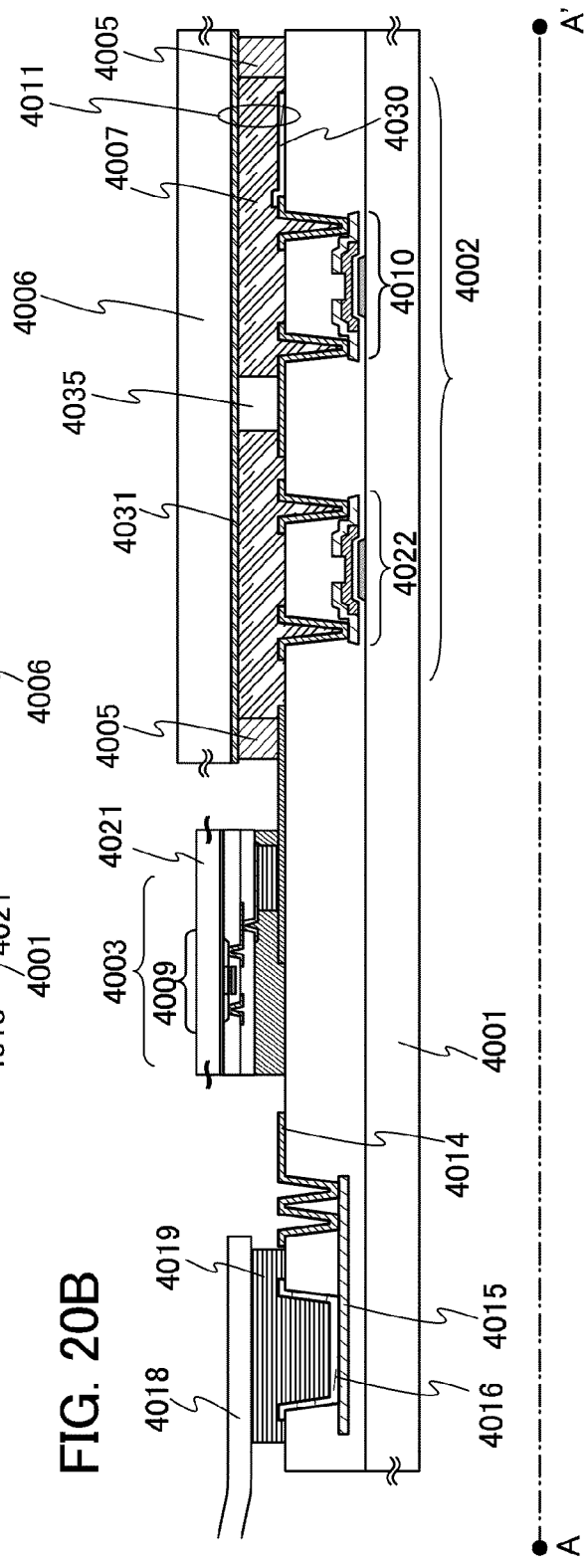

Next, the appearance of a panel in the liquid crystal display device according to one embodiment of the present invention will be described with reference to FIGS. 20A and 20B. FIG. 20A is a top view of the panel in which a substrate 4001 and a counter substrate 4006 are bonded to each other with a sealant 4005. FIG. 20B is a cross-sectional view along the dashed line A-A' in FIG. 20A.

The sealant 4005 is provided so as to surround a pixel portion 4002 and a scan line driver circuit 4004 provided over the substrate 4001. The counter substrate 4006 is placed over the pixel portion 4002 and the scan line driver circuit 4004. Thus, the pixel portion 4002 and the scan line driver circuit 4004 are sealed together with a liquid crystal 4007 by the substrate 4001, the sealant 4005, and the counter substrate 4006.

In addition, a substrate 4021 where a signal line driver circuit 4003 is formed is mounted on the substrate 4001 in a region other than the region surrounded by the sealant 4005. FIG. 20B illustrates a transistor 4009 included in the signal line driver circuit 4003, as an example.

A plurality of transistors are included in the pixel portion 4002 and the scan line driver circuit 4004 provided over the substrate 4001. FIG. 20B illustrates a transistor 4010 and a transistor 4022 that are included in the pixel portion 4002. In each of the transistors 4010 and 4022, a channel formation region is formed using an oxide semiconductor.

A pixel electrode 4030 included in a liquid crystal element 4011 is electrically connected to the transistor 4010. A counter electrode 4031 of the liquid crystal element 4011 is formed on the counter substrate 4006. The liquid crystal element 4011 corresponds to a region where the pixel electrode 4030, the counter electrode 4031, and the liquid crystal 4007 overlap with each other.

A spacer 4035 is provided in order to control a distance (a cell gap) between the pixel electrode 4030 and the counter electrode 4031. FIG. 20B shows the case where the spacer 4035 is formed by patterning of an insulating film; alternatively, a spherical spacer may be used.

A variety of signals and potentials that are applied to the signal line driver circuit 4003, the scan line driver circuit 4004, and the pixel portion 4002 are supplied from a connection terminal 4016 through leading wirings 4014 and 4015. The connection terminal 4016 is electrically connected to a FPC 4018 through an anisotropic conductive film 4019.

For the substrate 4001, the counter substrate 4006, and the substrate 4021, glass, ceramics, or plastics can be used. Examples of plastics are a fiberglass-reinforced plastic (FRP) plate, a polyvinyl fluoride (PVF) film, a polyester film, and an acrylic resin film.

Note that for a substrate to be placed in the direction from which light transmitted through the liquid crystal element 4011 is extracted, a light-transmitting material such as a glass plate, plastics, a polyester film, or an acrylic film is used.

FIG. 21 shows an example of a perspective view illustrating the structure of the liquid crystal display device according to one embodiment of the present invention. The liquid crystal display device in FIG. 21 includes a panel 1601 including a pixel portion, a first diffusion plate 1602, a prism sheet 1603, a second diffusion plate 1604, a light guide plate 1605, a backlight panel 1607, a circuit board 1608, and a substrate 1611 provided with a signal line driver circuit.

The panel 1601, the first diffusion plate 1602, the prism sheet 1603, the second diffusion plate 1604, the light guide plate 1605, and the backlight panel 1607 are stacked in this order. The backlight panel 1607 has a backlight 1612 including a plurality of backlight units. Light that is emitted from the backlight 1612 and diffused in the light guide plate 1605 is delivered to the panel 1601 through the first diffusion plate 1602, the prism sheet 1603, and the second diffusion plate 1604.

Although the first diffusion plate 1602 and the second diffusion plate 1604 are used here, the number of diffusion plates is not limited to two but may be one, or may be three or more. The diffusion plate should be provided between the light guide plate 1605 and the panel 1601. Therefore, the diffusion plate may be provided only on the side closer to the panel 1601 than the prism sheet 1603, or may be provided only on the side closer to the light guide plate 1605 than the prism sheet 1603.

The prism sheet 1603 is not limited to having a sawtooth shape in section as illustrated in FIG. 21 and can have a shape with which light from the light guide plate 1605 can be concentrated on the panel 1601 side.

The circuit board 1608 is provided with a circuit that generates various kinds of signals input to the panel 1601, a circuit that processes these signals, and the like. In FIG. 21, the circuit board 1608 and the panel 1601 are connected to each other via a COF (chip on film) tape 1609. Moreover, the substrate 1611 provided with the signal line driver circuit is connected to the COF tape 1609 by a COF method.

FIG. 21 illustrates the example in which the circuit board 1608 is provided with a controller circuit that controls driving of the backlight 1612 and the controller circuit and the backlight panel 1607 are connected to each other via an FPC 1610. Note that the controller circuit may be formed in the panel 1601; in that case, the panel 1601 and the backlight panel 1607 are to be connected to each other via an FPC or the like. (Specific Example of Liquid Crystal Display Device Including Touch Panel)

Figure 22A:
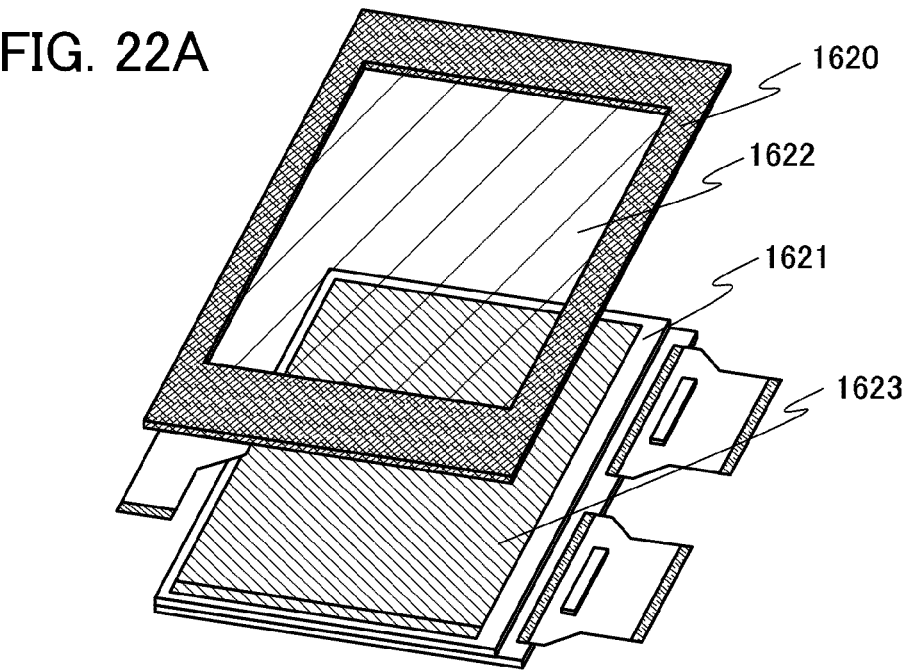
FIGS. 22A and 22B each illustrate a specific example of a touch panel.

The liquid crystal display device according to one embodiment of the present invention may include a pointing device called a touch panel. FIG. 22A illustrates a state where a touch panel 1620 overlaps with a panel 1621.

In the touch panel 1620, a position touched by a finger, a stylus, or the like is detected in a light-transmitting position detection portion 1622 and a signal including information on the position can be generated. Thus, by providing the touch panel 1620 so that the position detection portion 1622 overlaps with a pixel portion 1623 of the panel 1621, information on a position in the pixel portion 1623 the user of the liquid crystal display device touches can be obtained.

Figure 22B:
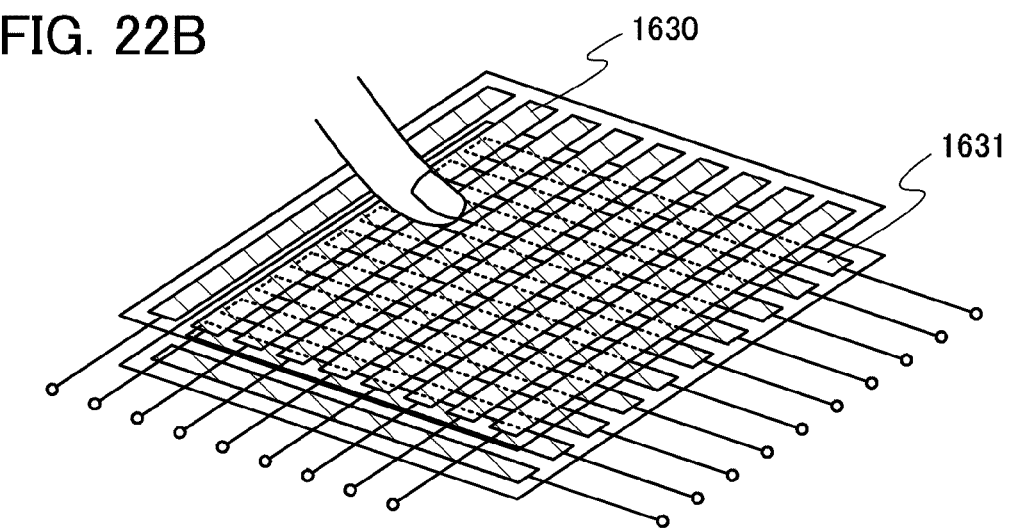

The position can be detected in the position detection portion 1622 by a variety of methods such as a resistive touchscreen technology and a capacitive touchscreen technology. FIG. 22B is a perspective view of the position detection portion 1622 with a resistive touchscreen technology. In the position detection portion 1622 with a resistive touchscreen technology, a plurality of first electrodes 1630 and a plurality of second electrodes 1631 are provided so as to face each other with a space therebetween. When one of the plurality of first electrodes 1630 is pressed by the finger or the like, the first electrode 1630 is in contact with one of the plurality of second electrodes 1631. Then, by monitoring the level of voltage at opposite ends of each of the first electrodes 1630 and the level of voltage at opposite ends of each of the second electrodes 1631, it is possible to specify which of the first electrodes 1630 is in contact with the second electrode 1631; thus, the position touched by the finger can be detected.

The first electrodes 1630 and the second electrodes 1631 can be formed using a light-transmitting conductive material, for example, indium tin oxide containing silicon oxide (ITSO), indium tin oxide (ITO), zinc oxide (ZnO), indium zinc oxide (IZO), or gallium-doped zinc oxide (GZO).

Figure 23A:
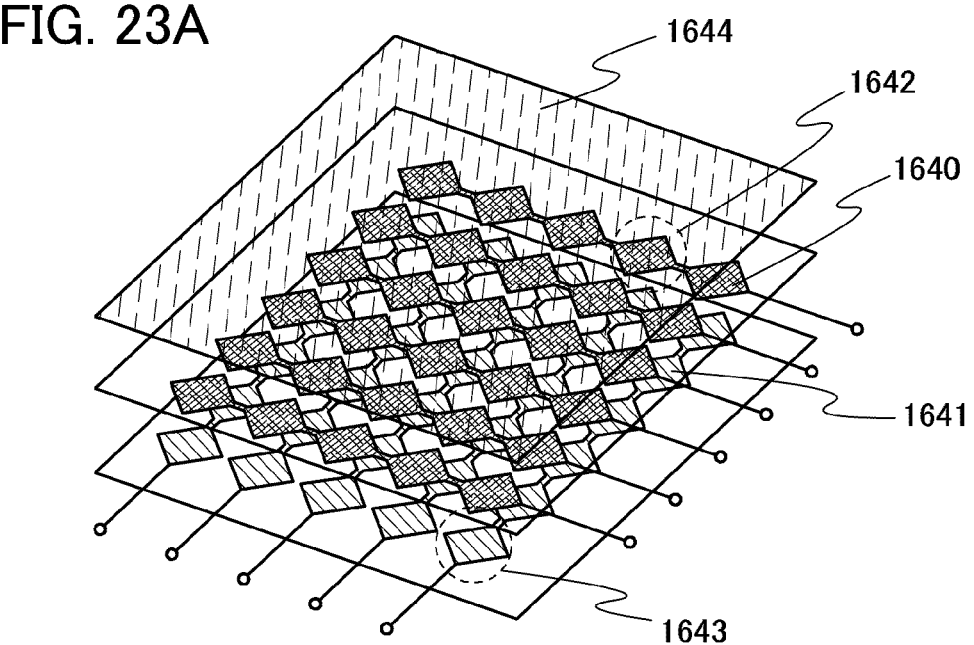
FIGS. 23A and 23B illustrate a specific example of a touch panel.

FIG. 23A is a perspective view of the position detection portion 1622 with a projected capacitive touchscreen technology among capacitive touchscreen technologies. In the position detection portion 1622 with a projected capacitive touchscreen technology, a plurality of first electrodes 1640 and a plurality of second electrodes 1641 are provided so as to overlap with each other. The first electrodes 1640 each have a structure in which a plurality of rectangular conductive films 1642 are connected to each other. The second electrodes 1641 each have a structure in which a plurality of rectangular conductive films 1643 are connected to each other. Note that the shapes of the first electrodes 1640 and the second electrodes 1641 are not limited thereto.

Figure 23B:
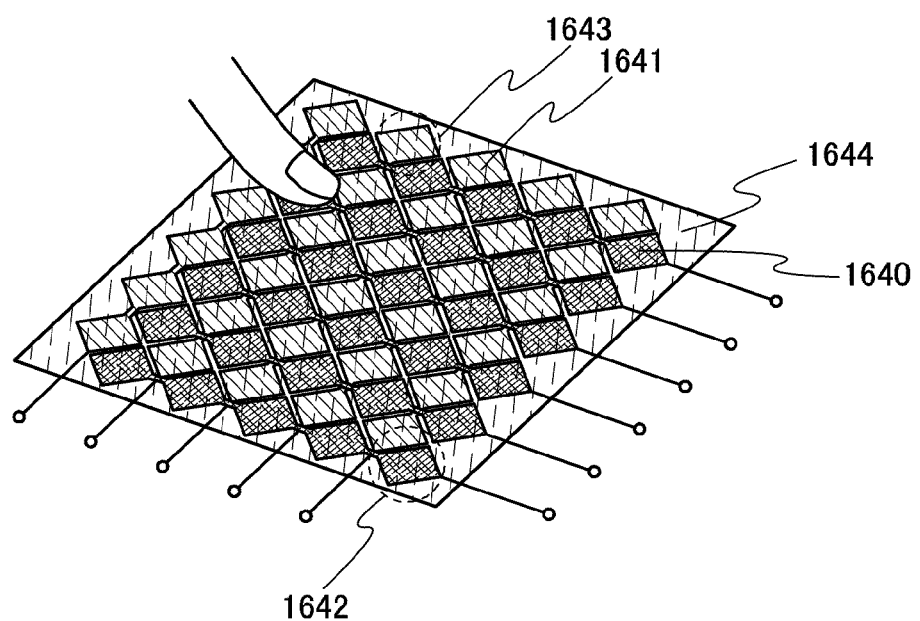

In FIG. 23A, an insulating layer 1644 functioning as a dielectric overlaps the plurality of first electrodes 1640 and the plurality of second electrodes 1641. FIG. 23B illustrates a state where the plurality of first electrodes 1640, the plurality of second electrodes 1641, and the insulating layer 1644 illustrated in FIG. 23A overlap with each other. As illustrated in FIG. 23B, the plurality of first electrodes 1640 and the plurality of second electrodes 1641 overlap with each other so that the position of the rectangular conductive films 1642 does not correspond to that of the rectangular conductive films 1643.

When the finger or the like touches the insulating layer 1644, capacitance is generated between one of the plurality of first electrodes 1640 and the finger. Moreover, capacitance is also generated between one of the plurality of second electrodes 1641 and the finger. Accordingly, monitoring of the change in capacitance can specify which first electrode 1640 and which second electrode 1641 are closest to the finger; thus, the position touched by the finger can be detected.
(Example of Method for Manufacturing Transistor)

Next, an example of a method for manufacturing a transistor will be described.

Figure 24A:
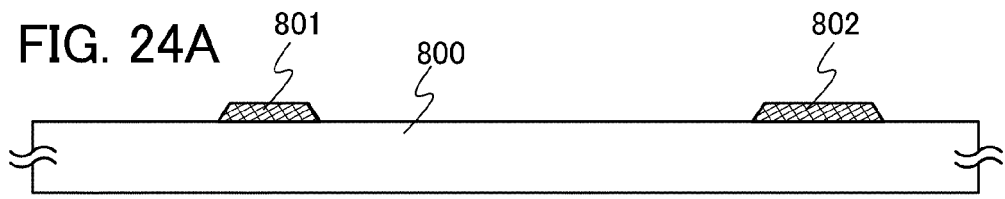
FIGS. 24A to 24D are cross-sectional views illustrating a specific example of a process for manufacturing a transistor.

First, as illustrated in FIG. 24A, a gate layer 801 and an electrode layer 802 are formed over a substrate 800 having an insulating surface.

The gate layer 801 and the electrode layer 802 can be formed with a single-layer structure or a stacked structure using one or more of conductive films using a metal material such as molybdenum, titanium, chromium, tantalum, tungsten, neodymium, or scandium or an alloy material containing any of these metal materials as a main component, or nitride of these metals. Note that aluminum or copper can also be used as the metal material if it can withstand the temperature of heat treatment to be performed in a later step. Aluminum or copper is preferably combined with a refractory metal material so as to prevent problems of low heat resistance and corrosion. As the refractory metal material, molybdenum, titanium, chromium, tantalum, tungsten, neodymium, scandium, or the like can be used.

For example, as a two-layer structure of the gate layer 801 and the electrode layer 802, the following structures are preferable: a two-layer structure in which a molybdenum film is stacked over an aluminum film, a two-layer structure in which a molybdenum film is stacked over a copper film, a two-layer structure in which a titanium nitride film or a tantalum nitride film is stacked over a copper film, and a two-layer structure in which a titanium nitride film and a molybdenum film are stacked. As a three-layer structure of the gate layer 801 and the electrode layer 802, it is preferable to employ a stacked structure in which an aluminum film, an alloy film of aluminum and silicon, an alloy film of aluminum and titanium, or an alloy film of aluminum and neodymium is used as a middle layer and sandwiched between a top layer and a bottom layer of tungsten, tungsten nitride, titanium nitride, or titanium.

Further, a light-transmitting oxide conductive film of indium oxide, an alloy of indium oxide and tin oxide, an alloy of indium oxide and zinc oxide, zinc oxide, zinc aluminum oxide, zinc aluminum oxynitride, zinc gallium oxide, or the like can be used as the gate layer 801 and the electrode layer 802.

The thickness of each of the gate layer 801 and the electrode layer 802 is 10 nm to 400 nm, preferably 100 nm to 200 nm. Here, after a 150-nm-thick conductive film for the gate electrode is formed by sputtering using a tungsten target, the conductive film is processed (patterned) into a desired shape by etching, so that the gate layer 801 and the electrode layer 802 are formed. The gate layer preferably has tapered edge because coverage of the gate layer with a gate insulating layer to be stacked thereover can be improved. Note that a resist mask may be formed by an inkjet method. Formation of the resist mask by an inkjet method needs no photomask; thus, manufacturing costs can be reduced.

Figure 24B:
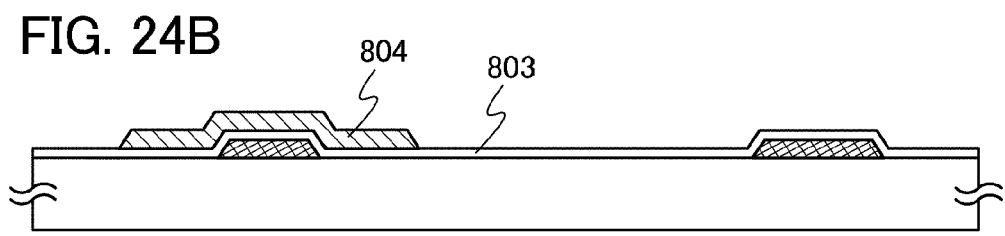

Next, as illustrated in FIG. 24B, a gate insulating layer 803 is formed over the gate layer 801 and the electrode layer 802. The gate insulating layer 803 can be formed with a single-layer structure or a stacked structure of a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, and/or a tantalum oxide film by plasma CVD, sputtering, or the like. It is preferable that the gate insulating layer 803 include impurities such as moisture, hydrogen, or oxygen as little as possible. In the case where a silicon oxide film is formed by sputtering, a silicon target or a quartz target is used as a target, and oxygen or a mixed gas of oxygen and argon is used as a sputtering gas.

An oxide semiconductor that becomes intrinsic (i-type) or substantially intrinsic by removal of impurities (a purified oxide semiconductor) is quite susceptible to the interface state density or interface charge; therefore, the interface between the purified oxide semiconductor and the gate insulating layer 803 is important. For that reason, the gate insulating layer (GI) that is in contact with the purified oxide semiconductor needs to have higher quality.

For example, high-density plasma CVD using microwaves (e.g., a frequency of 2.45 GHz) is preferably used because an insulating layer can be dense and have high withstand voltage and high quality. The purified oxide semiconductor and the high-quality gate insulating layer are in close contact with each other, so that the interface state density can be reduced to obtain favorable interface characteristics.

Needless to say, another film formation method such as sputtering or plasma CVD can be employed as long as the method enables formation of a good-quality insulating layer as a gate insulating layer. Moreover, it is possible to form an insulating layer whose quality as a gate insulating layer and characteristics of an interface with the oxide semiconductor are improved through heat treatment performed after the formation of the insulating layer. In any case, any insulating layer can be used as long as it can reduce the interface state density between the gate insulating layer and the oxide semiconductor and form a favorable interface as well as having good film quality as the gate insulating layer.

The gate insulating layer 803 may have a structure in which an insulating layer formed using a material with high barrier properties and an insulating layer with a low nitrogen content, such as a silicon oxide film or a silicon oxynitride film, are stacked. In that case, the insulating layer such as a silicon oxide film or a silicon oxynitride film is formed between the insulating layer having high barrier properties and an oxide semiconductor layer. Examples of the insulating layer having high barrier properties are a silicon nitride film, a silicon nitride oxide film, an aluminum nitride film, and an aluminum nitride oxide film. With an insulating layer having high barrier properties, impurities in an atmosphere, such as moisture or hydrogen, or impurities included in the substrate, such as an alkali metal or a heavy metal, can be prevented from entering the oxide semiconductor layer, the gate insulating layer 803, or the interface between the oxide semiconductor layer and another insulating layer and the vicinity thereof. In addition, by forming the insulating layer with a low nitrogen content, such as a silicon oxide film or a silicon oxynitride film, so as to be in contact with the oxide semiconductor layer, the insulating layer having high barrier properties can be prevented from being in direct contact with the oxide semiconductor layer.

For example, a 100-nm-thick gate insulating layer 803 may be formed as follows: a silicon nitride film ($SiN_y$ (y>0)) with a thickness of 50 nm to 200 nm is formed by sputtering as a first gate insulating layer, and a silicon oxide film ($SiO_x$ (x>0)) with a thickness 5 nm to 300 nm is stacked over the first gate insulating layer as a second gate insulating layer. The thickness of the gate insulating layer 803 may be set as appropriate depending on characteristics needed for a transistor and may be approximately 350 nm to 400 nm.

Here, the gate insulating layer 803 in which a 100-nm-thick silicon oxide film formed by sputtering is stacked over a 50-nm-thick silicon nitride film formed by sputtering is formed.

In order for the gate insulating layer 803 to contain hydrogen, a hydroxyl group, and moisture as little as possible, it is preferable that an impurity adsorbed on the substrate 800, such as moisture or hydrogen, be eliminated and removed by preheating the substrate 800, over which the gate layer 801 and the electrode layer 802 are formed, in a preheating chamber of a sputtering apparatus, as a pretreatment for film formation. The temperature for the preheating is 100° C. to 400° C., preferably, 150° C. to 300° C. As an exhaustion unit provided in the preheating chamber, a cryopump is preferably used. Note that this preheating treatment can be omitted.

Next, an oxide semiconductor layer having a thickness of 2 nm to 200 nm, preferably 3 nm to 50 nm, further preferably 3 nm to 20 nm is formed over the gate insulating layer 803. The oxide semiconductor layer is formed by sputtering using an oxide semiconductor target. Moreover, the oxide semiconductor layer can be formed by sputtering in a rare gas (e.g., argon) atmosphere, an oxygen atmosphere, or a mixed atmosphere including a rare gas (e.g., argon) and oxygen.

Note that before the oxide semiconductor layer is formed by sputtering, dust attached to a surface of the gate insulating layer 803 is preferably removed by reverse sputtering in which an argon gas is introduced and plasma is generated. The reverse sputtering is a method by which without application of voltage to a target side, voltage is applied to a substrate side with an RF power source in an argon atmosphere so that plasma is generated in the vicinity of the substrate to modify a surface. Note that instead of an argon atmosphere, a nitrogen atmosphere, a helium atmosphere, or the like may be used. Alternatively, an argon atmosphere to which oxygen, nitrous oxide, or the like is added; or an argon atmosphere to which chlorine, carbon tetrafluoride, or the like is added may be used.

As described above, the oxide semiconductor layer can be formed using any of the following oxide semiconductors: an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are oxides of three metal elements; an In—Ga—O-based oxide semiconductor, an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, and an In—Mg—O-based oxide semiconductor which are oxides of two metal elements; and an In—O-based oxide semiconductor, a Sn—O-based oxide semiconductor, and a Zn—O-based oxide semiconductor which are oxides of one metal element. The above oxide semiconductors may include silicon oxide.

As the oxide semiconductor layer, a thin film represented by $InMO_3(ZnO)_m$ (m>0) can be used. Here, M represents one or more metal elements selected from Ga, Al, Mn, and Co. For example, M can be Ga, Ga and Al, Ga and Mn, or Ga and Co.

Here, as the oxide semiconductor layer, a 30-nm-thick In—Ga—Zn—O-based non-single-crystal film obtained by sputtering using a metal oxide target containing indium (In), gallium (Ga), and zinc (Zn) is used. As the target, a metal oxide target having a composition ratio of In:Ga:Zn=1:1:0.5, In:Ga:Zn=1:1:1, or In:Ga:Zn=1:1:2 can be used, for example. The target may contain $SiO_2$ at 2 wt % to 10 wt %. The filling rate of the metal oxide target containing In, Ga, and Zn is 90% to 100%, preferably 95% to 100%. By using the metal oxide target with a high filling rate, a dense oxide semiconductor layer is formed.

Here, the oxide semiconductor layer is formed over the substrate 800 in such a manner that the substrate is held in the treatment chamber kept at reduced pressure, a sputtering gas from which hydrogen and moisture have been removed is introduced into the treatment chamber while moisture remaining therein is removed, and the above-described target is used. The substrate temperature may be 100° C. to 600° C., preferably 200° C. to 400° C. in film formation. By heating the substrate during film formation, the impurity concentration in the oxide semiconductor layer formed can be reduced. In addition, damage by sputtering can be reduced. In order to remove remaining moisture in the treatment chamber, an entrapment vacuum pump is preferably used. For example, a cryopump, an ion pump, or a titanium sublimation pump is preferably used. The evacuation unit may be a turbo pump provided with a cold trap. In the treatment chamber which is evacuated with the cryopump, for example, a hydrogen atom, a compound containing a hydrogen atom, such as water ($H_2O$) (more preferably, also a compound containing a carbon atom), and the like are removed, whereby the impurity concentration in the oxide semiconductor layer formed in the treatment chamber can be reduced.

As one example of the deposition conditions, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulsed direct-current (DC) power source is preferable because powder substances (referred to as particles) generated in film deposition can be reduced and the film thickness can be uniform.

In order that the oxide semiconductor layer does not to contain impurities such as hydrogen, a hydroxyl group, or moisture as little as possible, it is preferable to preheat the substrate 800 provided with the gate insulating layer 803 in a preheating chamber of the sputtering apparatus before the film formation so that impurities such as moisture or hydrogen adsorbed on the substrate 800 is eliminated and removed. The temperature for the preheating is 100° C. to 400° C., preferably 150° C. to 300° C. As an exhaustion unit provided in the preheating chamber, a cryopump is preferably used. Note that this preheating treatment can be omitted. In addition, before an insulating layer 808 is formed, the preheating may similarly be performed on the substrate 800 over which layers up to and including a source layer 805, a drain layer 806, and an electrode layer 807 are formed.

Next, as illustrated in FIG. 24B, the oxide semiconductor layer is processed (patterned) into a desired shape by etching or the like, so that an island-shaped oxide semiconductor layer 804 is formed over the gate insulating layer 803 to overlap with the gate layer 801.

A resist mask for forming the island-shaped semiconductor layer 804 may be formed by an inkjet method. Formation of the resist mask by an inkjet method needs no photomask; thus, manufacturing costs can be reduced.

Note that etching for forming the island-shaped oxide semiconductor layer 804 may be wet etching, dry etching, or both dry etching and wet etching. As an etching gas used for dry etching, a gas containing chlorine (a chlorine-based gas such as chlorine ($Cl_2$), boron trichloride ($BCl_3$), silicon tetrachloride ($SiCl_4$), or carbon tetrachloride ($CCl_4$)) is preferably used. Alternatively, a gas containing fluorine (a fluorine-based gas such as carbon tetrafluoride ($CF_4$), sulfur hexafluoride ($SF_6$), nitrogen trifluoride ($NF_3$), or trifluoromethane ($CHF_3$)), hydrogen bromide (HBr), oxygen ($O_2$), any of these gases to which a rare gas such as helium (He) or argon (Ar) is added, or the like can be used.

For dry etching, a parallel plate RIE (reactive ion etching) method or an ICP (inductively coupled plasma) etching method can be used. In order to etch the films into desired shapes, the etching conditions (the amount of power applied to a coil-shaped electrode, the amount of power applied to an electrode on the substrate side, and the temperature of the electrode on the substrate side) are adjusted as appropriate.

As an etchant used for wet etching, ITO-07N (produced by Kanto Chemical Co., Inc.) is used. After the wet etching, the etchant is removed together with the etched materials by cleaning. The waste liquid including the etchant and the material etched off may be purified and the material may be reused. When a material such as indium contained in the oxide semiconductor layer is collected from the waste liquid after the etching and reused, the resources can be efficiently used and the costs can be reduced.

Note that it is preferable that reverse sputtering be performed before a conductive film is formed in a subsequent step, in order to remove a resist residue or the like attached to surfaces of the island-shaped oxide semiconductor layer 804 and the gate insulating layer 803.

Then, heat treatment is performed on the oxide semiconductor layer 804 in a nitrogen atmosphere, an oxygen atmosphere, an atmosphere of ultra-dry air (air in which the water content is 20 ppm or less, preferably 1 ppm or less, further preferably 10 ppb or less), or a rare gas (e.g., argon or helium) atmosphere. Heat treatment performed on the oxide semiconductor layer 804 can eliminate moisture or hydrogen in the oxide semiconductor layer 804. Specifically, heat treatment may be performed at 350° C. to 850° C. (or the strain point of a glass substrate), preferably 550° C. to 750° C. For example, heat treatment can be performed at 600° C. for about 3 to 6 minutes. Since dehydration or dehydrogenation can be performed in a short time with an RTA method, heat treatment can be performed even at a temperature over the strain point of a glass substrate. Alternatively, heat treatment may be performed for about one hour in a state where the substrate temperature reaches 450° C.

Here, the oxide semiconductor layer 804 is subjected to the heat treatment in a nitrogen atmosphere with the use of an electric furnace which is one example of a heat treatment apparatus.

Note that a heat treatment apparatus is not limited to an electrical furnace, and may include a device for heating an object to be processed by heat conduction or heat radiation from a heating element such as a resistance heating element.

For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the gas, an inert gas which does not react with an object by heat treatment, such as nitrogen or a rare gas (e.g., argon) is used.

For example, as the heat treatment, GRTA in which the substrate is moved into an inert gas heated at a high temperature of 650° C. to 700° C., heated for several minutes, and moved out of the inert gas heated to the high temperature may be performed. With GRTA, high-temperature heat treatment in a short period of time can be achieved.

Note that it is preferable that in the heat treatment, moisture, hydrogen, or the like be not contained in nitrogen or a rare gas such as helium, neon, or argon. It is preferable that the purity of nitrogen or the rare gas such as helium, neon, or argon which is introduced into a heat treatment apparatus be set to be 6N (99.9999%) or higher, preferably 7N (99.99999%) or higher (i.e., the impurity concentration is 1 ppm or lower, preferably 0.1 ppm or lower).

When impurities such as moisture or hydrogen is added to an oxide semiconductor, in a gate bias-temperature stress test (BT test, the test condition is, for example, at 85° C. with $2 \times 10^6$ V/cm for 12 hours), a bond between the impurities and a main component of the oxide semiconductor is broken by a high electric field (B: bias) and high temperature (T: temperature), and a dangling bond generated causes shift of the threshold voltage (Vth). However, in the above manner, characteristics of the interface between the gate insulating layer and the oxide semiconductor layer are improved and impurities in the oxide semiconductor layer, particularly moisture and hydrogen, are removed as much as possible; thus, a transistor that can be stable even in a BT test can be obtained.

Through the above process, the concentration of hydrogen in the oxide semiconductor layer 804 can be reduced and the oxide semiconductor layer can be purified. Accordingly, the oxide semiconductor layer can be stable. In addition, heat treatment at a temperature which is lower than or equal to the glass transition temperature makes it possible to form an oxide semiconductor layer with extremely low carrier density and a wide band gap. Therefore, a transistor can be manufactured using a large substrate, so that the productivity can be increased. Moreover, by using the purified oxide semiconductor layer with a reduced hydrogen concentration, it is possible to form a transistor with high withstand voltage, reduced short-channel effect, and a high on/off ratio.

Note that in the case where the oxide semiconductor layer is heated, depending on a material or heating conditions of the oxide semiconductor layer, plate-shaped crystals are sometimes formed on the top surface of the oxide semiconductor layer. The plate-shaped crystals are preferably single crystals that are oriented in the c-axis (the direction generally perpendicular to the surface of the oxide semiconductor layer). If the plate-shaped crystals are not single crystals, they are preferably polycrystals where a-b planes of the crystals are aligned or the a-axes or the b-axes are aligned in the channel formation region and the crystals are oriented in the c-axis (the direction substantially perpendicular to the surface of the oxide semiconductor layer). Note that in the case where a surface of the layer placed below the oxide semiconductor layer is uneven, the plate-shaped crystals are polycrystals; therefore, the surface of the layer placed below the oxide semiconductor layer is preferably as even as possible.

Figure 24C:
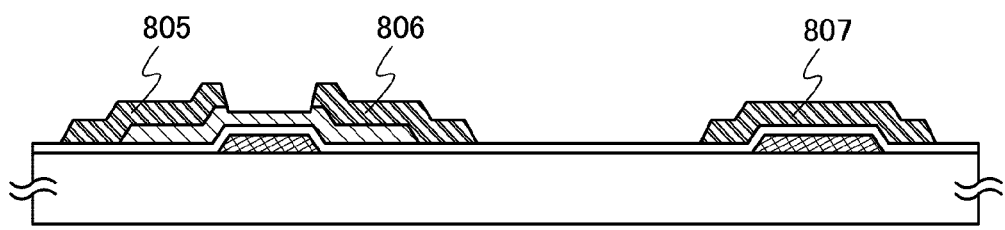

Next, a conductive film used for the source layer and the drain layer (including a wiring formed using the same layer as the source and drain layers) is formed over the oxide semiconductor layer 804 by sputtering or vacuum evaporation. Then, the conductive film is patterned by etching or the like, thereby forming the source layer 805 and the drain layer 806 over the oxide semiconductor layer 804, and the wiring layer 807 that overlaps with the electrode layer 802 with the gate insulating layer 803 placed therebetween, as illustrated in FIG. 24C.

Examples of the material for the conductive film which serves as the source layer 805, the drain layer 806, and the electrode layer 807 (including the wiring formed using the same layer as those layers) are an element selected from Al, Cr, Cu, Ta, Ti, Mo, and W; an alloy including any of the above elements as a component; and an alloy including any of these elements in combination. The conductive film may have a structure in which a refractory metal film of Cr, Ta, Ti, Mo, W, or the like is stacked on one or both of a top surface and a bottom surface of a metal layer of Al, Cu, or the like. Furthermore, the heat resistance can be increased by using an aluminum material to which an element that prevents generation of hillocks and whiskers in an aluminum film, such as Si, Ti, Ta, W, Mo, Cr, Nd, Sc, or Y, is added.

Further, the conductive film may have a single-layer structure or a stacked structure of two or more layers. For example, the conductive film can have a single-layer structure of an aluminum film containing silicon; a two-layer structure in which a titanium film is stacked over an aluminum film; or a three-layer structure in which a titanium film, an aluminum film, and a titanium film are stacked in this order.

The conductive film which serves as the source layer 805, the drain layer 806, and the electrode layer 807 (including the wiring layer formed using the same layer as these layers) may be formed using a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, referred to as ITO), an alloy of indium oxide and zinc oxide ($In_2O_3$—ZnO), or any of the metal oxide materials containing silicon or silicon oxide can be used.

In the case where heat treatment is performed after formation of the conductive film, the conductive film preferably has heat resistance enough to withstand the heat treatment.

Note that materials and etching conditions are adjusted as appropriate so that the oxide semiconductor layer 804 is not removed in etching of the conductive film as much as possible. Depending on the etching conditions, a groove (a recessed portion) is sometimes formed by etching of part of an exposed portion of the island-shaped oxide semiconductor layer 804.

In order to reduce the number of photomasks and steps in a photolithography step, etching may be performed with the use of a resist mask formed using a multi-tone mask which is a light-exposure mask through which light is transmitted to have a plurality of intensities. A resist mask formed using a multi-tone mask has a plurality of thicknesses and further can be changed in shape by etching; therefore, the resist mask can be used in a plurality of etching steps for processing into different patterns. Therefore, a resist mask corresponding to at least two kinds of different patterns can be formed by one multi-tone mask. Thus, the number of light-exposure masks can be reduced and the number of corresponding photolithography steps can be also reduced, so that the process can be simplified.

Next, plasma treatment is performed using a gas such as $N_2O$, $N_2$, or Ar. By this plasma treatment, absorbed water and the like attached to an exposed surface of the oxide semiconductor layer are removed. Alternatively, plasma treatment may be performed using a mixture gas of oxygen and argon.

Figure 24D:
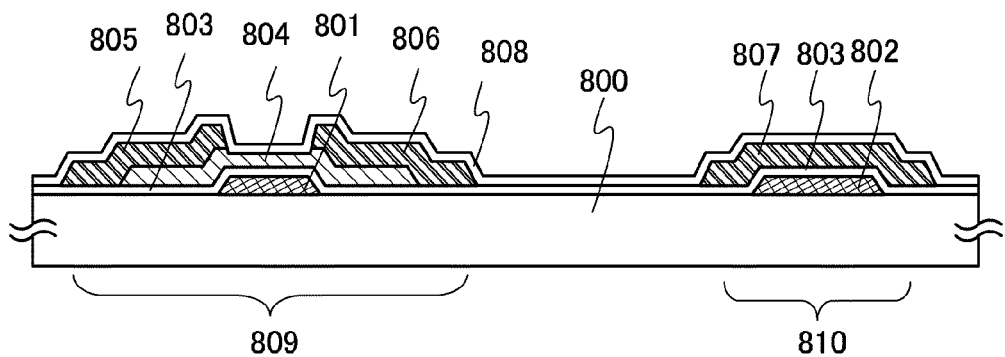

After the plasma treatment, as illustrated in FIG. 24D, an insulating layer 808 is formed so as to cover the source layer 805, the drain layer 806, the electrode layer 807, and the oxide semiconductor layer 804. The insulating layer 808 preferably contains impurities such as moisture, hydrogen, and oxygen as little as possible, and may be formed using a single insulating layer or a stack of a plurality of insulating layers. If hydrogen is contained in the insulating layer 808, hydrogen might enter the oxide semiconductor layer or extract oxygen from the oxide semiconductor layer, thereby causing reduction in resistance of a back channel portion of the oxide semiconductor layer (making the back channel portion have n-type conductivity), which might result in formation of parasitic channel. Therefore, it is important that the insulating layer 808 be formed by a method that does not use hydrogen so that the insulating layer 808 contains as little hydrogen as possible. The insulating layer 808 is preferably formed using a material with high barrier properties. For example, as an insulating film with high barrier properties, the insulating film having a high barrier property, a silicon nitride film, a silicon nitride oxide film, an aluminum nitride film, an aluminum nitride oxide film, or the like can be used. When a plurality of insulating films stacked is used, an insulating layer with a low content nitrogen, such as a silicon oxide film or a silicon oxynitride film, is formed on the side closer to the oxide semiconductor layer 804 than the insulating layer with high barrier properties. Then, the insulating layer with high barrier properties is formed so as to overlap with the source layer 805, the drain layer 806, and the oxide semiconductor layer 804 with the insulating layer with a low content of nitrogen placed therebetween. By using the insulating layer with high barrier properties, impurities such as moisture or hydrogen can be prevented from entering the oxide semiconductor layer 804, the gate insulating layer 803, or the interface between the oxide semiconductor layer 804 and another insulating layer and the vicinity thereof. In addition, when the insulating layer with a low content of nitrogen, such as a silicon oxide film or a silicon oxynitride film, is formed in contact with the oxide semiconductor layer 804, the insulating layer formed using a material with high barrier properties can be prevented from being directly in contact with the oxide semiconductor layer 804.

Here, the gate insulating layer 808 in which a 100-nm-thick silicon nitride film formed by sputtering is stacked over a 200-nm-thick silicon oxide film formed by sputtering is formed. The substrate temperature at the time of deposition can be from room temperature to 300° C. or lower and is 100° C. in this embodiment.

Note that heat treatment may be performed after the insulating layer 808 is formed. The heat treatment is performed at preferably 200° C. to 400° C. (e.g., 250° C. to 350° C.) in a nitrogen atmosphere, an oxygen atmosphere, an atmosphere of ultra-dry air (air in which the water content is 20 ppm or less, preferably 1 ppm or less, further preferably 10 ppb or less), or a rare gas (e.g., argon or helium) atmosphere. Here, for example, heat treatment is performed at 250° C. for 1 hour in a nitrogen atmosphere. Alternatively, before the source layer 805, the drain layer 806, and the electrode layer 807 are formed, RTA treatment at high temperatures for a short time may be performed in a manner similar to the previous heat treatment performed on the oxide semiconductor layer. Even if oxygen vacancy is created in the oxide semiconductor layer 804 because of the heat treatment performed on the oxide semiconductor layer, oxygen is supplied to the oxide semiconductor layer 804 when heat treatment is performed after the insulating layer 808 containing oxygen is provided in contact with an exposed region of the oxide semiconductor layer 804 placed between the source layer 805 and the drain layer 806. Accordingly, by supplying oxygen to the region of the oxide semiconductor layer 804 which is in contact with the insulating layer 808, oxygen vacancies serving as donors can be reduced and the stoichiometric composition ratio can be satisfied. As a result, the oxide semiconductor layer 804 can be made to be an intrinsic semiconductor layer or a substantially intrinsic semiconductor layer. As a result, an oxide semiconductor film can be made to be an intrinsic semiconductor film or a substantially intrinsic semiconductor film. Accordingly, electric characteristics of the transistor can be improved and variation in the electric characteristics thereof can be reduced. The timing of this heat treatment is not particularly limited as long as it is after the formation of the insulating layer 808. When this heat treatment also serves as heat treatment in another step (e.g., heat treatment at the time of formation of a resin film or heat treatment for reducing the resistance of a transparent conductive film), the oxide semiconductor layer 804 can be intrinsic or substantially intrinsic without an increase in the number of steps.

Next, a conductive film may be formed over the insulating layer 808 and patterned so that a back gate layer may be formed so as to overlap with the oxide semiconductor layer 804. In the case where the back gate layer is formed, an insulating layer is formed so as to cover the back gate layer. The back gate layer can be formed using a material and a structure which are similar to those of the gate layer 801 and the electrode layer 802 or those of the source layer 805, the drain layer 806, and the electrode layer 807.

The thickness of the back gate layer is 10 nm to 400 nm, preferably 100 nm to 200 nm Here, the back gate layer is formed in the following manner: a conductive film in which a titanium film, an aluminum film, and a titanium film are stacked is formed, a resist mask is formed by photolithography or the like, and unnecessary portions are removed by etching so that the conductive film is processed (patterned) to a desired shape.

The insulating layer is preferably formed using a material with high barrier properties that can prevent moisture, hydrogen, oxygen, and the like in an atmosphere from adversely affecting the characteristics of the transistor. For example, the insulating layer with high barrier properties can be formed with a single-layer structure or a stacked structure of a silicon nitride film, a silicon nitride oxide film, an aluminum nitride film, an aluminum nitride oxide film, and/or the like by plasma CVD, sputtering, or the like. In order to obtain an effect of barrier properties, the insulating layer is preferably formed to a thickness of 15 nm to 400 nm, for example.

Here, a 300-nm-thick insulating layer is formed by plasma CVD. The deposition conditions for the insulating layer are as follows: the flow rate of a silane gas is 4 sccm; the flow rate of dinitrogen monoxide ($N_2O$) is 800 sccm; and the substrate temperature is 400° C.

Through the above steps, a transistor 809 and a capacitor 810 are formed. Note that the capacitor 810 is formed in a region where the electrode layer 807 overlaps with the electrode layer 802 with the gate insulating layer 803 placed therebetween.

The transistor 809 includes the gate layer 801, the gate insulating layer 803 over the gate layer 801, the oxide semiconductor layer 804 that overlaps with the gate layer 801 with the gate insulating layer 803 placed therebetween, and the source layer 805 and the drain layer 806 that are formed over the oxide semiconductor layer 804. The transistor 809 may further include the insulating layer 808 provided over the oxide semiconductor layer 804 as its component. The transistor 809 illustrated in FIG. 24D has a channel-etched structure in which part of the oxide semiconductor layer 804 between the source layer 805 and the drain layer 806 is etched.

Note that the transistor 809 is described as a single-gate transistor; alternatively, a multi-gate transistor including a plurality of channel formation regions by including a plurality of the gate layers 801 that are electrically connected to each other can be manufactured if needed.

(Various Electronic Devices Including Liquid Crystal Display Device)

Examples of electronic devices including any of the liquid crystal display devices disclosed in this specification will be described below with reference to FIGS. 25A to 25F.

Figure 25A:
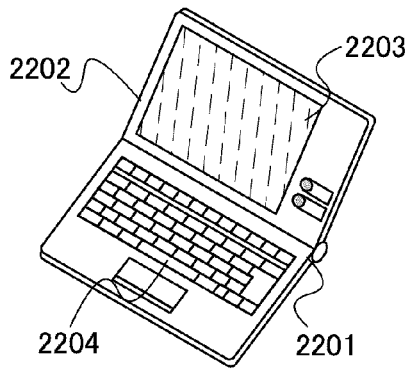
FIGS. 25A to 25F each illustrate an example of an electronic device.

FIG. 25A illustrates a notebook personal computer including a main body 2201, a housing 2202, a display portion 2203, a keyboard 2204, and the like.

Figure 25B:
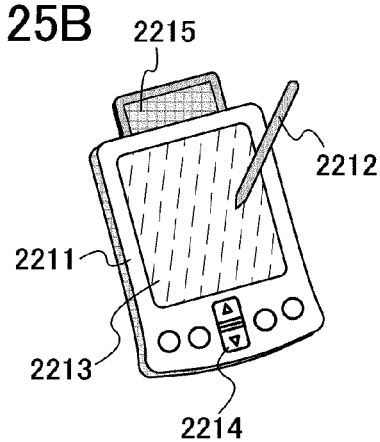

FIG. 25B illustrates a personal digital assistant (PDA). A main body 2211 is provided with a display portion 2213, an external interface 2215, operation buttons 2214, and the like. A stylus 2212 is provided as an accessory for operating the PDA.

Figure 25C:
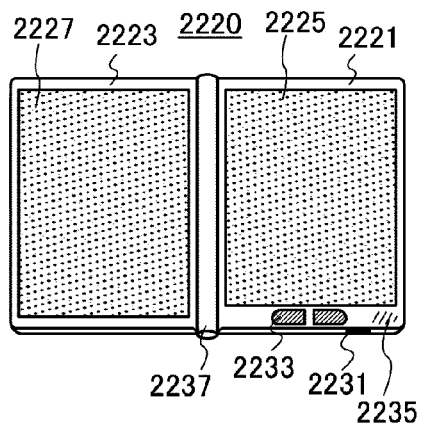

FIG. 25C illustrates an e-book reader 2220 as an example of electronic paper. The e-book reader 2220 includes two housings of a housing 2221 and a housing 2223. The housings 2221 and 2223 are united with an axis portion 2237, along which the e-book reader 2220 can be opened and closed. With such a structure, the e-book reader 2220 can be used like a paper book.

A display portion 2225 is incorporated in the housing 2221, and a display portion 2227 is incorporated in the housing 2223. The display portion 2225 and the display portion 2227 may display one image or different images. In the case where the display portions 2225 and 2227 display different images, for example, the right display portion (the display portion 2225 in FIG. 25C) can display text and the left display portion (the display portion 2227 in FIG. 25C) can display pictures.

Further, in FIG. 25C, the housing 2221 is provided with an operation portion and the like. For example, the housing 2221 is provided with a power switch 2231, an operation key 2233, and a speaker 2235. Pages can be turned with the operation key 2233. Note that a keyboard, a pointing device, or the like may also be provided on the surface of the housing, on which the display portion is provided. An external connection terminal (e.g., an earphone terminal, a USB terminal, or a terminal that can be connected to an AC adapter or various cables such as a USB cable), a recording medium insertion portion, and the like may be provided on the back surface or the side surface of the housing. Further, the e-book reader 2220 may have a function of an electronic dictionary.

The e-book reader 2220 may be configured to transmit and receive data wirelessly. Through wireless communication, desired book data or the like can be purchased and downloaded from an e-book server.

Note that electronic paper can be applied to devices in a variety of fields as long as they display data. For example, electronic paper can be used for posters, advertisement in vehicles such as trains, and display in a variety of cards such as credit cards in addition to e-book readers.

Figure 25D:
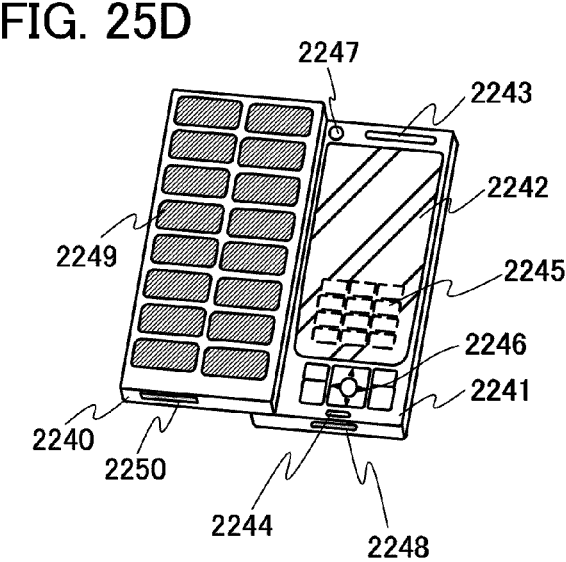

FIG. 25D illustrates a mobile phone. The mobile phone includes two housings of a housing 2240 and a housing 2241. The housing 2241 is provided with a display panel 2242, a speaker 2243, a microphone 2244, a pointing device 2246, a camera lens 2247, an external connection terminal 2248, and the like. The housing 2240 is provided with a solar cell 2249 for charging the mobile phone, an external memory slot 2250, and the like. An antenna is incorporated in the housing 2241.

The display panel 2242 has a touch panel function. In FIG. 25D, a plurality of operation keys 2245 displayed as images are shown by dashed lines. Note that the mobile phone includes a booster circuit for increasing a voltage output from the solar cell 2249 to a voltage needed for each circuit. Moreover, the mobile phone can include a contactless IC chip, a small recording device, or the like in addition to the above components.

The display orientation of the display panel 2242 changes as appropriate in accordance with the application mode. Further, the camera lens 2247 is provided on the same surface as the display panel 2242, so that the mobile phone can be used as a video phone. The speaker 2243 and the microphone 2244 can be used for videophone calls, recording, playing sound, and the like as well as voice calls. The housings 2240 and 2241 which are unfolded as illustrated in FIG. 25D can slide so that one overlaps the other. Thus, the size of the mobile phone can be reduced, which makes the mobile phone suitable for being carried.

The external connection terminal 2248 can be connected to an AC adapter or a variety of cables such as a USB cable, which enables charging of the mobile phone and data communication. Moreover, a larger amount of data can be saved and moved by inserting a recording medium to the external memory slot 2250. Further, the mobile phone may have an infrared communication function, a television reception function, or the like in addition to the above functions.

Figure 25E:
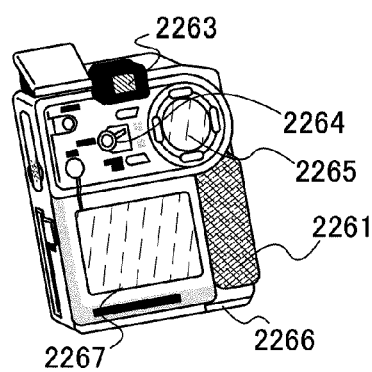

FIG. 25E illustrates a digital camera. The digital camera includes a main body 2261, a display portion (A) 2267, an eyepiece 2263, an operation switch 2264, a display portion (B) 2265, a battery 2266, and the like.

Figure 25F:
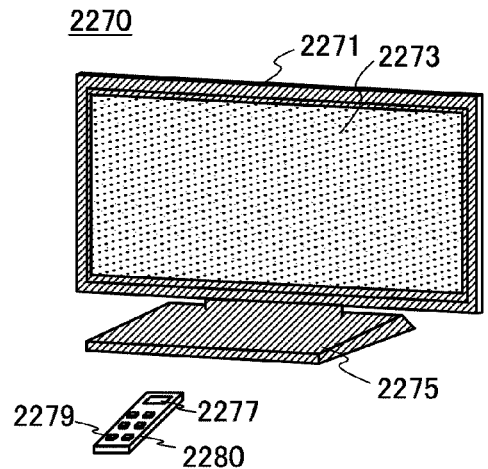

FIG. 25F illustrates a television set. In a television set 2270, a display portion 2273 is incorporated in a housing 2271. The display portion 2273 can display images. Here, the housing 2271 is supported by a stand 2275.

The television set 2270 can be operated by an operation switch of the housing 2271 or a separate remote controller 2280. With operation keys 2279 of the remote controller 2280, channels and volume can be controlled and an image displayed on the display portion 2273 can be controlled. Moreover, the remote controller 2280 may have a display portion 2277 that displays data output from the remote controller 2280.

Note that the television set 2270 is preferably provided with a receiver, a modem, and the like. A general television broadcast can be received with the receiver. Moreover, when the television set is connected to a communication network with or without wires via the modem, one-way (from a sender to a receiver) or two-way (between a sender and a receiver or between receivers) data communication can be performed.

This application is based on Japanese Patent Application serial No. 2010-090935 and 2010-114435 filed with Japan Patent Office on Apr. 9, 2010 and May 18, 2010, respectively, the entire contents of which are hereby incorporated by reference.

EXPLANATION OF REFERENCE

10: pixel portion, 11: scan line driver circuit, 12: signal line driver circuit, 15: pixel, 16: backlight unit, 30: pixel portion, 31: scan line driver circuit, 32: signal line driver circuit, 33: scan line, 111: shift register, 112: shift register, 113: shift register, 120: shift register, 121: transistor, 122: transistor, 123: transistor, 131: scan line, 132: scan line, 133: scan line, 141: signal line, 142: signal line, 143: signal line, 151: transistor, 152: transistor, 153: transistor, 154: capacitor, 155: liquid crystal element, 211: transistor, 220: substrate, 221: gate layer, 222: gate insulating layer, 223: oxide semiconductor layer, 224a: source layer, 224b: drain layer, 225: insulating layer, 226: protective insulating layer, 301: region, 302: region, 303: region, 311: shift register, 312: shift register, 313: shift register, 320: shift register, 321: transistor, 322: transistor, 323: transistor, 341: signal line, 342: signal line, 343: signal line, 351: pixel, 352: pixel, 353: pixel, 510: transistor, 511: insulating layer, 520: transistor, 530: transistor, 531: insulating layer, 532a: wiring layer, 532b: wiring layer, 800: substrate, 801: gate layer, 802: electrode layer, 803: gate insulating layer, 804: oxide semiconductor layer, 805: source layer, 806: drain layer, 807: electrode layer, 808: insulating layer, 809: transistor, 810: capacitor, 900: substrate, 901: substrate, 903: adhesive, 904: terminal, 905: wire, 906: transistor, 907: pad, 910: substrate, 911: substrate, 912: pad, 913: solder ball, 914: transistor, 916: terminal, 920: substrate, 921: substrate, 922: pad, 924: transistor, 926: terminal, 927: conductive resin, 1401: transistor, 1402: gate layer, 1403: gate insulating layer, 1404: oxide semiconductor layer, 1405: conductive film, 1406: conductive film, 1407: insulating layer, 1408: insulating layer, 1410: pixel electrode, 1411: alignment film, 1413: counter electrode, 1414: alignment film, 1415: liquid crystal, 1416: sealant, 1417: spacer, 1420: counter substrate, 1601: panel, 1602: diffusion plate, 1603: prism sheet, 1604: diffusion plate, 1605: light guide plate, 1607: backlight panel, 1608: circuit board, 1609: COF tape, 1610: FPC, 1611: substrate, 1612: backlight, 1620: touch panel, 1621: panel, 1622: position detection portion, 1623: pixel portion, 1630: first electrode, 1631: second electrode, 1640: first electrode, 1641: second electrode, 1642: conductive film, 1643: conductive film, 1644: insulating layer, 1800: measurement system, 1802: capacitor, 1804: transistor, 1805: transistor, 1806: transistor, 1808: transistor, 2201: main body, 2202: housing, 2203: display portion, 2204: keyboard, 2211: main body, 2212: stylus, 2213: display portion, 2214: operation button, 2215: external interface, 2220: e-book reader, 2221: housing, 2223: housing, 2225: display portion, 2227: display portion, 2231: power switch, 2233: operation key, 2235: speaker, 2237: axis portion, 2240: housing, 2241: housing, 2242: display panel, 2243: speaker, 2244: microphone, 2245: operation key, 2246: pointing device, 2247: camera lens, 2248: external connection terminal, 2249: solar cell, 2250: external memory slot, 2261: main body, 2263: eyepiece, 2264: operation switch, 2265: display portion, 2266: battery, 2267: display portion, 2270: television set, 2271: housing, 2273: display portion, 2275: stand, 2277: display portion, 2279: operation key, 2280: remote controller, 3511: transistor, 3512: capacitor, 3514: liquid crystal element, 3521: transistor, 3531: transistor, 4001: substrate, 4002: pixel portion, 4003: signal line driver circuit, 4004: scan line driver circuit, 4005: sealant, 4006: counter substrate, 4007: liquid crystal, 4009: transistor, 4010: transistor, 4011: liquid crystal element, 4014: leading wiring, 4015: leading wiring, 4016: connection terminal, 4018: FPC, 4019: anisotropic conductive film, 4021: substrate, 4022: transistor, 4030: pixel electrode, 4031: counter electrode, 4035: spacer, 6001: substrate, 6002: pixel portion, 6003: scan line driver circuit, 6004: substrate, 6005: FPC, 6006: counter substrate, 6101: substrate, 6102: pixel portion, 6103: scan line driver circuit, 6104: substrate, 6105: FPC, 6106: counter substrate, 6201: substrate, 6202: pixel portion, 6203: scan line driver circuit, 6204: substrate, 6205: FPC, 6206: counter substrate, 6207: portion of signal line driver circuit

The invention claimed is:
1. A display device comprising:
a first signal line provided so as to be supplied with a first image signal in a first horizontal scan period which is included in a first sampling period, and supplied with a second image signal in a second horizontal scan period which is included in a second sampling period;
a second signal line provided so as to be supplied with a third image signal in the first horizontal scan period, and supplied with a fourth image signal in the second horizontal scan period;
a first scan line and a second scan line which are provided so as to be supplied with a selection signal in the first horizontal scan period, and supplied with a non-selection signal in the second horizontal scan period;
a third scan line and a fourth scan line which are provided so as to be supplied with a non-selection signal in the first horizontal scan period, and supplied with a selection signal in the second horizontal scan period;
a first pixel electrically connected to the first signal line, the second signal line, the first scan line, and the third scan line, wherein the first pixel is provided so as to be supplied with the first image signal in the first horizontal scan period, and supplied with the fourth image signal in the second horizontal scan period;
a second pixel electrically connected to the first signal line, the second signal line, the second scan line, and the fourth scan line, wherein the second pixel is provided so as to be supplied with the third image signal in the first horizontal scan period, and supplied with the second image signal in the second horizontal scan period;
a first shift register configured to supply a selection signal to the first scan line in the first horizontal scan period and supply a selection signal to the fourth scan line in the second horizontal scan period; and
a second shift register configured to supply a selection signal to the second scan line in the first horizontal scan period and supply a selection signal to the third scan line in the second horizontal scan period.
2. The display device according to claim 1,
wherein the first pixel includes:
a first transistor, wherein a gate of the first transistor is electrically connected to the first scan line, and one of a source and a drain of the first transistor is electrically connected to the first signal line;
a second transistor, wherein a gate of the second transistor is electrically connected to the third scan line, and one of a source and a drain of the second transistor is electrically connected to the second signal line; and
a first liquid crystal element, wherein one electrode of the first liquid crystal element is electrically connected to the other of the source and the drain of the first transistor and the other of the source and the drain of the second transistor,
wherein the second pixel includes:
a third transistor, wherein a gate of the third transistor is electrically connected to the fourth scan line, and one of a source and a drain of the third transistor is electrically connected to the first signal line;
a fourth transistor, wherein a gate of the fourth transistor is electrically connected to the second scan line, and one of a source and a drain of the fourth transistor is electrically connected to the second signal line; and
a second liquid crystal element, wherein one electrode of the second liquid crystal element is electrically connected to the other of the source and the drain of the third transistor and the other of the source and the drain of the fourth transistor, and wherein each of the first to fourth transistors includes a channel formation region including an oxide semiconductor.

3. The display device according to claim 1, wherein each of the first shift register and the second shift register includes a transistor which includes a channel formation region including an oxide semiconductor.

4. A display device comprising:
a first signal line provided so as to be supplied with a first image signal in a first horizontal scan period which is included in a first sampling period, supplied with a second image signal in a second horizontal scan period which is included in a second sampling period, and supplied with a third image signal in a third horizontal scan period which is included in a third sampling period;
a second signal line provided so as to be supplied with a fourth image signal in the first horizontal scan period, supplied with a fifth image signal in the second horizontal scan period, and supplied with a sixth image signal in the third horizontal scan period;
a third signal line provided so as to be supplied with a seventh image signal in the first horizontal scan period, supplied with an eighth image signal in the second horizontal scan period, and supplied with a ninth image signal in the third horizontal scan period;
a first scan line, a fifth scan line, and a ninth scan line which are provided so as to be supplied with a selection signal in the first horizontal scan period;
a third scan line, a fourth scan line, and an eighth scan line which are provided so as to be supplied with a selection signal in the second horizontal scan period;
a second scan line, a sixth scan line, and a seventh scan line which are provided so as to be supplied with a selection signal in the third horizontal scan period;
a first pixel electrically connected to the first signal line, the second signal line, the third signal line, the first scan line, the second scan line, and the third scan line,
a second pixel electrically connected to the first signal line, the second signal line, the third signal line, the fourth scan line, the fifth scan line, and the sixth scan line,
a third pixel electrically connected to the first signal line, the second signal line, the third signal line, the seventh scan line, the eighth scan line, and the ninth scan line,
a first shift register electrically connected to the first scan line, the fourth scan line, and the seventh scan line;
a second shift register electrically connected to the second scan line, the fifth scan line, and the eighth scan line; and
a third shift register electrically connected to the third scan line, the sixth scan line, and the ninth scan line.

5. The display device according to claim 4,
wherein the first pixel comprises:
a first transistor, wherein a gate of the first transistor is electrically connected to the first scan line, and one of a source and a drain of the first transistor is electrically connected to the first signal line;
a second transistor, wherein a gate of the second transistor is electrically connected to the second scan line, and one of a source and a drain of the second transistor is electrically connected to the second signal line;
a third transistor, wherein a gate of the third transistor is electrically connected to the third scan line, and one of a source and a drain of the third transistor is electrically connected to the third signal line; and
a first liquid crystal element, wherein one of electrodes of the first liquid crystal element is electrically connected to the other of the source and the drain of the first transistor, the other of the source and the drain of the second transistor, and the other of the source and the drain of the third transistor, wherein the second pixel comprises:
a fourth transistor, wherein a gate of the fourth transistor is electrically connected to the fourth scan line, and one of a source and a drain of the fourth transistor is electrically connected to the first signal line;
a fifth transistor, wherein a gate of the fifth transistor is electrically connected to the fifth scan line, and one of a source and a drain of the fifth transistor is electrically connected to the second signal line;
a sixth transistor, wherein a gate of the sixth transistor is electrically connected to the sixth scan line, and one of a source and a drain of the sixth transistor is electrically connected to the third signal line; and
a second liquid crystal element, wherein one of electrodes of the second liquid crystal element is electrically connected to the other of the source and the drain of the fourth transistor, the other of the source and the drain of the fifth transistor, and the other of the source and the drain of the sixth transistor, and wherein the third pixel comprises:
a seventh transistor, wherein a gate of the seventh transistor is electrically connected to the seventh scan line, and one of a source and a drain of the seventh transistor is electrically connected to the first signal line;
an eighth transistor, wherein a gate of the eighth transistor is electrically connected to the eighth scan line, and one of a source and a drain of the eighth transistor is electrically connected to the second signal line;
a ninth transistor, wherein a gate of the ninth transistor is electrically connected to the ninth scan line, and one of a source and a drain of the ninth transistor is electrically connected to the third signal line; and
a third liquid crystal element, wherein one of electrodes of the third liquid crystal element is electrically connected to the other of the source and the drain of the seventh transistor, the other of the source and the drain of the eighth transistor, and the other of the source and the drain of the ninth transistor, wherein each of the first to ninth transistors includes a channel formation region including an oxide semiconductor.

6. The display device according to claim 4, wherein each of the first shift register and the second shift register includes a transistor which includes a channel formation region including an oxide semiconductor.

7. A method for driving a display device comprising the steps of:
in a sampling period in which an image signal is input to a plurality of pixels in a first to n-th rows (n is a natural number of 3 or more) while an image signal is input to a plurality of pixels in an (n+1)th to 2n-th rows,
after finishing inputting the image signal to the plurality of pixels in the first to k-th rows (k is a natural number of 2 or more and less than n) while inputting the image signal to the plurality of pixels in the (n+1)th to (n+k)th rows during a first period, making a light source for the first to k-th rows and a light source for the (n+1)th to (n+k)th rows emit light having a first color and a second color, respectively, during a third period; and
after finishing inputting the image signal to the plurality of pixels in the (k+1)th to 2k-th rows while inputting the image signal to the plurality of pixels in the (n+k+1)th to (n+2k)th rows during a second period, making a light source for the (k+1)th to 2k-th rows and a light source for the (n+k+1)th to (n+2k)th rows emit light having the first color and the second color, respectively, during a fourth period, wherein a part of the third period is overlapped with a part of the fourth period.

8. The method for driving a display device according to claim 7, wherein a part of the second period is overlapped with a part of the third period.

9. The method for driving a display device according to claim 7, wherein the first color is white, cyan, magenta, or yellow.

10. The method for driving a display device according to claim 7, wherein the image signal is input to each of the plurality of pixels in a first to 2n-th rows through a transistor including an oxide semiconductor.

* * * * *